United States Patent
Kawabe et al.

(10) Patent No.: US 12,173,098 B2
(45) Date of Patent: Dec. 24, 2024

(54) MODIFIED VINYLAROMATIC COPOLYMER, PRODUCTION METHOD THEREFOR, MODIFIED CONJUGATED DIENE COPOLYMER OBTAINED THEREFROM AND COMPOSITION THEREOF, CROSSLINKED RUBBER OBJECT, AND TIRE MEMBER

(71) Applicant: NIPPON STEEL Chemical & Material Co., Ltd., Tokyo (JP)

(72) Inventors: Masanao Kawabe, Tokyo (JP); Tadashi Kuratomi, Tokyo (JP)

(73) Assignee: NIPPON STEEL Chemical & Material Co., Ltd., Tokyo (JP)

( * ) Notice: Subject to any disclaimer, the term of this patent is extended or adjusted under 35 U.S.C. 154(b) by 545 days.

(21) Appl. No.: 17/622,699

(22) PCT Filed: Jun. 23, 2020

(86) PCT No.: PCT/JP2020/024577
§ 371 (c)(1),
(2) Date: Dec. 23, 2021

(87) PCT Pub. No.: WO2020/262371
PCT Pub. Date: Dec. 30, 2020

(65) Prior Publication Data
US 2023/0102867 A1 Mar. 30, 2023

(30) Foreign Application Priority Data
Jun. 25, 2019 (JP) ................................ 2019-117636
Jun. 25, 2019 (JP) ................................ 2019-117688

(51) Int. Cl.
*C08F 212/08* (2006.01)
*B60C 1/00* (2006.01)
(Continued)

(52) U.S. Cl.
CPC .......... *C08F 212/36* (2013.01); *B60C 1/0016* (2013.01); *C08C 19/25* (2013.01);
(Continued)

(58) Field of Classification Search
None
See application file for complete search history.

(56) References Cited

U.S. PATENT DOCUMENTS 5,627,293 A * 5/1997 Pugin .................. B01J 31/1658
585/277
11,130,861 B2 * 9/2021 Kawabe ............... C08F 212/12
(Continued)

FOREIGN PATENT DOCUMENTS

EP  3536723  9/2019
JP  07207029 A * 8/1995
(Continued)

OTHER PUBLICATIONS

"International Preliminary Report on Patentability (Form PCT/IPEA/409) of PCT/JP2020/024577," completed on Sep. 14, 2021, with English translation thereof, pp. 1-10.

*Primary Examiner* — Richard A. Huhn
(74) *Attorney, Agent, or Firm* — JCIPRNET

(57) ABSTRACT

To provide a modified vinylaromatic copolymer which can be used in production of copolymer rubber and which has reactivity and solubility, and a copolymer rubber material obtained therefrom, which simultaneously has processability, strength, and homogeneity. The modified vinylaromatic copolymer is a copolymer containing a structural unit (a) derived from a divinylaromatic compound and a structural unit (b) derived from a monovinylaromatic compound, wherein the structural unit (a) at least partially includes the following crosslinked structural unit (a1), and a terminal is modified by a modification group having at least one func-
(Continued)

tional group selected from the group consisting of an amino group, a hydroxyl group, and an alkoxysilyl group.

21 Claims, 1 Drawing Sheet

(51) Int. Cl.
| | | |
|---|---|---|
| *C08C 19/25* | (2006.01) | |
| *C08F 8/42* | (2006.01) | |
| *C08F 210/14* | (2006.01) | |
| *C08F 212/36* | (2006.01) | |
| *C08F 236/06* | (2006.01) | |
| *C08L 9/06* | (2006.01) | |
| *C08L 25/08* | (2006.01) | |
| *C08L 25/10* | (2006.01) | |
| *C08L 25/16* | (2006.01) | |

(52) U.S. Cl.
CPC .............. *C08F 8/42* (2013.01); *C08F 210/14* (2013.01); *C08F 212/08* (2013.01); *C08F 236/06* (2013.01); *C08L 9/06* (2013.01); *C08L 25/08* (2013.01); *C08L 25/10* (2013.01); *C08L 25/16* (2013.01)

(56) References Cited

U.S. PATENT DOCUMENTS

| | | | |
|---|---|---|---|
| 12,037,427 B2 * | 7/2024 | Kawabe | .................... C08F 2/44 |
| 2002/0120069 A1 | 8/2002 | Li et al. | |
| 2016/0159956 A1 * | 6/2016 | Thiele | .................... C08F 36/08 |
| | | | 556/412 |
| 2021/0108073 A1 | 4/2021 | Kawabe et al. | |

FOREIGN PATENT DOCUMENTS

| | | |
|---|---|---|
| JP | H07207029 | 8/1995 |
| JP | H08259584 | 10/1996 |
| JP | 2003073434 | 3/2003 |
| JP | 2004123873 | 4/2004 |
| JP | 2004517202 | 6/2004 |
| JP | 2005213381 | 8/2005 |
| JP | 2012092197 | 5/2012 |
| JP | 2013155268 | 8/2013 |
| JP | 2016530361 | 9/2016 |
| JP | 2018039995 | 3/2018 |
| WO | 2018084128 | 5/2018 |
| WO | 2018181842 | 10/2018 |

\* cited by examiner

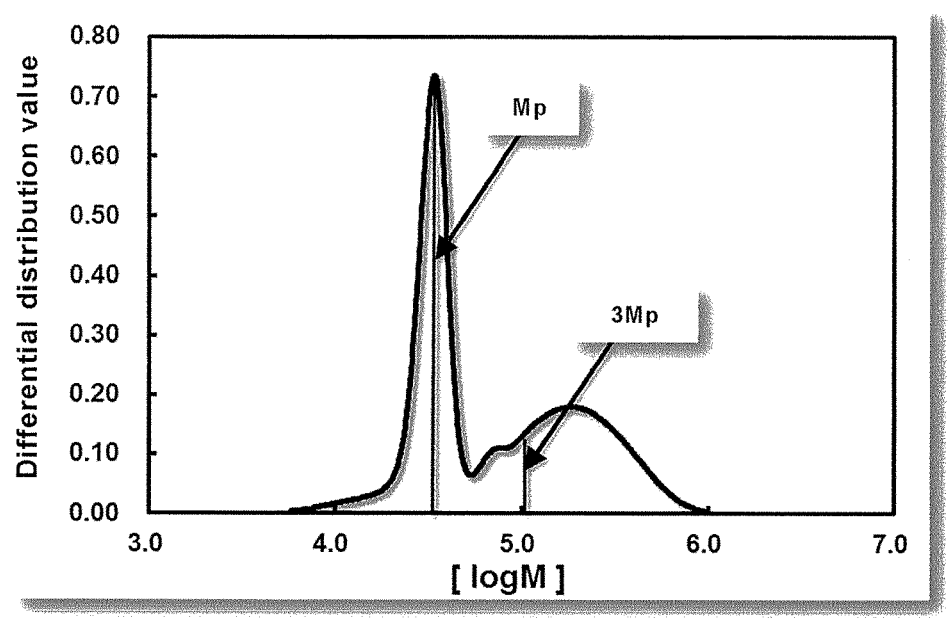

MODIFIED VINYLAROMATIC COPOLYMER, PRODUCTION METHOD THEREFOR, MODIFIED CONJUGATED DIENE COPOLYMER OBTAINED THEREFROM AND COMPOSITION THEREOF, CROSSLINKED RUBBER OBJECT, AND TIRE MEMBER

CROSS-REFERENCE TO RELATED APPLICATION

This application is a 371 application of an international PCT application serial no. PCT/JP2020/024577, filed on Jun. 23, 2020, which claims the priority benefit of Japan application JP2019-117636, filed on Jun. 25, 2019 and Japan application JP2019-117688, filed on Jun. 25, 2019. The entirety of the above-mentioned patent application is hereby incorporated by reference herein and made a part of this specification.

TECHNICAL FIELD

The present invention relates to a modified vinylaromatic copolymer which is excellent in reactivity in a reaction with a living terminal of a conjugated diene-based polymer by use of an organolithium compound as an initiator in a hydrocarbon solvent, and a method for producing the copolymer. The present invention also relates to a modified vinylaromatic copolymer having a branched structure, and a method for producing the copolymer. The present invention also relates to a modified conjugated diene-based copolymer excellent in processability and excellent in tensile strength and wear resistance, as well as a modified conjugated diene-based copolymer composition including the modified conjugated diene-based copolymer, a crosslinked rubber product obtained by crosslinking the composition, and a tire member.

BACKGROUND ART

Conjugated diene-based rubber such as SBR (styrene-butadiene rubber), BR (butadiene rubber), IR (isoprene rubber), and styrene-isoprene rubber is excellent in wear resistance, elasticity, and water resistance, and is used in various applications such as molding materials and resin modifiers.

One example of main applications of the conjugated diene-based rubber is a tire for automobiles. Examples of characteristics required in such a tire include mechanical strength, wear resistance, and wet-grip performance (hereinafter, also collectively referred to as "strength and the like"). Furthermore, a tire (so-called eco-tire) excellent in energy saving performance, namely, fuel efficiency has been recently actively developed. The eco-tire is required to not only have strength and the like, but also be in low in rolling resistance.

While it is known for retaining strength and the like of the tire to add a filler (filling agent for reinforcing) such as carbon black or silica to conjugated diene rubber, terminal-modified solution polymerization type SBR (terminal-modified S-SBR) attracts attention, which is a material not only further enhancing strength and the like of the tire, but also imparting excellent rolling resistance. The terminal-modified S-SBR has a functional group at a molecular terminal of SBR, and the functional group at the molecular terminal interacts with the filler. Such interaction leads to not only an enhancement in dispersibility of the filler in SBR, but also a reduction in motility due to restriction of the molecular terminal of SBR. As a result, the tire is reduced in hysteresis loss (internal friction) and lowered in rolling resistance. Such characteristics are utilized to develop an eco-tire simultaneously having strength and the like, and low rolling resistance.

For example, in Patent Literature 1, S-SBR simultaneously having high-temperature characteristics and rubber-like properties is obtained by synthesizing a block copolymer including an α-methylstyrene block and a butadiene block by living anionic polymerization by use of an organolithium compound as an initiator in a non-polar solvent, and furthermore, if necessary, reacting the block copolymer with a polyfunctional coupling agent.

Patent Literature 2 discloses a star-block interpolymer including a random copolymer block of conjugated diene and a monovinylaromatic monomer, a poly-conjugated diene block, and a functional group derived from a polyfunctional lithium-based initiator, and the interpolymer is here disclosed to be widely usable in rubber in production of a tire tread having excellent characteristics including reduced rolling resistance and improved traction characteristics.

It is considered that the techniques in Patent Literatures 1 and 2 each have the effect of retaining processability of rubber due to introduction of a branched structure into a rubber component. However, there is not any special devisal about interaction with the filler for retention of strength, and contribution to strength is not sufficient.

Patent Literature 3 discloses a rubber composition obtained by compounding a low-molecular weight functional group-containing polymer having a functional group interacting with carbon black, at a molecular chain terminal, and having a polymer structure similar to that of a rubber component of diene-based rubber, to a rubber composition obtained by compounding a predetermined amount of carbon black to blended rubber including a plurality kinds of diene-based rubber. The rubber composition can have controlled amount of carbon black dispensed in each diene-based rubber component by compounding a low-molecular weight compound interacting with carbon black, to rubber. Thus, features of such each rubber component can be effectively exhibited to allow rubber characteristics, for example, rolling characteristics and wet characteristics which are contradicted each other, to be simultaneously satisfied. However, the technique does not impart sufficient contribution to strength because the low-molecular weight compound is compounded to rubber.

Patent Literature 4 discloses a rubber composition containing a crosslinked rubber particle including a conjugated diene unit, an aromatic vinyl unit and a unit having at least two polymerizable unsaturated groups, and conjugated diene/aromatic vinyl copolymerized rubber including a conjugated diene unit having a specified bond structure, and the crosslinked rubber particle is here disclosed to optionally include a monomer unit having a carboxylic acid group, a hydroxyl group and/or an epoxy group. The technique allows proper interaction with an inorganic filling agent (filler) such as silica to be exhibited, and thus dispersibility and processability of the inorganic filling agent are excellent. However, respective substances disclosed as the monomer unit having at least two polymerizable unsaturated groups, and as the monomer unit having a carboxylic acid group, a hydroxyl group and/or an epoxy group are each a low molecule. Thus, reactivity may be excessively high to cause gelation of the crosslinked rubber particle and the rubber composition to progress. The technique is also required to involve synthesis of crosslinked rubber separate from the conjugated diene/aromatic vinyl copolymerized rubber and then compounding of the crosslinked rubber with the conjugated diene/aromatic vinyl copolymerized rubber, and has room for improvement in terms of simplicity of a process.

The present applicant has found in view of the above problems that copolymer rubber simultaneously having processability, strength, and homogeneity can be provided by adopting a specified polyfunctional vinylaromatic copolymer compound simultaneously having respective interaction functions with a branched structure and a filler, as a constituent unit of conjugated diene rubber (Patent Literature 5).

However, the polyfunctional vinylaromatic copolymer compound, although considerably improved in terms of gelation, still has the problem of generation of a small amount of microgel as a by-product.

The present applicant has disclosed a compound similar to the polyfunctional vinylaromatic copolymer compound disclosed in Patent Literature 5, in, for example, Patent Literatures 6 and 7. However, there is not taught any use of such a similar compound in a constituent unit of copolymer rubber.

A polyfunctional vinylaromatic copolymer disclosed in Patent Literature 8 is a copolymer which includes a large amount of a high molecular weight substance having a remarkably developed branched structure to exhibit a broad molecular weight distribution, and thus has the problem of generation of a small amount of microgel as a by-product when used as a constituent unit of copolymer rubber.

CITATION LIST

Patent Literature

Patent Literature 1: JP2003-73434A
Patent Literature 2: JP2004-517202 A
Patent Literature 3: JP 2005-213381 A
Patent Literature 4: WO 2002/000779 A
Patent Literature 5: WO 2018/084128 A
Patent Literature 6: JP 2004-123873 A
Patent Literature 7: JP 2018-39995 A
Patent Literature 8: WO 2018/181842 A

SUMMARY OF INVENTION

An object of the present invention is to solve the above problems to thereby provide a modified vinylaromatic copolymer which causes no generation of a small amount of microgel as a by-product, which can be used in production of a modified conjugated diene-based copolymer, and which has reactivity and solubility, a modified conjugated diene-based copolymer composition simultaneously having processability, strength, and homogeneity, a crosslinked rubber product obtained by crosslinking of the composition, and a tire member.

The present inventors have made intensive studies, and as a result, have found that the above problems can be solved by a branched vinylaromatic copolymer containing a specified structural unit (a) derived from a divinylaromatic compound and a specified structural unit (b) derived from a monovinylaromatic compound, in which an active terminal is modified by an amino group, an alkoxysilyl group, or a hydroxyl group, leading to completion of the present invention. The present inventors have also found that the above problems can be solved by a modified vinylaromatic copolymer in which a side chain or a terminal of a polyfunctional vinylaromatic copolymer is modified by a silane-based compound, the modified vinylaromatic copolymer having high reactivity in production of a modified conjugated diene-based copolymer, and use of the modified conjugated diene-based copolymer as a constituent unit of a modified conjugated diene-based copolymer composition, leading to completion of the present invention.

The present invention relates to a modified vinylaromatic copolymer containing a structural unit (a) derived from a divinylaromatic compound and a structural unit (b) derived from a monovinylaromatic compound, wherein the structural unit (a) at least partially includes the following crosslinked structural unit (a1):

[C1]

(a1)

wherein $R^1$ represents an aromatic hydrocarbon group having 6 to 30 carbon atoms; and one or more terminals are each modified by a modification group having at least one functional group selected from the group consisting of an amino group, an alkoxysilyl group, and a hydroxyl group.

The present invention also relates to a modified vinylaromatic copolymer which is a copolymer including the structural unit (a) derived from a divinylaromatic compound and the structural unit (b) derived from a monovinylaromatic compound, wherein 0.5 to 95.0% by mol of the structural unit (a) is contained and 5.0 to 99.5% by mol of the structural unit (b) is contained, based on the total amount of the structural unit (a) and the structural unit (b);

the copolymer contains one or more silane-based functional groups (c) each represented by the following formula (c1) or formula (c2), in a side chain or at a terminal:

[C2]

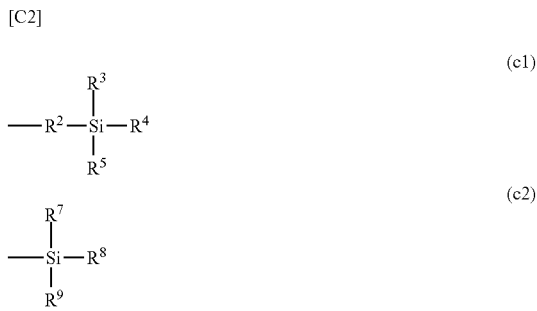

wherein $R^2$ represents a divalent alkylene group having 1 to 6 carbon atoms, and $R^3$, $R^4$, $R^5$, $R^7$, $R^8$ and $R^9$ each independently represent a methoxy group, an ethoxy group, a propoxy group, a butoxy group, an octoxy group, a lauryloxy group, a phenoxy group, a benzyloxy group, a methyl group, an ethyl group, a propyl group, a butyl group, a cyclohexyl group, a phenyl group, or a benzyl group, provided that at least one of $R^3$, $R^4$ and $R^5$ or at least one of $R^7$, $R^8$ and $R^9$ is a methoxy group, an ethoxy group, a propoxy group, a butoxy group, an octoxy group, a lauryloxy group, a phenoxy group, or a benzyloxy group;

a molar fraction of the crosslinked structural unit (a1) to the structural unit (a) is in a range from 0.05 to 0.90; 1 to 20 of the silane-based functional groups (c) are contained per molecule; and a number average molecular weight Mn is 500 to 100,000, and a molecular weight distribution (Mw/Mn) represented by a ratio of a weight average molecular weight Mw to the number average molecular weight Mn is 30.0 or less.

The modified vinylaromatic copolymer may include one or more copolymers each represented by any of the following formulae (2) to (13):

[C3]

(2)
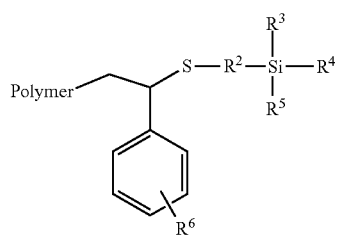

(3)
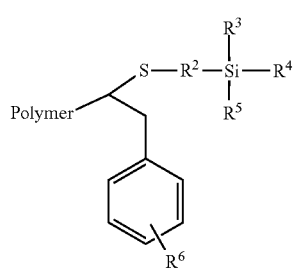

(4)
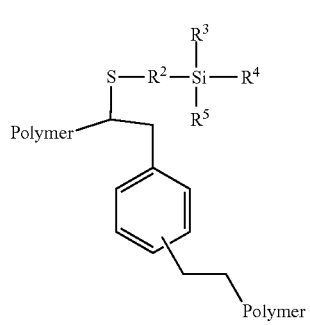

(5)
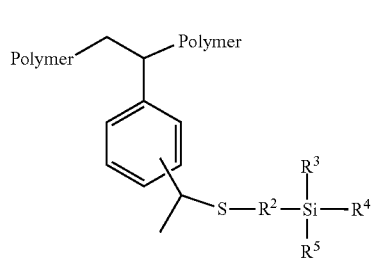

(6)
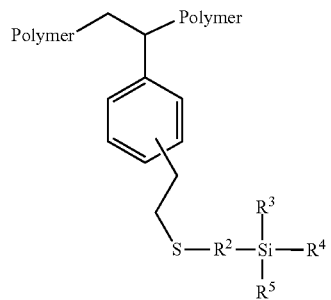

(7)
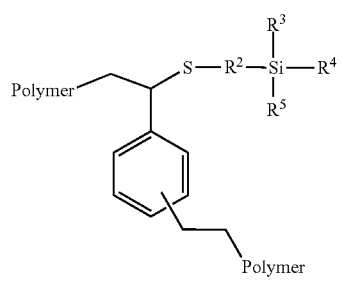

[C4]

(8)
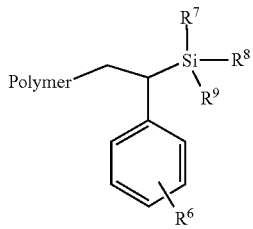

(9)
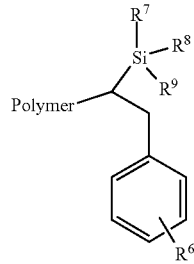

(10)
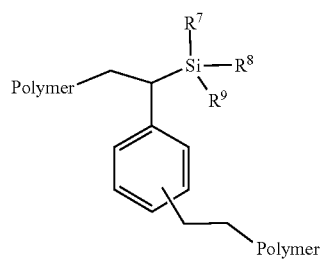

-continued

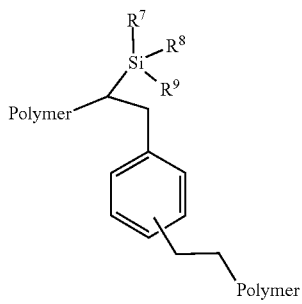

(11)

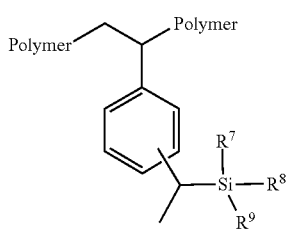

(12)

(13)

wherein $R^2$ represents a divalent alkylene group having 1 to 6 carbon atoms, $R^3$, $R^4$ and $R^5$ have the same meanings as in the formula (c1), $R^6$ is an alkyl group having 1 to 6 carbon atoms, a vinyl group, or hydrogen, Polymer is a copolymer chain, and $R^7$, $R^8$ and $R^9$ have the same meanings as in the formula (c2), provided that each benzene ring in the formulae can be any aromatic ring.

Examples of the structural unit (b) derived from a monovinylaromatic compound include a structural unit derived from one or more monomers selected from the group consisting of styrene, vinylnaphthalene, vinylbiphenyl, m-methylstyrene, p-methylstyrene, o,p-dimethylstyrene, m-ethylvinylbenzene, indene, and p-ethylvinylbenzene.

The present invention is a method for producing the modified vinylaromatic copolymer from a polyfunctional vinylaromatic copolymer and a silane-based compound, wherein the polyfunctional vinylaromatic copolymer contains 0.5% by mol or more and 95.0% by mol or less of the structural unit (a) derived from a divinylaromatic compound and 5.0% by mol or more and 99.5% by mol or less of the structural unit (b) derived from a monovinylaromatic compound;

the structural unit (a) at least partially includes the crosslinked structural unit (a1) and the following vinyl group-containing structural unit (a2):

[C5]

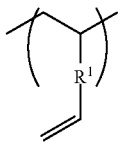

(a2)

wherein $R^1$ represents an aromatic hydrocarbon group having 6 to 30 carbon atoms;
a molar fraction of the crosslinked structural unit (a1) to the structural unit (a) is in a range from 0.05 to 0.90;
a molar fraction of the vinyl group-containing structural unit (a2) to the sum of the structural units (a) and (b) is in a range from 0.001 to 0.80;
the polyfunctional vinylaromatic copolymer has a Mn of 300 to 50,000 and a Mw/Mn of 20.0 or less;
the silane-based compound is any silane-based compound represented by the following formula (15) and/or formula (16):

[C6]

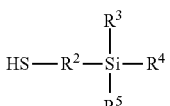

(15)

(16)

wherein $R^2$, $R^3$, $R^4$ and $R^5$ have the same meanings as in the formula (c1), and $R^6$, $R^7$ and $R^8$ have the same meanings as $R^7$, $R^8$ and $R^9$ in the formula (c2); and
the polyfunctional vinylaromatic copolymer and the silane-based compound are dissolved in a hydrocarbon-based solvent and added at a temperature of 0 to 150° C. in the presence of a catalyst.

The present invention further relates to a modified conjugated diene-based copolymer obtained by reacting the modified vinylaromatic copolymer (A) as a modifying agent with a polymer of a conjugated diene compound (B) having an active terminal, or a copolymer of a conjugated diene compound (B) having an active terminal and an aromatic vinyl compound (C).

The modified conjugated diene-based copolymer may contain 0.001 to 6% by weight of a structural unit (A1) derived from the modified vinylaromatic copolymer (A), 29 to 99.999% by weight of a structural unit (B1) derived from the conjugated diene compound (B) and 0 to 70% by weight of a structural unit (C1) derived from the aromatic vinyl compound (C), and an area of a region corresponding to a number average molecular weight (Mn) three times or more of the number average molecular weight (Mn) at a peak at the lowest molecular weight side may be 10% or more based on a total area of 100% in a differential molecular weight distribution curve obtained by gel permeation chromatography (GPC) measurement.

The present invention also relates to a modified conjugated diene-based copolymer composition obtained by compounding at least one reinforcing filling agent selected from the group consisting of a filler or a silica-based inorganic filling agent, metal oxide, metal hydroxide and carbon black to the modified conjugated diene-based copolymer, and the composition can further contain a crosslinking agent.

The present invention also relates to a crosslinked rubber product obtained by crosslinking the modified conjugated diene-based copolymer composition. The present invention also relates to a tire member including the crosslinked rubber product.

The present invention further relates to the modified vinylaromatic copolymer containing the structural unit (a) derived from a divinylaromatic compound and the structural unit (b) derived from a monovinylaromatic compound, wherein 95% by mol or more of the structural unit (a) is the crosslinked structural unit (a1); and two or more terminals are each modified by a modification group having at least one functional group selected from the group consisting of an amino group, an alkoxysilyl group, and a hydroxyl group.

The modified vinylaromatic copolymer preferably satisfies any one or more of the following: 0.5 to 95.0% by mol of the structural unit (a) is contained and 5.0 to 99.5% by mol of the structural unit (b) is contained, based on the total amount of the structural unit (a) and the structural unit (b); a number average molecular weight Mn is 500 to 50,000 and a molecular weight distribution (Mw/Mn) is 10.0 or less; the average number of functional groups per molecule is in a range from 2 to 20; or the monovinylaromatic compound is one or more monomers selected from the group consisting of styrene, vinylnaphthalene, vinylbiphenyl, m-methylstyrene, p-methylstyrene, o,p-dimethylstyrene, m-ethylvinylbenzene, indene, and p-ethylvinylbenzene.

The present invention also relates to a method for producing the modified vinylaromatic copolymer, including a polymerization step of copolymerizing the divinylaromatic compound with the monovinylaromatic compound, or the divinylaromatic compound and the monovinylaromatic compound with a monomer anionically copolymerizable with these compounds, by use of an alkali metal compound or an alkaline earth metal compound as an anionic polymerization initiator, to obtain a vinylaromatic copolymer having a branched structure and an active terminal, and a terminal modification step of reacting a compound having at least one functional group selected from the group consisting of an amino group, an alkoxysilyl group, and a hydroxyl group, or a precursor compound thereof with the active terminal of the vinylaromatic copolymer, to form a functional group.

The present invention also relates to a modified conjugated diene-based copolymer obtained by reacting the modified vinylaromatic copolymer with a polymer of a conjugated diene compound, or a copolymer of a conjugated diene compound and an aromatic vinyl compound.

The modified conjugated diene-based copolymer preferably contains 0.001 to 6% by weight of a structural unit (A1) derived from a modified vinylaromatic copolymer, 29 to 99.999% by weight of a structural unit (B1) derived from a conjugated diene compound, and 0 to 70% by weight of a structural unit (C1) derived from an aromatic vinyl compound, or preferably exhibits an area of a region corresponding to a number average molecular weight (Mn) three times or more of the number average molecular weight (Mn) at a peak at the lowest molecular weight side, of 10% or more, based on a total area of 100% in a differential molecular weight distribution curve obtained by GPC measurement.

The present invention further relates to a rubber composition containing 0.5 to 200 parts by weight of at least one reinforcing filling agent selected from the group consisting of a silica-based inorganic filling agent, metal oxide, metal hydroxide, and carbon black based on 100 parts by weight of the modified conjugated diene-based copolymer, and the rubber composition can further contain a crosslinking agent.

The present invention also relates to a crosslinked rubber product obtained by crosslinking the rubber composition, and a tire member including the crosslinked rubber product.

Advantageous Effects of Inventions

The modified vinylaromatic copolymer of the present invention can be used as a raw material of a modified conjugated diene-based copolymer. Furthermore, a crosslinked rubber composition obtained by incorporating a filler into the modified conjugated diene-based copolymer followed by crosslinking has excellent filler dispersibility and excellent mechanical strength and wear resistance, and is thus useful in an elastomer material for tires (in particular, tire treads), antiseismic rubber, rubber hoses, rubber rollers, footwear materials, and the like. The composition can be applied to a molding material, a resin modifier, and the like. The composition can be provided as a dielectric material, an insulating material, a heat-resistant material, a structural material, or the like in the fields of electrical and electronic industries, spacecraft and aircraft industries, and the like.

A film and a sheet each coated with a curable resin composition containing the modified vinylaromatic copolymer of the present invention not only can be suitably used in a plastic optical component, a touch panel, a flat display, a film liquid crystal device, and the like, but also can be used as a modifier for modification of characteristics such as heat resistance, dielectric characteristics, and optical characteristics of a thermoplastic resin or a curable resin composition for use as a main material for films, sheets, and prepregs. The curable resin composition not only can be processed into a film, a sheet, and a prepreg, and then used, but also can be used in any of various optical devices including an optical waveguide and an optical lens.

BRIEF DESCRIPTION OF DRAWING

FIGURE is a GPC chart of a modified conjugated diene-based copolymer.

DESCRIPTION OF EMBODIMENTS

The modified vinylaromatic copolymer (hereinafter, also referred to as "modified copolymer" or "copolymer") of the present invention is a modified vinylaromatic copolymer containing a structural unit (a) derived from a divinylaromatic compound and a structural unit (b) derived from a monovinylaromatic compound, wherein the structural unit (a) at least partially includes the crosslinked structural unit (a1), and one or more terminals of the copolymer, preferably one or more are each modified by a modification group having at least one functional group selected from the group consisting of an amino group, a hydroxyl group, and an alkoxysilyl group.

A modified vinylaromatic copolymer (hereinafter, also referred to as "modified copolymer" or "copolymer A".) modified by a modification group including an alkoxysilyl group is described. (First aspect)

The modified vinylaromatic copolymer contains 0.5 to 95.0% by mol of a structural unit (a) derived from a divinylaromatic compound and contains 5.0 to 99.5% by mol or less of a structural unit (b) derived from a monovinylaromatic compound. The structural unit (a) at least partially includes the crosslinked structural unit (a1).

The copolymer further includes the alkoxysilyl group represented by the formula (c1) or (c2) in a side chain or at a terminal. Herein, at least one in $R^3R^4R^5$ or at least one in $R^7R^8R^9$ is an alkoxy group. Herein, the alkoxy group is a group represented by RO—, and R is an alkyl group, an aralkyl group, or an aryl group, and preferably a C1 to 12 alkyl group, a benzyl group, or a phenyl group.

The alkoxysilyl group is a silane-based functional group, and is also referred to as "silane-based functional group (c)" or "structural unit (c)".

The modified vinylaromatic copolymer has a number average molecular weight Mn of 500 to 100,000 and a Mw/Mn of 30.0 or less.

The molar fraction of the crosslinked structural unit (a1) in the structural unit (a) is in a range from 0.05 to 0.90, and the number of the structural units (c), per molecule, is in a range from 1 to 20, and preferably 2 to 20.

The molar fraction (also referred to as "degree of crosslinking") of the crosslinked structural unit (a1) to the structural unit (a) is in a range from 0.05 to 0.90, and a preferable lower limit is 0.06, and more preferably 0.07. A preferable upper limit is 0.80, more preferably 0.70, particularly preferably 0.60, most preferably 0.50, and optimally in a range from 0.20 to 0.50. If the molar fraction is less than 0.05, the copolymer is low in degree of crosslinking, to result in a tendency to easily cause a crosslinking reaction in a molecule of the copolymer to occur in introduction of the structural unit (c), leading to generation of microgel in copolymerization with, for example, a conjugated diene compound. On the other hand, if the molar fraction is more than 0.90, an increase in molecular weight of the copolymer by itself is caused to result in a tendency to broaden a molecular weight distribution, thereby resulting in a tendency to cause deterioration in wear resistance.

The modified vinylaromatic copolymer of the present invention can be obtained by reacting a non-modified polyfunctional vinylaromatic copolymer with any silane-based compound represented by the formula (15) and/or formula (16).

In the formula (15) and formula (16), $R^2$ represents a divalent alkylene group having 1 to 6 carbon atoms, and $R^3$, $R^4$, $R^5$, $R^6$, $R^7$ and $R^8$ each independently represent a methoxy group, an ethoxy group, a propoxy group, a butoxy group, an octoxy group, a lauryloxy group, a phenoxy group, a benzyloxy group, a methyl group, an ethyl group, a propyl group, a butyl group, a cyclohexyl group, a phenyl group, or a benzyl group, provided that at least one of $R^3$, $R^4$ and $R^5$ may be a methoxy group, an ethoxy group, a propoxy group, a butoxy group, an octoxy group, a lauryloxy group, a phenoxy group, or a benzyloxy group.

Examples of the silane-based compound represented by the formula (15) include mercaptomethylenemethyldiethoxysilane, mercaptomethylenetriethoxysilane, 2-mercaptoethyltrimethoxysilane, 2-mercaptoethyltriethoxysilane, 2-mercaptoethylmethoxydimethylsilane, 2-mercaptoethylethoxydimethylsilane, 3-mercaptopropyltrimethoxysilane, 3-mercaptopropyltriethoxysilane, 3-mercaptopropyldimethoxymethylsilane, 3-mercaptopropyldiethoxymethylsilane, 3-mercaptopropyldimethoxyethylsilane, 3-mercaptopropyldiethoxyethylsilane, 3-mercaptopropylmethoxydimethylsilane, and 3-mercaptopropylethoxydimethylsilane. These silane compounds may be used singly or in combinations of two or more.

A mercapto group (—SH) in the silane-based compound represented by the formula (15) is subjected to a radical addition reaction with a carbon-carbon unsaturated bond included in the polyfunctional vinylaromatic copolymer, to thereby obtain the modified vinylaromatic copolymers represented by the formulae (2) to (7), each having a structural unit (c) derived from the silane-based compound.

Examples of the silane-based compound represented by the formula (16) include alkoxysilanes such as trimethoxysilane, triethoxysilane, dimethoxymethylsilane, dimethoxychloromethylsilane, methoxydimethylsilane, dimethoxyphenylsilane, and 1,3,3,5,5,7,7-heptamethyl-1,1-dimethoxytetrasiloxane. These silane compounds may be used singly or in combinations of two or more. Among these, dimethoxymethylsilane, diethoxymethylsilane, trimethoxysilane, and triethoxysilane are preferable.

A hydrosilyl group (—SiH) in the silane-based compound is, for example, added (hydrosilylated) to a non-modified vinylaromatic copolymer having a carbon-carbon unsaturated bond in the presence of a catalyst including a Group 8 transition metal, a quinone compound having two or more organic groups each having 3 or more carbon atoms, and a phenol-based compound having at least one functional group selected from the group consisting of an ester group, an ether group, a thioether group, an amide group, a urea group, and a urethane group in its structure, to thereby obtain specifically the modified vinylaromatic copolymers represented by the formulae (8) to (13), each having a structural unit (c) derived from the silane-based compound.

In the formulae (2) to (13), —$R^2$—Si—$R^3R^4R^5$ or —Si—$R^7R^8R^9$ is referred to as "silane-based functional group (c)" or "structural unit (c)". Polymer is a copolymer chain, and a tertiary carbon-containing group and a secondary carbon-containing group, which are located between the copolymer chain and the silane-based functional group (c), are each a group generated from a terminal, a side chain, and/or the center of the copolymer chain. A benzene ring positioned between the silane-based functional group (c) and the copolymer chain is included in a unit generated from the copolymer chain, and thus also partially includes the copolymer chain, and the benzene ring may be any other aromatic ring.

The average number of the structural units (c) per molecule is 1 to 20, preferably 1 to 15, more preferably 1 to 10, and further preferably 1 to 9. If the number is less than 1, a rubber composition to be formed is low in affinity with the filler (C) and the rubber composition cannot be improved in filler dispersibility, and, for example, no enhancement in wear resistance and no enhancements in physical properties such as handling stability may be attained and dry-grip performance and wet-grip performance may be impaired. On the contrary, if the number is more than 20, even a crosslinked product obtained from the rubber composition tends to be deteriorated, for example, in wear resistance or physical properties such as wet-grip performance.

Although the detail mechanism is not clear, it is presumed that a proper amount of such a functional group is introduced into the modified vinylaromatic copolymer to thereby allow a modified conjugated diene-based copolymer (hereinafter, also referred to as "diene-based copolymer") to be easily collected in the vicinity of a reinforcing filling agent, to result in an increase in reinforcing effect of the reinforcing filling agent, leading to an enhancement in wear resistance of a crosslinked product to be obtained. It is also presumed that the modified vinylaromatic copolymer is mediated to result in an enhancement in affinity between the diene-based copolymer and the reinforcing filling agent, and a dispersing state of each component such as the reinforcing filling agent in the rubber composition is ideal for enhancements in physical properties (for example, enhancement in wear resistance, enhancement in handling stability, dry-grip performance, and wet-grip performance) of a crosslinked product to be obtained. It is presumed that, on the contrary, if the modified vinylaromatic copolymer is so increased in number of functional groups, the modified vinylaromatic copolymer in the diene-based copolymer excessively strongly adheres to the reinforcing filling agent, to result in deterioration in dispersibility of the reinforcing filling agent, not contributing to enhancements in properties (wear resistance, strength) of a crosslinked product including the diene-based copolymer and the reinforcing filling agent.

It is presumed that, on the contrary, if the modified copolymer is so increased in number of functional groups, the copolymer adsorbing to the reinforcing filling agent is excessively strongly adsorbed, to result in deterioration in dispersibility of the reinforcing filling agent, and the modified vinylaromatic copolymer does not contribute to enhancements in properties (wear resistance, strength) of a crosslinked product including the diene-based copolymer and the reinforcing filling agent.

The average number of functional groups per molecule in the copolymer of the present invention can be determined by the following expression.

(Average number of functional groups per molecule)=[(Number average degree of polymerization)*(Average molecular weight of one repeating unit)]/(Equivalent of functional group)

The equivalent of functional group means the mass of a divinylaromatic compound unit and a monovinylaromatic compound which are bound to one functional group. The equivalent of functional group can be calculated from the ratio of the area of a functional group-derived peak to the area of a polymer main chain-derived peak by use of $^1$H-NMR or $^{13}$C-NMR. The functional group-derived peak refers to an alkoxy group-derived peak.

In a method for producing the modified vinylaromatic copolymer of the present invention, the amount of any silane-based compound represented by the formula (15) and/or formula (16) used is preferably 1 to 200 parts by mass, more preferably 1 to 100 parts by mass, further preferably 1 to 60 parts by mass, more preferably 1 to 50 parts by mass, and further preferably 1 to 40 parts by mass based on 100 parts by mass of the polyfunctional vinylaromatic copolymer.

In a case where the amount used is more than 200 parts by mass, the dispersibility effect of the reinforcing filling agent tends to be inferior, processability tends to be deteriorated, and also wear resistance of a crosslinked product to be obtained tends to be deteriorated. In a case where the amount used is less than 1 part by mass, the dispersibility effect of the reinforcing filling agent tends to be inferior, and the dispersing state of the reinforcing filling agent or the like tends not to be ideal for enhancements in physical properties of a crosslinked product to be obtained.

The amount of the silane-based compound added to the modified vinylaromatic copolymer can be determined using various analysis instruments for nuclear magnetic resonance spectroscopy and the like.

The method for adding the silane-based compound represented by the formula (15) to the polyfunctional vinylaromatic copolymer is not limited, and, for example, a method can be adopted which involves adding the silane-based compound and furthermore, if necessary, a radical catalyst to the polyfunctional vinylaromatic copolymer and heating them in the presence or absence of an organic solvent. A radical generator here used is not limited, and, for example, an organic peroxide, an azo-based compound, and hydrogen peroxide, which are commonly commercially available, can be used.

Examples of the organic peroxide include methyl ethyl ketone peroxide, cyclohexanone peroxide, 3,3,5-trimethylcyclohexanone peroxide, methylcyclohexanone peroxide, acetylacetone peroxide, 1,1-bis(t-butylperoxy)-3,3,5-trimethylcyclohexane, 1,1-bis(t-butylperoxy)cyclohexane, 1,1-bis(t-hexylperoxy)cyclohexane, 2,2-bis(t-butylperoxy)butane, t-butyl hydroperoxide, cumene hydroperoxide, diisopropylbenzene hydroperoxide, p-menthane hydroperoxide, 2,5-dimethylhexane 2,5-dihydroperoxide, 1,1,3,3-tetramethylbutyl hydroperoxide, di-t-butyl peroxide, t-butylcumyl peroxide, dicumyl peroxide, bis(t-butylperoxyisopropyl)benzene, 2,5-dimethyl-2,5-di(t-butylperoxy)hexane, 2.5-hexanoyl peroxide, lauroyl peroxide, succinic acid peroxide, benzoyl peroxide and a substituted product thereof, 2,4-dichlorobenzoyl peroxide, m-toluoyl peroxide, diisopropyl peroxydicarbonate, t-butyl-2-ethylhexanoate, di-2-ethylhexyl peroxydicarbonate, dimethoxyisopropyl peroxycarbonate, di(3-methyl-3-methoxybutyl)peroxydicarbonate, t-butylperoxyacetate, t-butyl peroxypivalate, t-butylperoxy neodecanoate, t-butylperoxy octanoate, t-butylperoxy 3,3,5-trimethylhexanoate, t-butyl peroxylaurate, t-butyl peroxycarbonate, t-butyl peroxybenzoate, and t-butyl peroxyisobutyrate.

Examples of the azo-based compound include 2,2'-azobisisobutyronitrile, 1,1'-azobis(cyclohexane-1-carbonitrile), 2,2'-azobis(2-methylbutyronitrile), 2,2'-azobis(2,4-dimethylvaleronitrile), 2,2'-azobis(2,4-dimethyl-4-methoxyvaleronitrile), 2,2'-azobis(2-(2-imidazolin-2-yl)propane), 2,2'-azobis(2,4,4-trimethylpentane), 2,2'-azobis(2-methylpropane), 2,2'-azobis(2-hydroxymethylpropionitrile), 4,4'-azobis(4-cyanovaleric acid), dimethyl 2,2'-azobis(2-methylpropionate), 2-cyano-2-propylazoformamide, and 2-phenylazo-4-methoxy-2,4-dimethylvaleronitrile.

Examples of the organic solvent used in the above method generally include a hydrocarbon-based solvent and a halogenated hydrocarbon-based solvent. Among these organic solvents, a hydrocarbon-based solvent such as n-butane, n-hexane, n-heptane, cyclohexane, methylcyclohexane, ethylcyclohexane, dimethylcyclohexane, decalin, benzene, toluene, or xylene is preferable.

When a reaction for addition of a modification compound is performed in the above method, an anti-aging agent may also be added from the viewpoint of, for example, suppression of a side reaction.

Examples of a preferable anti-aging agent here used include 2,6-di-t-butyl-4-methylphenol (BHT), 2,2'-methylenebis(4-methyl-6-t-butylphenol), 4,4'-thiobis(3-methyl-6-t-butylphenol), 4,4'-butylidenebis(3-methyl-6-t-butylphenol) (AO-40), 3,9-bis[1,1-dimethyl-2-[3-(3-t-butyl-4-hydroxy-5-methylphenyl)propionyloxy]ethyl]-2,4,8,10-tetraoxaspiro[5.5]undecane (AO-80), 2,4-bis[(octylthio)methyl]-6-methylphenol (Irganox 1520L), 2,4-bis[(dodecylthio)methyl]-6-methylphenol (Irganox 1726), 2-[1-(2-hydroxy-3,5-di-t-pentylphenyeethyl]-4,6-di-t-pentylphenyl acrylate (Sumilizer GS), 2-t-butyl-6-(3-t-butyl-2-hydroxy-5-methylbenzyl)-4-methylphenyl acrylate (Sumilizer GM), 6-t-butyl-4-[3-(2,4,8,10-tetra-t-butyldibenzo[d,f][1,3,2]dioxaphosphepin-6-yloxy)propyl]-2-methylphenol (Sumilizer GP), tris(2,4-di-t-butylphenyl)phosphite (Irgafos 168), dioctadecyl 3,3'-dithiobispropionate, hydroquinone, p-methoxyphenol, N-phenyl-N'-(1,3-dimethylbutyl)-p-phenylenediamine (Nocrac 6C), bis(2,2,6,6-tetramethyl-4-piperidyl)sebacate (LA-77Y), N,N-dioctadecylhydroxylamine (Irgastab FS042), and bis(4-t-octylphenyl)amine (Irganox 5057). The anti-aging agents may be used singly or in combinations of two or more.

The amount of the anti-aging agent added is preferably 0 to 10 parts by mass, and more preferably 0 to 5 parts by mass, based on 100 parts by mass of the non-modified polyfunctional vinylaromatic copolymer.

It is not desirable to perform the reaction for addition of the silane-based compound to the polyfunctional vinylaromatic copolymer only by heating without use of any radical generator. For example, in a case where the heating temperature is too low, such an addition reaction does not sufficiently occur and the average number of functional groups per molecule may be out of a desired range. In a case where the heating temperature is high, the addition reaction may progress, but a multimerization reaction of a polymer may also progress at the same time due to generation of radical on a polymer main chain, and thus the viscosity of the copolymer may be out of a desired range in a case where the Mw of the modified vinylaromatic copolymer is out of a desired range. In such a case where the temperature in the addition reaction is high, physical properties of a rubber composition for tires, to be obtained, may be adversely affected due to a reduction in reactivity with silica in a case where the copolymer is deteriorated in handleability due to a high viscosity. On the contrary, in a case where the addition reaction is performed using a radical generator, not only a side reaction such as a multimerization reaction is sufficiently suppressed even at a relatively low temperature, but also the addition reaction sufficiently progresses.

In a case where the molecular weight at the largest peak in terms of polystyrene as determined by GPC measurement, of the modified vinylaromatic copolymer, is defined as Mt, the proportion of a polymer having a molecular weight in a region corresponding to Mt×1.45 or more is preferably in a range from 0 to 40%, more preferably in a range from 0 to 30%, further preferably in a range from 0 to 20%, and particularly preferably in a range from 0 to 10% based on the total area of a GPC chromatogram obtained by GPC measurement, derived from the copolymer, of 100%.

The position at which a functional group is introduced into the modified vinylaromatic copolymer of the present invention may be a polymerization terminal or may be in a side chain of a polymer chain, and is preferably a side chain of a polymerization chain from the viewpoint that a plurality of functional groups can be easily introduced. The functional groups may be included singly or in combinations of two or more. Accordingly, the copolymer may be modified by one modification compound, or may be modified by two or more modification compounds.

The mixing ratio of the non-modified polyfunctional vinylaromatic copolymer to the silane-based compound represented by the formula (15) may be appropriately set so that, for example, the average number of functional groups per molecule in the copolymer is a desired value, and the non-modified polyfunctional vinylaromatic copolymer and the silane-based compound may be mixed so that the mass ratio (former/latter) is, for example, 0.3 to 100, and may be mixed so that the ratio is, for example, 0.3 to 50.

It is effective in the procedure for producing the copolymer of the present invention to perform a reaction for radical addition of the silane-based compound represented by the formula (15) at an appropriate reaction temperature for a sufficient reaction time. For example, the temperature in a reaction for adding the silane-based compound to the polyfunctional vinylaromatic copolymer is preferably 10 to 200° C., more preferably 50° C. to 180° C., and further preferably 50° C. to 140° C. The reaction time is preferably 1 to 200 hours, more preferably 1 to 100 hours, further preferably 1 to 50 hours, and still further preferably 1 to 25 hours.

The method for adding the silane-based compound represented by the formula (16) to the polyfunctional vinylaromatic copolymer is not limited, and a method can be adopted which involves adding (hydrosilylating) the silane-based compound to the polyfunctional vinylaromatic copolymer, for example, a non-modified vinylaromatic copolymer having an unsaturated group in the presence of a catalyst including a Group 8 transition metal, a quinone compound having two or more organic groups each having 3 or more carbon atoms, and a phenol-based compound having at least one functional group selected from the group consisting of an ester group, an ether group, a thioether group, an amide group, a urea group, and a urethane group in its structure.

The silane-based compound represented by the formula (16) is added (hydrosilylated) to the non-modified vinylaromatic copolymer having a carbon-carbon unsaturated bond, and serves to introduce a reactive silicon group into the non-modified vinylaromatic copolymer.

The ratio (molar ratio) of the silane-based compound represented by the formula (16) to the unsaturated group in the polyfunctional vinylaromatic copolymer (Molar number of silane-based compound represented by formula (16)/Molar number of unsaturated group) is an important factor for the amount of use of the silane-based compound, and the molar ratio is preferably 0.1 to 20, and more preferably 0.5 to 3.

The polyfunctional vinylaromatic copolymer is a polyfunctional vinylaromatic copolymer having at least one unsaturated group which can be subjected to addition reaction (hydrosilylation reaction) with a silicon hydrate group, in its molecule. The unsaturated group may be referred to as "hydrosilylation-active unsaturated group". The number of hydrosilylation-active unsaturated groups present in one molecule of the polyfunctional vinylaromatic copolymer is 1 to 20, preferably 1 to 15, still more preferably 1 to 10, and particularly preferably 1 to 9.

The catalyst used in addition (hydrosilylation) of the silane-based compound represented by the formula (16) to the polyfunctional vinylaromatic copolymer having a carbon-carbon unsaturated bond includes a Group 8 transition metal. Examples of the Group 8 transition metal include cobalt, nickel, ruthenium, rhodium, palladium, iridium, and platinum.

Examples of the catalyst including the Group 8 transition metal include a simple substance of the Group 8 transition metal, a salt thereof, or a complex thereof with an organic compound, and, for example, platinum supported on a carrier such as alumina, silica, or carbon black, chloroplatinic acid; a chloroplatinic acid complex of chloroplatinic acid with an alcohol, an aldehyde, a ketone, or the like; a platinum-olefin complex [for example, $Pt(CH_2=CH_2)_2(PPh_3)$, $Pt(CH_2=CH_2)_2Cl_2$]; a platinum-vinylsiloxane complex [$Pt\{(vinyl)Me_2SiOSiMe_2(vinyl)\}$, $Pt\{Me(vinyl)SiO\}_4$]; a platinum-phosphine complex [$Ph(PPh_3)_4$, $Pt(PBu_3)_4$]; and a platinum-phosphite complex [$Pt\{P(OPh)_3\}_4$] are preferable.

In addition, dicarbonyldichloroplatinum, a platinum-hydrocarbon composite described in U.S. Pat. Nos. 3,159,601 and 3,159,662 by Ashby, and a platinum-alkolate catalyst described in U.S. Pat. No. 3,220,972 by Lamoreaux are also preferable.

Moreover, a platinum chloride-olefin composite described in U.S. Pat. No. 3,516,946 by Modic is also preferable.

Chloroplatinic acid, a platinum-olefin complex, a platinum-acetylacetonate complex, and a platinum-vinylsiloxane complex are each more preferable as the catalyst including the Group 8 transition metal because of being relatively high in reaction activity.

The catalyst may be added singly or in combinations of a plurality thereof.

The ratio of the amount of addition of the catalyst to the amount of addition of the non-modified vinylaromatic copolymer having a carbon-carbon unsaturated bond is an important factor for the amount of addition of the catalyst, and the molar ratio (Molar number of catalyst/Molar number of unsaturated group) is preferably $10^{-1}$ to $10^{-8}$, and more preferably $10^{-3}$ to $10^{-6}$. In a case where the molar ratio (Molar number of catalyst/Molar number of unsaturated group) is less than $10^{-8}$, no hydrosilylation reaction may sufficiently progress. In a case where the molar ratio is more than $10^{-1}$, there may occur problems of, for example, an increase in raw material cost, and deteriorations in coloration and transparency of a product due to incorporation of the catalyst residue.

The method for adding the catalyst is preferably a method involving dissolving and adding the catalyst in and to any of various solvents from the viewpoint that, for example, the catalyst is stabilized and easily handled. The solvent for use in the case where the catalyst is dissolved and added in and to the solvent is not limited, and examples thereof include hydrocarbon-based solvents such as benzene, toluene, and xylene; halogenated hydrocarbons; alcohols; glycols; ethers; and esters.

The quinone compound is used in combination with the catalyst, and serves as a co-catalyst of the catalyst.

The quinone compound is not limited, and examples thereof include 2,5-di-tert-butyl-1,4-benzoquinone, 2,6-di-tert-butyl-1,4-benzoquinone, 1,4-benzoquinone, 2-methyl-1,4-benzoquinone, 2,6-dimethyl-1,4-benzoquinone, 2,3,5,6,-tetramethyl-1,4-benzoquinone, 2-tert-butyl-1,4-benzoquinone, 1,4-naphthoquinone, and 2-methyl-1,4-naphthoquinone (vitamin K3), and among these, 2,5-di-tert-butyl-1,4-benzoquinone and 2,6-di-tert-butyl-1,4-benzoquinone are preferable in terms of reactivity, suppression of coloration, and toxicity.

The method for adding the quinone compound into the reaction system may be a method involving adding directly the quinone compound, and is preferably a method involving dissolving the quinone compound in a solvent to provide a uniform diluted solution and then adding the solution because the quinone compound is easily handled and can be uniformly dispersed in the entire reaction liquid. The addition method may be performed collectively, in portions, or continuously.

The solvent for use in the case where the quinone compound is diluted with the solvent and then added is not limited, and examples thereof include hydrocarbon-based solvents such as benzene, toluene, xylene, and hexane, or halogenated hydrocarbons, alcohols, glycols, ethers, or esters.

As disclosed by Jean Fisher et al. (Chem. Eur. J., 4, 2008-2017, (1998)), in a case where an equal molar of a quinone compound (D) to that of a catalyst is added, the amount of addition of the quinone compound to the catalyst is small, and thus there may be a case where the effect of the present invention is not sufficiently achieved.

The ratio of the amount of addition of the quinone compound to the amount of addition of the non-modified vinylaromatic copolymer having a carbon-carbon unsaturated bond is also an important factor for the amount of addition of the quinone compound, and the molar ratio (Molar number of quinone compound/Molar number of unsaturated group) is preferably 0.00001 to 100-fold, more preferably 0.0001 to 10-fold, and particularly preferably 0.001 to 1-fold.

In the production method of the present invention, a phenol-based compound having at least one functional group selected from the group consisting of an ester group, an ether group, a thioether group, an amide group, a urea group, and a urethane group in its structure can be used.

It is considered that the phenol-based compound is used in combination with the catalyst and serves as a co-catalyst of the catalyst. The phenol-based compound can be added to thereby allow the hydrosilylation reaction to progress at a favorable reaction rate in a condition of addition of a small amount of oxygen, as compared with a conventional system of a catalyst and a single quinone compound. Furthermore, the occurrence of any by-product is suppressed, and the respective amounts of addition of the catalyst and the quinone compound can be decreased.

The phenol-based compound is not limited as long as it has at least one functional group selected from the group consisting of an ester group, an ether group, a thioether group, an amide group, a urea group, and a urethane group in its structure, and further preferably has an alkyl group having 1 to 20 carbon atoms, as a functional group, at each of the 2- and 6-positions to a phenolhydroxyl group, in its structure. Examples of such a compound include ester group-containing phenol-based compounds such as ethylenebis(oxyethylene)bis[3-(5-tert-butyl-4-hydroxy-m-tolyl) propionate], pentaerythritol tetrakis[3-(3,5-di-tert-butyl-4-hydroxyphenyl)propionate], octadecyl-3-(3,5-di-tert-butyl-4-hydroxyphenyl)propionate, isooctyl-3-(3,5-di-tert-butyl-4-hydroxyphenyl)propionate, and 2-tert-butyl-6-(3-tert-butyl-2-hydroxy-5-methylbenzyl)-4-methylphenyl acrylate; thioether group-containing phenol-based compounds such as thiodiethylenebis[3-(3,5-di-tert-butyl-4-hydroxyphenyl) propionate]; amide group-containing phenol-based compounds such as N,N'-hexane-1,6-diylbis[3-(3,5-di-tert-butyl-4-hydroxyphenyl)propionamide]; and ether group-containing phenol-based compounds such as 3,4-dihydro-2,5,7,8-tetramethyl-2-(4,8,12-trimethyltridecyl)-2H-benzopyran-6-ol, and among these, ethylenebis (oxyethylene)bis[3-(5-tert-butyl-4-hydroxy-m-tolyl) propionate], pentaerythritol tetrakis[3-(3,5-di-tert-butyl-4-hydroxyphenyl)propionate], and isooctyl-3-(3,5-di-tert-butyl-4-hydroxyphenyl)propionate are preferable.

The phenol-based compound may be used singly or may be a mixture of two or three thereof.

The method for adding the phenol-based compound into the reaction system may be a method involving adding directly the phenol-based compound, and is preferably a method involving heating and melting the phenol-based compound and adding it in the form of a liquid or a method involving dissolving the phenol-based compound in a solvent to provide a uniform diluted solution and then adding the solution, because the phenol-based compound can be uniformly dispersed in the entire reaction liquid. The addition method may be performed collectively, in portions, or continuously.

The solvent for use in the case where the phenol-based compound is diluted with the solvent and then added is not limited, and examples thereof include hydrocarbon-based solvents such as benzene, toluene, xylene, and hexane, or halogenated hydrocarbons, alcohols, glycols, ethers, or esters.

The ratio of the amount of addition of the phenol-based compound to the amount of addition of an organic polymer having an unsaturated group is also an important factor for the amount of addition of the phenol-based compound, and the molar ratio (Molar number of phenol-based compound/ Molar number of unsaturated group) is preferably 0.0002 to 1-fold, more preferably 0.001 to 0.5-fold, and particularly preferably 0.005 to 0.1-fold.

The hydrosilylation reaction may be performed even in a non-solvent system or in the presence of a solvent. The solvent for use in the hydrosilylation reaction is not limited, and examples thereof include hydrocarbons; halogenated hydrocarbons; ethers; and esters, and among these, heptane, hexane, benzene, toluene, xylene, and the like are preferable.

The hydrosilylation reaction is performed in an inert gas such as nitrogen or helium in order to ensure safety because a combustible substance is handled. Herein, oxygen is preferably mixed in such an inert gas as long as it imparts no explosive mixed composition, because of having the effect of promoting the hydrosilylation reaction.

The volume fraction of oxygen included in a gas phase portion in a reaction vessel is preferably 0.1% or more, and more preferably 0.5 to 10%. In a case where the volume fraction of oxygen is less than 0.1%, no effect of promoting the hydrosilylation reaction may be exerted. The reaction temperature in the hydrosilylation reaction is preferably 30° C. or more and 200° C. or less, and more preferably 50° C. or more and 150° C. or less. The reaction time is not limited, and is preferably 30 minutes or more and 15 hours or less, more preferably 30 minutes or more and 10 hours or less, and furthermore, most preferably 30 minutes or more and 6 hours or less.

The modified vinylaromatic copolymer of the present invention contains 0.5 to 95.0% by mol of the structural unit (a) derived from a divinylaromatic compound.

In a case where only the structural units (a) and (b) are included in the structural unit, the molar fraction of the structural unit (a) is 0.005 to 0.95 based on the sum of the structural units (a) and (b). The molar fraction is calculated by the following formula (7):

$$(a)/[(a)+(b)] \quad (7)$$

wherein (a): the molar fraction of the structural unit (a) derived from a divinylaromatic compound, and (b): the molar fraction of the structural unit (b) derived from a monovinylaromatic compound.

A preferable lower limit of the molar fraction is 0.006, and more preferably 0.007. A preferable upper limit is 0.80, more preferably 0.70, and optimally 0.01 to 0.60.

In a case where any structural unit other than the structural units (a) and (b) is included, a preferable lower limit of the content rate thereof is 0.2% by mol, more preferably 0.4% by mol, and further preferably 0.6% by mol. A preferable upper limit is 70% by mol, more preferably 60% by mol, and further preferably 50% by mol.

The modified vinylaromatic copolymer of the present invention contains 5.0 to 99.5% by mol of the structural unit (b) derived from a monovinylaromatic compound. The molar fraction is 0.05 to 0.995. A preferable lower limit is 0.20. A more preferable lower limit is 0.30. A preferable upper limit is 0.994, more preferably 0.993, and optimally 0.40 to 0.99.

The molar fraction of the structural unit (b) is calculated by the following formula (8) in a case where only the structural units (a), and (b) are included:

$$(b)/[(a)+(b)] \quad (8)$$

wherein (a) and (b) have the same meanings as in formula (7).

Even in a case where any structural unit other than the structural units (a) and (b) is included, a preferable molar fraction of the structural unit (b) is in the above range.

The structural unit (a) derived from a divinylaromatic compound contains a vinyl group as a branching component for exhibiting copolymerization reactivity with the conjugated diene-based compound, and on the other hand, the structural unit (b) derived from a monovinylaromatic compound does not have any vinyl group involving in a curing reaction, and thus imparts, for example, moldability and compatibility.

If the molar fraction of the structural unit (a) is less than 0.005, a cured product is insufficient in heat resistance, and if the molar fraction is more than 0.95, molding processability is deteriorated. If the molar fraction of the structural unit (b) is more than 0.995, heat resistance is deteriorated, and if the molar fraction is less than 0.05, molding processability is deteriorated.

The copolymer of the present invention can contain any other structural unit, in addition to the structural units. The detail of such other structural unit is understood from the description of the production method.

The copolymer of the present invention has an Mn (number average molecular weight in terms of standard polystyrene measured with gel permeation chromatography) of 500 to 100,000, preferably 600 to 50,000, more preferably 700 to 40,000, further preferably 800 to 30,000, most preferably 900 to 20,000, and optimally 900 to 10,000. If the Mn is less than 300, the amount of a monofunctional copolymer included in the copolymer is increased to result in a tendency to cause copolymerization reactivity with the conjugated diene compound to be deteriorated, and if the Mn is more than 100,000, not only gel is easily generated, but also molding processability and tensile break elongation tend to be deteriorated. The molecular weight distribution is 30.0 or less, preferably 25.0 or less, more preferably 1.3 to 20.0, and optimally 2.0 to 15.0. If the Mw/Mn is more than 30.0, not only processing characteristics of copolymerized rubber tends to be worsened, but also gel tends to be generated.

The copolymer of the present invention is soluble in a solvent selected from toluene, xylene, tetrahydrofuran, dichloroethane, or chloroform, and is advantageously soluble in all such solvents. In order that the copolymer is a polyfunctional copolymer soluble in such solvents, divinylbenzene is required to have a vinyl group not partially crosslinked and have a proper degree of branching. Such a copolymer or a production method thereof is known in, for example, Patent Literatures described above. The solubility in 100 g of such a solvent is preferably 50 g or more, and more preferably 80 g or more.

Next, a method for producing a non-modified polyfunctional vinylaromatic copolymer (also referred to as a "non-modified copolymer"), which is a precursor of the modified vinylaromatic copolymer of the present invention, is described. The copolymer of the present invention can be advantageously produced in this production method.

In the method for producing the non-modified copolymer, polymerization raw materials including a divinylaromatic compound and a monovinylaromatic compound are polymerized in a homogeneous solvent containing the polymerization raw materials dissolved in a solvent with a dielectric constant of 2.0 to 15.0 at a temperature of 0 to 120° C. in the presence of a Lewis acid catalyst.

The divinylaromatic compound causes the copolymer to branch and makes it polyfunctional, and also plays a significant role as a crosslinking component for the generation of a branch in the copolymerization of the copolymer with the conjugated diene compound. Examples of the divinylaromatic compounds to be used preferably include divinylbenzene (including each isomer), divinylnaphthalene (including each isomer), and divinylbiphenyl (including each isomer), but are not limited thereto. These may be used alone or two or more kinds thereof may be used in combination. The divinylaromatic compound is more preferably divinylbenzene (m-isomer, p-isomer, or an isomer mixture thereof) from the viewpoint of fabricability.

The monovinylaromatic compound improves solvent solubility, compatibility, and processability of the copolymer. Examples of the monovinylaromatic compounds include vinylaromatic compounds such as styrene, vinylnaphthalene, vinylbiphenyl, and α-methylstyrene; nuclear alkyl-substituted vinylaromatic compounds such as o-methylstyrene, m-methylstyrene, p-methylstyrene, o,p-dimethylstyrene, o-ethylvinylbenzene, m-ethylvinylbenzene, and p-ethylvinylbenzene; and cyclic vinylaromatic compounds such as indene, acenaphthylene, benzothiophene, and coumarone, but are not limited thereto. To prevent gelation of the copolymer and to improve solubility in the solvent, compatibility, and processability, styrene, ethylvinylbenzene (including each isomer), ethylvinylbiphenyl (including each isomer), ethylvinylnaphthalene (including each isomer), and indene are particularly preferably used from the viewpoint of cost and ease of availability. The monovinylaromatic compound is more preferably styrene, ethylvinylbenzene (m-isomer, p-isomer, or an isomer mixture thereof), or indene from the viewpoint of compatibility and cost.

In the production method, in addition to divinylaromatic compounds and monovinylaromatic compounds, other monomers such as trivinylaromatic compounds, trivinyl aliphatic compounds, divinyl aliphatic compounds and monovinyl aliphatic compounds, and cycloolefin compounds are used to the extent that the effects of the present invention are not impaired, and a structural unit (e) derived from these other monomers can be introduced into the copolymer.

Specific examples of the other monomers preferably include 1,3,5-triivinylbenzene, 1,3,5-trivinylnaphthalene, 1,2,4-trivinylcyclohexane, ethylene glycol diacrylate, butadiene, isobutylene, diisobutylene, 2-methyl-1-butene, 2-methyl-1-pentene, 1-methyl-1-cyclopentene, 2-methyl-1-hexene, 1-methyl-1-cyclohexene, 2-methyl-1-heptene, 2-methyl-1-octene, 2-methyl-1-nonene, 2-methyl-1-decene, 2-methyl-1-dodecene, 2-methyl-1-tetradecene, 2-methyl-1-hexadecene, 2-methyl-1-octadecene, 2-methyl-1-eicosene, 2-methyl-1-docosene, and 2-methyl-1-tetracosene, but are not limited thereto. These can be used alone, or two or more kinds thereof may be used in combination. The other monomers may be used within a range of less than 30% by mol of all monomers. Therefore, the amount of the structural unit (e) derived from other monomers is within a range of less than 30% by mol based on the total amount of the structural units in the copolymer.

In the method for producing a non-modified copolymer, monomers including a divinylaromatic compound and a monovinylaromatic compound, or further including other monomers if necessary, are polymerized in the presence of a Lewis acid catalyst, thereby producing a copolymer.

The proportion of each component used as a monomer based on 100% by mol in total of the divinylaromatic compound and the monovinylaromatic compound may be in the following range.

Divinylaromatic compound; 0.5 to 95% by mol, preferably 0.3 to 65% by mol, more preferably 0.4 to 55% by mol, and optimally 5 to 50% by mol.

Monovinylaromatic compound; 7 to 99% by mol, preferably 10 to 95% by mol, and more preferably 15 to 90% by mol.

As the Lewis acid catalyst used here, any compound can be used without particular limitation as long as it is a compound composed of a metal ion (acid) and a ligand (base) and can receive an electron pair. Among Lewis acid catalysts, from the viewpoint of thermal decomposition resistance of a copolymer to be obtained, metal fluorides or complexes thereof are preferable, and particularly bivalent to hexavalent metal fluorides such as B, Al, Ga, In, Si, Ge, Sn, Pb, Sb, Bi, Ti, W, Zn, Fe and V or complexes thereof are preferable. These catalysts can be used alone, or two or more kinds thereof may be used in combination. From the viewpoint of controlling the molecular weight and the molecular weight distribution of the copolymer to be obtained and the polymerization activity, an ether complex of boron trifluoride is most preferably used. Here, examples of ethers in the ether complex include diethyl ether and dimethyl ether.

The Lewis acid catalyst may be used within a range from 0.001 to 100 mol, more preferably 0.01 to 50 mol, and most preferably 0.1 to 10 mol, based on a total of 100 mol of all monomer components. If the amount thereof exceeds 100 mol, the polymerization rate becomes too large, and thus it becomes difficult to control the molecular weight distribution. If the amount thereof is less than 0.001 mol, the polymerization rate becomes too small, and thus an increase in cost is caused to make it unsuitable for industrial implementation.

In the production method, one or more Lewis base compounds can be used as a cocatalyst if desired.

Specific examples of the Lewis base compounds include the following compounds:
1) ester compounds such as ethyl acetate, butyl acetate, phenyl acetate, and methyl propionate,
2) thioester compounds such as methylmercaptopropionic acid and ethylmercaptopropionic acid,
3) ketone compounds such as methyl ethyl ketone, methyl isobutyl ketone, and benzophenone,
4) amine compounds such as methylamine, ethylamine, propylamine, butylamine, cyclohexylamine, methylethylamine, dimethylamine, diethylamine, dipropylamine, and dibutylamine,
5) ether compounds such as diethyl ether and tetrahydrofuran,
6) thioether compounds such as diethyl sulfide and diphenyl sulfide, and
7) phosphine compounds such as tripropylphosphine, tributylphosphine, trihexylphosphine, tricyclohexylphosphine, trioctylphosphine, vinylphosphine, propenylphosphine, cyclohexenylphosphine, dialkenylphosphine, and trialkenylphosphine.

Among these, ester compounds and ketone compounds are preferably used because they synergistically act with a Lewis acid catalyst and can easily control the polymerization rate and the molecular weight distribution of the polymer.

One or more kinds of these Lewis base compounds can be used.

The Lewis base compound, which is a cocatalyst component, is coordinated with a Lewis acid catalyst, which is a counter anion, during the polymerization reaction to control the interaction between a carbocation as an active species and the counter anion, thereby adjusting a relative reaction frequency between the growth reaction and the chain transfer reaction and contributing to the quantity control. Generally, the addition of the Lewis base compound strengthens the interaction between the carbocation as an active species and the counter anion, and thus the divinylaromatic compound and the monovinylaromatic compound are prevented from causing an excessive insertion reaction and the chain transfer reaction to occur after the insertion reaction of the monomer is made easy to occur to suppress an increase in the molecular weight, facilitating the control of the molecular weight.

The amount of the Lewis base compound as a cocatalyst is preferably 0.005 to 500 mol, more preferably 0.01 to 200 mol, and more preferably 0.1 to 100 mol based on a total of 100 mol of all monomers. Within the above range, while the polymerization rate is appropriately maintained, the selectivity of the reaction between monomers is enhanced to result in excellent productivity and also suppression of an excessive increase or decrease in the molecular weight, thereby obtaining a copolymer with excellent mold processability.

In the polymerization reaction, polymerization raw materials including a mixture of the monomers and a Lewis acid catalyst are cationically copolymerized in a homogeneous solvent containing the polymerization raw materials dissolved in a solvent with a dielectric constant of 2.0 to 15.0 at a temperature of 20 to 120° C.

The solvent may be an organic solvent which is a compound that does not essentially inhibit cationic polymerization and dissolves a catalyst, a polymerization additive, a cocatalyst, a monomer, and a vinylaromatic copolymer to be generated to form a homogeneous solution, and which has a dielectric constant within a range from 2.0 to 15.0. Such a solvent can be used alone, or two or more kinds thereof may be used in combination. If the dielectric constant of the solvent is less than 2.0, this is not preferable since the molecular weight distribution are broadened, and if the dielectric constant exceeds 15.0, the polymerization rate decreases.

The organic solvent is particularly preferably toluene, xylene, n-hexane, cyclohexane, methylcyclohexane, or ethylcyclohexane from the viewpoint of balance between polymerization activity and solubility. In consideration of the viscosity of the polymerization solution to be obtained and ease of heat removal, the amount of the solvent used is determined so that the concentration of the copolymer in the polymerization solution is 1 to 90 wt %, preferably 10 to 80 wt %, and particularly preferably 20 to 70 wt % at the completion of polymerization. In a case where the concentration is less than 1 wt %, an increase in cost is caused due to the low polymerization efficiency, and in a case where the concentration exceeds 90 wt %, the molecular weight and the molecular weight distribution increase, leading to deterioration in fabricability.

In producing a non-modified copolymer, it is necessary to perform polymerization at a temperature of 20 to 120° C., and preferably 40 to 100° C. If the polymerization temperature exceeds 120° C., the selectivity of the reaction decreases, thus causing problems such as an increase in the molecular weight distribution and generation of a gel, and if the polymerization is performed at less than 20° C., the catalytic activity significantly decreases, making it necessary to add a large amount of the catalyst.

After stopping the polymerization reaction, a method for recovering the copolymer is not particularly limited, and for example, methods generally used such as a heat concentration method, a steam stripping method, and precipitation in a poor solvent may be used.

The non-modified copolymer to be obtained in the production method contains a structural unit (a) derived from a divinylaromatic compound and a structural unit (b) derived from a monovinylaromatic compound, and also the structural unit (a) derived from a divinylaromatic compound is at least partially present as a vinyl group-containing structural unit (a1) represented by the formula (1). Such a non-modified copolymer is soluble in toluene, xylene, tetrahydrofuran, dichloroethane, or chloroform.

The copolymer of the present invention to be synthesized from the non-modified copolymer has a reactive silane-based functional group and thus may be molded and cured alone, but other polymerizable resins may be utilized for modification and multi-branched component synthesis of high molecular weight. In particular, the modified vinylaromatic copolymer of the present invention is used for modification and multi-branched component synthesis of high molecular weight in the copolymerization of conjugated diene compounds alone and/or conjugated diene compounds with other monomers to obtain a conjugated diene-based copolymer (rubber).

Next, a modified vinylaromatic copolymer in which two or more terminals are each modified by a modification group having at least one functional group selected from the group consisting of an amino group, an alkoxysilyl group, and a hydroxyl group is described.

Second Aspect

The modified vinylaromatic copolymer (hereinafter, also referred to as a modified copolymer or a copolymer A') of the present invention is a copolymer containing a structural unit (a) derived from a divinylaromatic compound and a structural unit (b) derived from a monovinylaromatic compound, wherein 95% by mol or more of the structural unit (a) includes the crosslinked structural unit (a1) represented by the formula (1). The two or more terminals are each modified by the modification group having the functional group.

The divinylaromatic compound unit (a) contained in the modified vinylaromatic copolymer plays a significant role as a crosslinking component that causes the copolymer to branch and makes it polyfunctional. When polymers of the conjugated diene compound are modified using the polyfunctional modified vinylaromatic copolymer, a multi-branched component of high molecular weight is generated, allowing enhancement in wear resistance.

Examples of the divinylaromatic compounds to be used preferably include divinylbenzene (including each isomer), divinylnaphthalene (including each isomer), and divinylbiphenyl (including each isomer), but are not limited thereto. These may be used alone or two or more kinds thereof may be used in combination. The divinylaromatic compound is more preferably divinylbenzene (m-isomer, p-isomer, or an isomer mixture thereof) from the viewpoint of fabricability.

On the contrary, the monovinylaromatic compound improves solvent solubility, compatibility, and processability of the copolymer. Examples of the monovinylaromatic compounds include vinylaromatic compounds such as styrene, vinylnaphthalene, vinylbiphenyl, and α-methylstyrene; nuclear alkyl-substituted vinylaromatic compounds such as o-methylstyrene, m-methylstyrene, p-methylstyrene, o,p-dimethylstyrene, o-ethylvinylbenzene, m-ethylvinylbenzene, and p-ethylvinylbenzene; and cyclic vinylaromatic compounds such as indene, acenaphthylene, benzothiophene, and coumarone, but are not limited thereto. To prevent gelation of the copolymer and to improve solubility in the solvent, compatibility, and processability, styrene, ethylvinylbenzene (including each isomer), ethylvinylbiphenyl (including each isomer), ethylvinylnaphthalene (including each isomer), and indene are particularly preferably used from the viewpoint of cost and ease of availability. The monovinylaromatic compound is more preferably styrene, ethylvinylbenzene (m-isomer, p-isomer, or an isomer mixture thereof), or indene from the viewpoint of compatibility and cost.

The modified copolymer can be produced in the production method of the present invention.

The production method of the present invention includes a polymerization step of copolymerizing the divinylaromatic compound with the monovinylaromatic compound, or the divinylaromatic compound and the monovinylaromatic compound with a monomer anionically copolymerizable with these compounds, by use of an alkali metal compound or an alkaline earth metal compound as an anionic polymerization initiator, to obtain a vinylaromatic copolymer having a branched structure and an active terminal, and a terminal modification step of forming the functional group at the active terminal of the vinylaromatic copolymer.

Here, the anionically copolymerizable monomer improves the toughness and compatibility of the copolymer. Examples of the anionically copolymerizable monomer include butadiene, isoprene, and a conjugated diene (b1) other than butadiene and isoprene such as 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene, and chloroprene. The anionically copolymerizable monomer contained in the modified vinylaromatic copolymer of the present invention is preferably butadiene and isoprene because of ease of industrial implementation.

The vinylaromatic copolymer having the branched structure and the active terminal is a multi-branched vinylaromatic copolymer with a non-modified active terminal, which is also a precursor of the modified copolymers of the present invention. In a method for producing the vinylaromatic copolymer having the branched structure and the active terminal, in addition to divinylaromatic compounds and monovinylaromatic compounds, other monomers such as trivinylaromatic compounds are used to the extent that the effects of the present invention are not impaired, and a structural unit (e) derived from these other monomers can be introduced into the copolymer.

Specific examples of the other monomers preferably include 1,3,5-triivinylbenzene and 1,3,5-trivinylnaphthalene, but are not limited thereto. These can be used alone, or two or more kinds thereof may be used in combination. The other monomers may be used within a range of less than 30% by mol of all monomers. Therefore, the amount of the structural unit (e) derived from other monomers is within a range of less than 30% by mol based on the total amount of the structural units in the copolymer.

In a method for producing the non-modified polyfunctional vinylaromatic copolymer, monomers including a divinylaromatic compound and a monovinylaromatic compound, or further including other monomers if necessary, are polymerized in the presence of a polymerization initiator composed of an alkali metal compound or an alkaline earth metal compound, thereby producing a copolymer.

The structural unit (a) at least partially includes the crosslinked structural unit (a1) represented by the formula (1), but a molar fraction (also referred to as "degree of crosslinking") indicating the proportion of the crosslinked structural unit (a1) derived from the divinylaromatic compound to the structural unit (a) is 0.95 or more.

The degree of crosslinking of the crosslinked structural unit (a1) is in a range of 0.95 or more, and a preferable lower limit is 0.98 or more and more preferably 0.99 or more.

The degree of crosslinking is a parameter that can be controlled and changed as desired. However, when the degree of crosslinking is less than 0.95, many highly reactive pendant vinyl groups remain in the modified copolymer of the present invention to result in a tendency to easily cause a crosslinking reaction to occur in a molecule having the pendant vinyl group remaining in the copolymer as a starting point, leading to a tendency to generate a microgel in compounding and vulcanization due to the thermal history or the like in the subsequent steps, in a case where this polymer is used to modify a conjugated diene-based (co)polymer.

The method for producing the modified copolymer includes the polymerization step and the terminal modification step as described above.

A polymerization initiator composed of an alkali metal compound or an alkaline earth metal compound used in the polymerization process is described.

The alkali metal compound used as a polymerization initiator is not particularly limited, and for example, an organolithium compound is preferable. The organolithium compound may be either a low molecular weight organolithium compound or a solubilized oligomeric organolithium compound. Examples thereof include compounds having a carbon-lithium bond, compounds having a nitrogen-lithium bond, and compounds having a tin-lithium bond in the bonding mode of organic groups and lithium. The use of the organolithium compound provides good initiation efficiency and a good living rate of the polymer. Examples of the organolithium compounds include, but are not particularly limited to, organomonolithium compounds, organodilithium compounds, and organopolylithium compounds. A hydrocarbon containing the functional groups is suitable as an organic group, which has the advantage of excellent solubility in an organic solvent and further has an excellent initiation rate. A modification group containing a functional group can also be imparted to the starting terminal by the use of the compounds having a nitrogen-lithium bond and the compounds having a tin-lithium bond.

Examples of other organoalkali metal compounds of the organolithium compounds include, but are not particularly limited to, organosodium compounds, organopotassium compounds, organorubidium compounds, and organocesium compounds. More specific examples thereof include sodium naphthalene and potassium naphthalene. Other examples thereof include alkoxides such as lithium, sodium and potassium, sulfonates, carbonates, and amides. Such organoalkali metal compounds may also be used in combination with other organometallic compounds.

Examples of the alkaline earth metal compounds include organomagnesium compounds, organocalcium compounds, and organostrontium compounds. Compounds of alkaline earth metals such as alkoxides, sulfonates, carbonates, and amides may also be used. These organoalkaline earth metal compounds may be used in combination with the alkali metal compounds or the other organometallic compounds.

Examples of alkali metal compounds having a functional group that can be used as a polymerization initiator include, but are not particularly limited to, lithiumamide compounds to be obtained by lithiation of hydrogen in a secondary amine and alkyllithium to which the functional group is bonded. The functional group can be imparted to the polymerization initiation terminal of the conjugated diene-based copolymer by these compounds. The functional group is not particularly limited, but preferably a functional group that is inert to alkali metals, such as a disubstituted amino group, i.e., a tertiary amine, a protected monosubstituted amino group, or a protected amino group. Examples of the protected monosubstituted amino group or the protected amino group include those in which one hydrogen of the monosubstituted amino group or two hydrogens of the amino group are each substituted with a trialkylsilyl group.

Examples of the organolithium compounds include, but are not particularly limited to, mono-organolithium compounds such as n-butyllithium, sec-butyllithium, tert-butyllithium, n-propyllithium, iso-propyllithium, and benzyllithium; and polyfunctional organolithium compounds such as 1,4-dilithiobutane, 1,5-dilithiopentane, 1,6-dilithiohexane, 1,10-dilithiodecane, 1,1-dilithiodiphenylene, dilithiopolybutadiene, dilithiopolyisoprene, 1,4-dilithiobenzene 1,2-dilithio-1,2-diphenylethane, 1,4-dilithio-2-ethylcyclohexane, 1,3,5-trilithiobenzene, and 1,3,5-trilithio-2,4,6-triethylbenzene. Among them, the mono-organolithium compounds of n-butyllithium, sec-butyllithium, and tert-butyllithium are preferable.

Specific examples of polymerization initiators having a functional group include, but are not particularly limited to, the compounds shown below. The types of functional groups that can be imparted to the polymer are described in parentheses.

Examples thereof include dipropylaminolithium, diisopropylaminolithium, dibutylaminolithium, tetramethyleniminolithium, pentamethyleniminolithium, hexamethyleniminolithium, heptamethyleniminolithium, 2-dimethylaminoethyllithium, 3-dimethylaminopropyllithium, 3-diethylaminopropyllithium, and 4-dimethylaminobutyllithium (these are disubstituted amino groups); 2-trimethylsilylethylaminoethyllithium and 3-trimethylsilylmethylaminopropyllithium (these are monosubstituted amino groups); and 2-bistrimethylsilylaminoethyllithium and 3-bistrimethylsilylaminopropyllithium (these are amino groups).

As the polymerization initiator, oligomeric initiators in which various lithium-based initiators react with monomers can be used. At this point, for the monomer, a monomer having at least one functional group selected from the group consisting of amino groups, alkoxysilyl groups, and hydroxyl groups can be used. The oligomeric initiators are not particularly limited, and are preferably those with a molecular weight of 1,000 or less for easy industrial handling. The polymerization or copolymerization is performed using the polymerization initiator having the functional group, and in the next step, it is possible to introduce a compound having at least one functional group selected from the group consisting of an amino group, an alkoxysilyl group, and a hydroxyl group or a compound forming at least one functional group selected from the group consisting of an amino group, an alkoxysilyl group, and a hydroxyl group to the active terminal of the vinylaromatic copolymer.

Specific examples of the polyfunctional initiators include, but are not particularly limited to, organodilithium compounds and organopolylithium compounds. The organic groups are not particularly limited, and hydrocarbons are suitable. This has the advantage of excellent solubility in an organic solvent and further has an excellent initiation rate.

Examples of methods for preparing polyfunctional initiators include, but are not particularly limited to, methods involving the reaction of metallic lithium dispersion with a polyhalogenated hydrocarbon compound.

In the polymerization step, polar compounds may be added. The addition of the polar compounds is involved in an initiation reaction and a growth reaction, and is also effective in controlling the molecular weight and molecular weight distribution, promoting the polymerization reaction, or the like.

Examples of the polar compounds include ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene, and 2,2-bis(2-oxolanyl)propane; tertiary amine compounds such as tetramethylethylenediamine, dipiperidinoethane, trimethylamine, triethylamine, pyridine, and quinuclidine; alkali metal alkoxide compounds such as potassium-tert-amylate, potassium-tert-butylate, sodium-tert-butylate, and sodium amylate; and phosphine compounds such as triphenylphosphine. These polar compounds may be used alone, or two or more kinds thereof may be in combination.

The amount of the polar compound used is not particularly limited, and can be selected depending on the purpose and the like. Generally, the amount used is preferably 0.01 to 100 mol based on 1 mol of the polymerization initiator or the polyfunctional initiator. Such a polar compound can be used as a regulator for an initiation reaction and a growth reaction of the copolymer in an appropriate amount depending on the desired molecular weight and molecular weight distribution. Many polar compounds simultaneously have an effective randomization effect in the copolymerization of a divinylaromatic compound with a monovinylaromatic compound, and can be used to adjust the distribution of the aromatic vinyl compound and as an adjuster for the styrene block amount.

The copolymerization of the divinylaromatic compound with a monomer containing the monovinylaromatic compound is preferably performed by solution polymerization in an inert solvent. The polymerization solvent is not particularly limited, and for example, hydrocarbon solvents such as saturated hydrocarbon and aromatic hydrocarbon are used. Specific examples thereof include aliphatic hydrocarbons such as butane, pentane, hexane, and heptane; alicyclic hydrocarbons such as cyclopentane, cyclohexane, methylcyclopentane, methylcyclohexane, dimethylcyclohexane, ethylcyclohexane, and decalin; aromatic hydrocarbons such as benzene, toluene, and xylene; and hydrocarbon-based solvents composed of mixtures thereof.

The monomers and polymerization solvents are each preferably treated alone or a mixed solution thereof is preferably treated using an organometallic compound. Thereby, the divinylaromatic compound, the monomer such as monovinylaromatic compound, and allenes and acetylenes contained in the polymerization solvent can be treated. As a result, a polymer having an active terminal in high concentration can be obtained, allowing a high modification rate to be achieved.

The polymerization temperature in copolymerization is not particularly limited as long as it is a temperature at which a living anionic polymerization progresses, but is preferably 0° C. or higher from the viewpoint of the productivity, and preferably 120° C. or lower from the viewpoint of sufficiently securing the reaction amount of the active terminal in the terminal modification step after the completion of the polymerization. The polymerization temperature is more preferably 50 to 100° C.

The mode of the polymerization reaction is not particularly limited, but the reaction can be performed in a polymerization mode such as a batch process (also referred to as a "batch type") or a continuous process. In the continuous process, one reactor or two or more series of reactors can be used. The reactor to be used is a tank type equipped with a stirrer, a tube type, or the like. In the batch process, the molecular weight distribution of the polymer to be obtained is generally narrow and tends to be 1.0 or more and less than 1.8 in terms of Mw/Mn. In the continuous process, the molecular weight distribution of the polymer to be obtained is generally wide and tends to be 1.8 or more and 3 or less in terms of Mw/Mn.

[Terminal Modification Step]

In the production method of the present invention, after obtaining a vinylaromatic copolymer having a branched structure and an active terminal (also referred to as a "non-modified copolymer") in the polymerization step, this active terminal is subjected to a terminal modification step of reacting a compound having at least one functional group selected from the group consisting of an amino group, an alkoxysilyl group, and a hydroxyl group, or a compound forming at least one functional group selected from the group consisting of an amino group, an alkoxysilyl group, and a hydroxyl group to introduce the functional group.

The reaction temperature, the reaction time, and the like in a reaction of the compound (including a precursor) having the functional group with the active terminal are not particularly limited, but the reaction is preferably performed at 0 to 120° C. for 30 seconds or longer.

The amount of the compound having the functional group added is not particularly limited, but the total molar number of the compound having a functional group is preferably in a range from 0.01 to 6 times, more preferably in a range from 0.02 to 3 times, and further preferably in a range from 0.05 to 2 times to the molar number of the polymerization initiator or the polyfunctional initiator, i.e., the number of the polymer molecule. The amount added is preferably 0.05 times or more from the viewpoint of obtaining a sufficient modification ratio in the target modified vinylaromatic copolymer.

In such a case, the amount of the compound having the functional group added is preferably 0.7 times or less to the molar number of the polymerization initiator or the polyfunctional initiator, i.e., the polymer molecule, as the functional group equivalent.

In the terminal modification step, if the polymerization step is a batch process, the modification reaction may be performed continuously in the same reactor used in the polymerization step or may be performed by transferring the product to the next reactor. If the polymerization step is a continuous process, the reaction is performed by transferring the product to the next reactor. The terminal modification step is preferably performed immediately after the polymerization step, and the reaction is preferably performed by mixing the modifying agent within 5 minutes. The reactors for the modification reaction are preferably those in which stirring is sufficiently performed. Specifically, the reactors are static mixer type reactors, tank type reactors equipped with stirrers, or the like.

The terminal modification step is a step in which compounds having at least one functional group selected from an amino group, an alkoxysilyl group, and a hydroxyl group (including precursors thereof, which are also referred to as a modification compound) are reacted with the active terminal of the non-modified copolymer to form a bond, or in which these modified compounds are reacted to modify a termination terminal. In the modified compounds used in this step, specific examples of the functional groups binding to the active terminal of the conjugated diene-based polymer include, but are not particularly limited to, halogen groups, double bonds, ketone groups, ester groups, amide groups, epoxy groups, and alkoxysilyl groups.

Among such modified compounds, specific examples of compounds having an amino group include, but are not particularly limited to, compounds having a functional group binding to an amino group and a polymeric active terminal in the molecule, preferably without active hydrogen. The amino group is not particularly limited, and specifically functional groups that are inert to alkali metals, such as a disubstituted amino group, i.e., a tertiary amine, a protected monosubstituted amino group, and an amino group with two hydrogens protected are preferable. Examples of the protected monosubstituted amino group or the amino group with two hydrogens protected include those in which one hydrogen of the monosubstituted amino group or two hydrogens of the amino group are each substituted with a trialkylsilyl group.

Specific examples of the compounds having an alkoxysilyl group include, but are not particularly limited to, compounds having a plurality of alkoxysilyl groups in the molecule (including compounds having a silyl group to which a plurality of alkoxy groups are bonded) and compounds having a functional group that binds to the alkoxysilyl group and the polymeric active terminal in the molecule. These are preferably compounds without active hydrogen.

Specific examples of the compounds forming a hydroxyl group include, but are not particularly limited to, compounds having a functional group that binds to the polymeric active terminal and in which a hydroxyl group is generated after the binding reaction, and compounds having a functional group that does not bind to the polymeric active terminal and in which a hydroxyl group is generated later by hydrolysis or other reactions, and the compounds without active hydrogen are preferable.

Examples of the compounds having a functional group in which a hydroxyl group is generated after the binding reaction include compounds having a ketone group, an ester group, an amide group, and an epoxy group. Examples of the compounds having a functional group in which a hydroxyl group is generated by hydrolysis or other reactions after the binding reaction include compounds having an alkoxysilyl group, aminosilyl group.

Specific examples of the modified compounds are shown below. The compounds binding to the active terminal of the non-modified copolymer to form an amino group at the terminal of the polymer are not particularly limited, and examples thereof include C=N double bond compounds such as N,N'-dicyclohexylcarbodiimide.

The compounds forming an amino group and a hydroxyl group at the terminal of the copolymer are not particularly limited, and examples thereof include ketone compounds having an amino group, such as N,N,N',N'-tetramethyl-4,4'-diaminobenzophenone (Michler's ketone), N,N,N',N'-tetraethyl-4,4'-diaminobenzophenone; cyclic urea compounds such as N,N'-dimethylimidazolidinone and N-methylpyrrolidone; cyclic amides, i.e., lactam compounds; amino group-containing epoxy compounds such as N,N,N',N'-tetraglycidyl-1,3-bisaminomethylcyclohexane; and epoxy compounds having a nitrogen-containing heterocyclic group as described in JP2001-131227A.

The compounds forming an alkoxysilyl group at the terminal of the copolymer are not particularly limited, and examples thereof include halogenated alkoxysilane compounds such as trimethoxychlorosilane, triethoxychlorosilane, diphenoxydicrylorosilane; and polyfunctional alkoxysilane compounds such as bis(trimethoxysilyl)ethane and bis(3-triethoxysilylpropyl)ethane.

The compounds forming an alkoxysilyl group and a hydroxyl group at the terminal of the copolymer are not particularly limited, and examples thereof include polysiloxane compounds having 3-glycidoxypropyltrimethoxysilane, 3-glycidoxypropyltriethoxysilane epoxy groups and alkoxysilyl groups in the molecule.

The compounds forming an amino group and an alkoxysilyl group at the terminal of the copolymer are not particularly limited, and examples thereof include alkoxysilane compounds to which an alkyl group having an amino substituent is bonded, such as 3-dimethylaminopropyltrimethoxysilane, 3-dimethylaminopropyldimethoxymethylsilane, 3-dimethylaminopropyltriethoxysilane, bis(3-trimethoxysilylpropyl)methylamine, and bis(3-triethoxysilylpropyl)methylamine; alkoxysilane compounds to which a protected monosubstituted amino group as described in WO2007/034785 is bonded, such as N-[3-(triethoxysilyl)-propyl]-N,N'-diethyl-N'-trimethylsilyl-ethane-1,2-diamine and 3-(4-trimethylsilyl-1-piperazinyl)propyltriethoxysilane; alkoxysilane compounds to which a plurality of substituted amino groups as described in WO2008/013090A are bonded, such as N-[2-(trimethoxysilanyl)-ethyl]-N,N',N'-trimethylethane-1,2-diamine, 1-[3-(triethoxysilanyl)-propyl]-4-methylpiperazine, 2-(trimethoxysilanyl)-1,3-dimethylimidazolidine, and bis-(3-dimethylaminopropyl)-dimethoxysilane; alkoxysilane compounds to which a nitrogen-containing heterocyclic ring as described in WO2011/040312A is bonded, such as 1,4-bis[3-(trimethoxysilyl)propyl]piperazine and 1,4-bis[3-(triethoxysilyl)propyl]piperazine; and alkoxysilane compounds to which an azasilane group as described in WO2011/129425A is bonded, such as 3-[N,N-bis(trimethylsilyl)amino]propyltrimethoxysilane, 3-[N,N-bis(trimethylsilyl)amino]propylmethyldiethoxysilane, 2,2-dimethoxy-1-(3-trimethoxysilylpropyl)-1-aza-2-silacyclopentane, and 2,2-diethoxy-1-(3-triethoxysilylpropyl)-1-aza-2-silacyclopentane.

The compounds forming a hydroxyl group at the terminal of the copolymer are not particularly limited, and examples thereof include epoxy compounds such as ethylene oxide and propylene oxide; and ketone compounds such as benzophenone.

The modified copolymer of the present invention or the modified vinylaromatic copolymer of the present invention to be obtained by the production method has a reactive functional group and thus may be molded and cured alone, but other polymerizable resins may be utilized for functional group modification and multi-branched component synthesis of high molecular weight. In particular, the modified copolymer is used for polyfunctional modification and multi-branched component synthesis of high molecular weight in the copolymerization of conjugated diene compounds alone and/or conjugated diene compounds with other monomers to obtain a conjugated diene-based copolymer (also referred to as a "modified rubber").

The modified copolymer of the present invention is an excellent modifier for a conjugated diene-based (co)polymer (rubber). Although the detail mechanism is not clear, it is presumed that a proper amount of such a functional group is introduced into the modified copolymer of the present invention, to thereby modify the rubber to become a modified conjugated diene-based copolymer (modified rubber), which allows this to be easily collected in the vicinity of a reinforcing filling agent, to result in an increase in reinforcing effect of the reinforcing filling agent, leading to an enhancement in wear resistance of a crosslinked product to be obtained.

It is also presumed that the modified rubber is mediated to result in an enhancement in affinity between the modified copolymer of the present invention and the reinforcing filling agent, and a dispersing state of each component in the rubber composition, for example, the reinforcing filling agent, is ideal for enhancements in physical properties (for example, enhancement in wear resistance, enhancement in handling stability, dry-grip performance, and wet-grip performance) of a crosslinked product to be obtained.

It is presumed that, on the contrary, if the modified rubber is so increased in the number of the functional groups, the interaction between the modified rubbers adsorbed on the reinforcing filling agent is too strong to result in smaller effects of dispersing the reinforcing filling agent, and the effects of the modified copolymer of the present invention on an enhancement in affinity between the modified rubbers and the reinforcing filling agent is deteriorated.

The average number of functional groups per molecule in the modified vinylaromatic copolymer is preferably in a range from 2 to 20.

The addition amount of the modified compound in the modified vinylaromatic copolymer is preferably 1 to 200 parts by mass, more preferably 1 to 100 parts by mass, further preferably 1 to 60 parts by mass, and even more preferably 1 to 50 parts by mass, and may be 1 to 40 parts by mass, based on 100 parts by mass of the non-modified polyfunctional vinylaromatic copolymer. In a case where the amount of modification compound is more than 200 parts by mass, the dispersibility effect of the reinforcing filling agent tends to be inferior, processability tends to be deteriorated, and wear resistance of a crosslinked product to be obtained tends to be also deteriorated. In a case where the amount used is less than 1 part by mass, the dispersibility effect of the reinforcing filling agent tends to be inferior, and the dispersing state of the reinforcing filling agent or the like tends not to be ideal for enhancements in physical properties of a crosslinked product to be obtained. The addition amount of a modification compound having a functional group selected from an amino group, an alkoxysilyl group, a hydroxyl group added to the modified vinylaromatic copolymer can be determined using various analysis instruments, for example, nuclear magnetic resonance spectroscopy.

The modified vinylaromatic copolymer of the present invention contains 0.5 to 95.0% by mol of the structural unit (a) derived from a divinylaromatic compound.

In a case where the structural unit is only composed of structural units (a) and (b), the molar fraction of the structural unit (a) to the sum of the structural units (a) and (b) is 0.005 to 0.95. This molar fraction is calculated by the following formula (7):

$$(a)/[(a)+(b)] \qquad (7)$$

wherein (a): the molar fraction of the structural unit (a) derived from a divinylaromatic compound, and (b): the molar fraction of the structural unit (b) derived from a monovinylaromatic compound.

A preferable lower limit of the molar fraction is 0.006 and more preferably 0.007. A preferable upper limit is 0.80, and more preferably 0.70. The molar fraction is optimally 0.01 to 0.60.

In a case where structural units other than the structural units (a) and (b) are included, a preferable lower limit of the content thereof is 0.2% by mol, more preferably 0.4% by mol, and further preferably 0.6% by mol. A preferable upper limit is 70% by mol, more preferably 60% by mol, and further preferably 50% by mol.

The modified vinylaromatic copolymer of the present invention contains 5.0 to 99.5% by mol of the structural unit (b) derived from a monovinylaromatic compound. The molar fraction is 0.05 to 0.995. A preferable lower limit is 0.20. A more preferable lower limit is 0.30. A preferable upper limit is 0.994, and more preferably 0.993. The molar fraction is optimally 0.40 to 0.99.

In a case where the structural unit is only composed of the structural units (a), and (b), the molar fraction of the structural unit (b) is calculated by the following formula (8):

$$(b)/[(a)+(b)] \qquad (8)$$

wherein (a) and (b) have the same meaning as in formula (7).

Even in a case where structural units other than structural units (a) and (b) are included, a preferable molar fraction of the structural unit (b) is in the above range.

The structural unit (a) derived from a divinylaromatic compound contains a vinyl group as a branching component for exhibiting copolymerization reactivity with the conjugated diene-based compound, and on the other hand, the structural unit (b) derived from a monovinylaromatic compound does not have any vinyl group involved in a curing reaction, and thus providing moldability, compatibility, and the like.

If the molar fraction of the structural unit (a) is less than 0.005, a cured product is insufficient in heat resistance, and if the molar fraction exceeds 0.95, fabricability is deteriorated. If the molar fraction of the structural unit (b) exceeds 0.995, heat resistance is deteriorated, and if the molar fraction is less than 0.05, fabricability is deteriorated.

The modified vinylaromatic copolymer of the present invention can contain other structural units in addition to the above structural units. The detail of such other structural units is understood from the description of the production method.

The modified vinylaromatic copolymer of the present invention has an Mn (number average molecular weight in terms of standard polystyrene measured by use of gel permeation chromatography) of 500 to 100,000, preferably 600 to 50,000, more preferably 700 to 40,000, further preferably 800 to 30,000, most preferably 900 to 20,000, and optimally 900 to 10,000. If the Mn is less than 300, the amount of a functional group contained in the copolymer is reduced to result in a tendency to cause the reactivity of the conjugated diene-based copolymer with the active terminal to be deteriorated. If the Mn exceeds 100,000, not only gels are easily generated, but also the fabricability and tensile breaking elongation tend to be deteriorated. The molecular weight distribution is 30.0 or less, preferably 25.0 or less, and more preferably 1.3 to 20.0, and optimally 1.6 to 15.0. If the Mw/Mn exceeds 30.0, not only processing properties of the copolymerized rubber tend to get worse, but also gels tend to be generated.

The modified vinylaromatic copolymer of the present invention is soluble in a solvent selected from toluene, xylene, tetrahydrofuran, dichloroethane, or chloroform, and is advantageously soluble in all the solvents. To make the copolymer soluble in such a solvent and polyfunctional, a portion of the vinyl groups in divinylbenzene is required to be left without crosslinking for functional group modification and to have a proper degree of branching. Such a copolymer or a production method thereof is known in the above Patent Literatures or the like. The solubility in 100 g of the solvent is preferably 50 g or more, and more preferably 80 g or more.

The modified vinylaromatic copolymer of the present invention to be obtained by the production method has at least one reactive functional group selected from an amino group, an alkoxysilyl group, and a hydroxyl group and thus may be molded and cured alone, but other polymerizable resins may be utilized for functional group modification and multi-branched component synthesis of high molecular weight. In particular, the modified vinylaromatic copolymer of the present invention is used for functional group modification and multi-branched component synthesis of high molecular weight in the copolymerization of conjugated diene compounds alone and/or conjugated diene compounds with other monomers to obtain a conjugated diene-based copolymer (rubber).

Next, the conjugated diene-based copolymer of the present invention is described.

A modified conjugated diene-based copolymer is obtained by reacting a modified vinylaromatic copolymer (A) or (A') of the present invention, as a modifying agent, with a polymer of a conjugated diene compound (B) having an active terminal, or a copolymer of a conjugated diene compound (B) having an active terminal and an aromatic vinyl compound (C). Hereinafter, a polymer of the conjugated diene compound (B), or a copolymer of the conjugated diene compound (B) having an active terminal and the aromatic vinyl compound (C) are also referred to as a diene-based polymer collectively.

The modified vinylaromatic copolymer (A) of the first aspect and the modified vinylaromatic copolymer (A') of the second aspect can be used in the same manner, and thus both are also referred to as the modified vinylaromatic copolymer (A) below.

A modified conjugated diene-based copolymer having a branched polymer-type modification group based on the modified vinylaromatic copolymer of the present invention is obtained by copolymerizing the modified vinylaromatic copolymer (A) of the present invention with 1) the conjugated diene compound (B) or 2) the conjugated diene compound (B) and the aromatic vinyl compound (C) as raw materials. In a case where the aromatic vinyl compound (C) is not used, a modified diene-based rubber such as butadiene rubber or isoprene rubber can be obtained, and a modified conjugated diene-based copolymer such as SBR can be obtained by use of the aromatic vinyl compound (C). These modified conjugated diene-based copolymers exhibit rubber properties, and thus are also referred to as a "modified copolymer rubber".

The polymerization steps for obtaining the modified conjugated diene-based copolymer of the present invention consist of a polymerization step of polymerizing the conjugated diene compound (B) or copolymerizing the conjugated diene compound (B) with the aromatic vinyl compound (C) by use of an alkali metal compound or an alkaline earth metal compound as a polymerization initiator, to obtain a conjugated diene-based copolymer having an active terminal, and a terminal modification step of introducing a branched polymer-type modification group based on the modified vinylaromatic copolymer.

Examples of the conjugated diene compound (B) include 1,3-butadiene, isoprene, 2,3-dimethyl-1,3-butadiene, 1,3-pentadiene, 3-methyl-1,3-pentadiene, 1,3-heptadiene, and 1,3-hexadiene. Among them, 1,3-butadiene and isoprene are preferable. These may be used alone, or two or more kinds thereof may be used in combination.

As the aromatic vinyl compound (C), styrene, α-methylstyrene, 1-vinylnaphthalene, 3-vinyltoluene, ethylvinylbenzene, vinylxylene, 4-cyclohexylstyrene, 2,4,6-trimethylstyrene, tert-butoxydimethylsilylstyrene, isopropoxydimethylsilylstyrene, and the like can be used alone, or two or more kinds thereof may be used in combination, but among these, styrene is particularly preferable.

In a case where 1,3-butadiene is used as the conjugated diene compound (B) and styrene is used as the aromatic vinyl compound, so-called styrene-butadiene rubber (SBR) is obtained. In a case where styrene is not used as the aromatic vinyl compound while 1,3-butadiene is used as the conjugated diene compound (B), so-called butadiene rubber (BR) is obtained. In a case where isoprene is used as the conjugated diene compound (B) and there is no structural unit of the aromatic vinyl compound (C), isoprene rubber (IR) is obtained. Above all, when a styrene-butadiene rubber (SBR) structure is provided, this is particularly preferable because of its excellent wear resistance, heat resistance, and aging resistance.

Polymerization Step Using a Polymerization Initiator

The alkali metal compound used as a polymerization initiator is not particularly limited, and for example, an organolithium compound is preferable. The organolithium compound may be either a low molecular weight organolithium compound or a solubilized oligomeric organolithium compound. Examples thereof include compounds having a carbon-lithium bond, compounds having a nitrogen-lithium bond, and compounds having a tin-lithium bond in the bonding mode of organic groups and lithium. The use of the organolithium compound provides good initiation efficiency and a good living rate of the polymer. Examples of the organolithium compounds include, but are not particularly limited to, organomonolithium compounds, organodilithium compounds, and organopolylithium compounds. A hydrocarbon containing the functional groups is suitable as an organic group, which has the advantage of excellent solubility in an organic solvent and further has an excellent initiation rate. A modification group containing a functional group can also be imparted to the starting terminal by use of the compounds having a nitrogen-lithium bond and the compounds having a tin-lithium bond.

Examples of other organoalkali metal compounds of the organolithium compounds include, but are not particularly limited to, organosodium compounds, organopotassium compounds, organorubidium compounds, and organocesium compounds. Specific examples thereof include sodium naphthalene and potassium naphthalene. Other examples thereof include alkoxides such as lithium, sodium and potassium, sulfonates, carbonates, and amides. Such organoalkali metal compounds may also be used in combination with other organometallic compounds.

Examples of the alkaline earth metal compounds used as a polymerization initiator include organomagnesium compounds, organocalcium compounds, and organostrontium compounds. Compounds of alkaline earth metals such as alkoxides, sulfonates, carbonates, and amides may also be used. These organoalkaline earth metal compounds may be used in combination with the alkali metal compounds or the other organometallic compounds.

Examples of alkali metal compounds having a functional group that can be used as a polymerization initiator include, but are not particularly limited to, lithiumamide compounds to be obtained by lithiation of hydrogen in a secondary amine and alkyllithium to which the functional group is bonded. The functional group can be imparted to the polymerization initiation terminal of the conjugated diene-based copolymer by these compounds. The functional group is not particularly limited, but preferably a functional group that is inert to alkali metals, such as a disubstituted amino group, i.e., a tertiary amine, a protected monosubstituted amino group, or a protected amino group. Examples of the protected monosubstituted amino group or the protected amino group include those in which one hydrogen of the monosubstituted amino group or two hydrogens of the amino group are each substituted with a trialkylsilyl group.

Examples of the organolithium compounds used as a initiator include, but are not particularly limited to, mono-organolithium compounds such as n-butyllithium, sec-butyllithium, tert-butyllithium, n-propyllithium, iso-propyllithium, and benzyllithium; and polyfunctional organolithium compounds such as 1,4-dilithiobutane, 1,5-dilithiopentane, 1,6-dilithiohexane, 1,10-dilithiodecane, 1,1-dilithiodiphenylene, dilithiopolybutadiene, dilithiopolyisoprene, 1,4-dilithiobenzene 1,2-dilithio-1,2-diphenylethane, 1,4-dilithio-2-ethylcyclohexane, 1,3,5-trilithiobenzene, and 1,3,5-trilithio-2,4,6-triethylbenzene. Among them, the mono-organolithium compounds of n-butyllithium, sec-butyllithium, and tert-butyllithium are preferable.

Specific examples of polymerization initiators having a functional group include, but are not particularly limited to, the compounds shown below. The types of functional groups that can be imparted to the polymer are described in parentheses. Examples thereof include: dipropylaminolithium, diisopropylaminolithium, dibutylaminolithium, tetramethyleniminolithium, pentamethyleniminolithium, hexamethyleniminolithium, heptamethyleniminolithium, 2-dimethylaminoethyllithium, 3-dimethylaminopropyllithium, 3-diethylaminopropyllithium, and 4-dimethylaminobutyllithium (these are disubstituted amino groups); 2-trimethylsilylethylaminoethyllithium and 3-trimethylsilylmethylaminopropyllithium (these are monosubstituted amino groups); and 2-bistrimethylsilylaminoethyllithium and 3-bistrimethylsilylaminopropyllithium (these are amino groups).

As the polymerization initiator, oligomeric initiators in which various lithium-based initiators react with monomers can be used. At this point, for the monomer, a monomer having at least one functional group selected from the group consisting of amino groups, alkoxysilyl groups, and hydroxyl groups can be used. The oligomeric initiators are not limited, and are preferably those with a molecular weight of 1,000 or less for easy industrial handling. The polymerization or copolymerization is performed using the polymerization initiator having the functional group, and in the next step, it is possible to introduce a branched polymer-type modification group derived from the modified vinylaromatic copolymer of the present invention to the termination terminal.

The polymerization step in the case of using the polyfunctional initiator is a step of polymerizing the conjugated diene compound (B) by use of the polyfunctional initiator or copolymerizing the conjugated diene compound (B) with the aromatic vinyl compound (C) to obtain a conjugated diene-based copolymer having an active terminal.

Thereafter, as a method of introducing a functional group to two or more terminals of a conjugated diene-based copolymer having active terminals, a terminal modification step is performed in which a modified vinylaromatic copolymer is reacted with two or more active terminals of the conjugated diene-based copolymer to introduce two or more branched polymer-type modification groups (A) based on the modified vinylaromatic copolymer.

Polyfunctional Initiator

Specific examples of the polyfunctional initiators include, but are not particularly limited to, organodilithium compounds and organopolylithium compounds. The organic groups are not particularly limited, and hydrocarbons are suitable. This has the advantage of excellent solubility in an organic solvent and further has an excellent initiation rate.

Specific examples of methods of preparing the polyfunctional initiators include, but are not particularly limited to, methods involving the reaction of a metallic lithium dispersion with a polyhalogenated hydrocarbon compound, methods involving the reaction of metallic lithium with a diene compound, and methods involving the reaction of an organomonolithium compound with a polyfunctional compound. Among them, the method preferably involves the reaction of the organomonolithium compound with the polyfunctional compound. Specific examples of the polyfunctional compounds include, but are not particularly limited to, aromatic compounds having a plurality of double bonds adjacent to the aromatic groups, and compounds having a plurality of active hydrogens that can be substituted with lithium. In the reaction of the organomonolithium compound with these polyfunctional compounds, the conjugated diene compound and the aromatic vinyl compound can also be present to make an oligomer. The polar compounds such as ether compounds and tertiary amine compounds may also be present to enhance the reactivity of the organomonolithium compound. Examples of aromatic compounds that have a plurality of double bonds adjacent to the aromatic group include, but are not particularly limited to, diisopropenylbenzene and divinylbenzene. Examples of compounds having a plurality of active hydrogens that may be substituted with lithium include, but are not particularly limited to, 1,3,5-trimethylbenzene.

Examples of the hydrocarbon dilithium compounds include, but are not particularly limited to, 1,3-bis(1-lithio-1,3-dimethylpentyl)benzene, 1,4-bis(1-lithio-1,3-dimethylpentyl)benzene, 1,3-bis(1-lithio-1,3,3-trimethylbutyl)benzene, and 1,4-bis(1-lithio-1,3,3-trimethylbutyl)benzene, obtained from a reaction of secondary or tertiary butyllithium with diisopropenylbenzene.

Examples of the hydrocarbon polylithium compounds include, but are not particularly limited to, reaction products of n-butyllithium, divinylbenzene and 1,3-butadiene, and reaction products of secondary or tertiary butyllithium with 1,3,5-trimethylbenzene.

The amount of these polyfunctional initiators used is adjusted according to the molecular weight of the target butadiene-based polymer, and the amount usable is 0.01 to 0.2 parts by mass based on 100 parts by mass of the monomer, and preferably 0.02 to 0.15 parts by mass. In this case, it is preferable to consider deactivation due to moisture and impurities in the monomer and solvent, chain transfer due to impurities, and deactivation due to the generation of metal hydride at the polymerization terminal.

In producing the conjugated diene-based copolymers, polar compounds may be added. The addition of the polar compound allows the vinylaromatic compound to be randomly copolymerized with a conjugated diene compound such as 1,3-butadiene. The polar compound can also be used as a vinylizing agent for controlling the microstructure of the conjugated diene moiety. The polar compound is also effective in promoting a polymerization reaction and the like.

Examples of the polar compounds include ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene, and 2,2-bis(2-oxolanyl)propane; tertiary amine compounds such as tetramethylethylenediamine, dipiperidinoethane, trimethylamine, triethylamine, pyridine, and quinuclidine; alkali metal alkoxide compounds such as potassium-tert-amylate, potassium-tert-butylate, sodium-tert-butylate, and sodium amylate; and phosphine compounds such as triphenylphosphine. These polar compounds may be used alone or two or more kinds thereof may be used in combination.

The amount of the polar compound used is not particularly limited, and can be selected depending on the purpose and the like. Generally, the amount used is preferably 0.01 to 100 mol based on 1 mol of the polymerization initiator or the polyfunctional initiator. Such a polar compound can be used as a regulator for the microstructure of the polymer conjugated diene moiety according to a desired vinyl bond amount. Many polar compounds simultaneously have an effective randomization effect in the copolymerization of a conjugated diene compound with an aromatic vinyl compound, and can be used to adjust the distribution of the aromatic vinyl compound and as an adjuster for the styrene block amount. As a method of randomizing the conjugated diene compound and the aromatic vinyl compound, for example, a method may also be used in which the copolymerization reaction is initiated with all amounts of the styrene and a portion of the conjugated diene compound (B), and then the remaining conjugated diene compound (B) is continuously or intermittently added in the course of the copolymerization reaction as described in Japanese Patent Laid-Open No. 59-140211.

In this polymerization, the polymerization or copolymerization of the conjugated diene compound (B) is preferably performed by solution polymerization in an inert solvent. The polymerization solvent is not particularly limited, and for example, hydrocarbon solvents such as saturated hydrocarbon and aromatic hydrocarbon are used. Specific examples thereof include aliphatic hydrocarbons such as butane, pentane, hexane, and heptane; alicyclic hydrocarbons such as cyclopentane, cyclohexane, methylcyclopentane, methylcyclohexane, dimethylcyclohexane, ethylcyclohexane, and decalin; aromatic hydrocarbons such as benzene, toluene, and xylene; and hydrocarbon-based solvents composed of mixtures thereof.

The conjugated diene-based compound and the polymerization solvent are each preferably treated alone or a mixed solution thereof is preferably treated using an organometallic compound. Thereby, allenes and acetylenes contained in the conjugated diene compound and the polymerization solvent can be treated. As a result, a polymer having an active terminal in high concentration can be obtained, allowing a high modification rate to be achieved.

The polymerization temperature in copolymerization of the conjugated diene compound (B) or conjugated diene compound (B) with the aromatic vinyl compound (C) is not particularly limited as long as it is a temperature at which a living anionic polymerization progresses, but is preferably 0° C. or higher from the viewpoint of the productivity, and preferably 120° C. or lower from the viewpoint of sufficiently securing the reaction amount of the modified vinylaromatic copolymer having the structural unit (c) composed of a silane-based functional group represented by the formula (2) and/or the formula (3) of the present invention to the active terminal after the completion of the polymerization. The polymerization temperature is more preferably 50 to 100° C.

The polymerization mode in copolymerization of the conjugated diene compound (B) or conjugated diene compound (B) with the aromatic vinyl compound (C) is not particularly limited, and the reaction can be performed in a polymerization mode such as a batch process (also referred to as a "batch type") or a continuous process. In the continuous process, one reactor or two or more series of reactors can be used. The reactor to be used is a tank type equipped with a stirrer, a tube type, or the like. In the batch process, the molecular weight distribution of the polymer to be obtained is generally narrow and tends to be 1.0 or more and less than 1.8 in terms of Mw/Mn. In the continuous process, the molecular weight distribution of the polymer to be obtained is generally wide and tends to be 1.8 or more and 3 or less in terms of Mw/Mn.

Terminal Modification Step

The terminal modification step is a step in which the modified vinylaromatic copolymer of the present invention is reacted with the active terminal of the conjugated diene-based copolymer to introduce the functional group while a multi-branched high molecular weight component is synthesized. This step is carried out in the same manner in the case of using a polymerization initiator and in the case of using the polyfunctional initiator.

The reaction temperature, the reaction time, and the like in a reaction of the modified vinylaromatic compound with the polymeric active terminal are not particularly limited, but the reaction is preferably performed at 0 to 120° C. for 30 seconds or longer. The amount of the modified vinylaromatic compound added is not particularly limited, but the total molar number of the modified vinylaromatic copolymer (A) is preferably in a range from 0.01 to 6 times, more preferably in a range from 0.02 to 3 times, and further preferably in a range from 0.05 to 2 times to the molar number of the polymerization initiator or the polyfunctional initiator, i.e., the number of polymer molecule. The amount added is preferably 0.05 times or more from the viewpoint of obtaining a sufficient modification ratio in the target modified conjugated diene-based polymer. In addition, the degree of branching and the amount of branched polymer components generated by coupling the polymer terminals together can be arbitrarily controlled by the structure of the modified vinylaromatic copolymer (A) for the improvement of processability. In this case, the modified vinylaromatic copolymer (A) with a high degree of the functional groups can be used as the modified vinylaromatic copolymer (A). The amount of such a modified vinylaromatic compound (A) added is preferably 0.7 times or less to the molar number of the polymerization initiator or the polyfunctional initiator, i.e., the number of the polymer molecule, as the functional group equivalent.

In the terminal modification step, if the polymerization step is a batch process, the modification reaction may be performed continuously in the same reactor used in the polymerization step or may be performed by transferring the product to the next reactor. If the polymerization step is a continuous process, the reaction is performed by transferring the product to the next reactor. The terminal modification step is preferably performed immediately after the polymerization step, and the reaction is preferably performed by mixing the modifying agent within 5 minutes. The reactors for the modification reaction are preferably those in which stirring is sufficiently performed. Specifically, the reactors are static mixer type reactors, tank type reactors equipped with stirrers, or the like.

One or more functional groups different from those of the modified vinylaromatic copolymer can also be introduced to the active terminal of the conjugated diene-based copolymer for the purpose of preventing side reactions in which functional groups of the modified vinylaromatic copolymer are bonded together, or for the purpose of improving affinity with different types of fillers.

In a case where a functional group different from those of the modified vinylaromatic copolymer is introduced to an active terminal of the conjugated diene-based copolymer, modified compounds having at least one functional group selected from an amino group, an alkoxysilyl group, and a hydroxyl group are reacted with the active terminal of the conjugated diene-based copolymer to form a bond, or compounds forming these functional groups are reacted to modify the termination terminal. In the modified compounds used in this case, specific examples of the functional groups binding to the active terminal of the conjugated diene-based polymer include, but are not particularly limited to, halogen groups, double bonds, ketone groups, ester groups, amide groups, epoxy groups, and alkoxysilyl groups.

Modified Compound

The terminal modification step is a step in which modified compounds having at least one functional group selected from an amino group, an alkoxysilyl group, and a hydroxyl group are reacted with an active terminal of the butadiene-based copolymer to form a bond, or in which compounds forming these functional groups are reacted to modify the termination terminal. In the modified compounds used in this step, specific examples of the functional groups binding to the active terminal of the conjugated diene-based polymer include, but are not particularly limited to, halogen groups, double bonds, ketone groups, ester groups, amide groups, epoxy groups, and alkoxysilyl groups.

Among such modified compounds, specific examples of compounds having an amino group include, but are not particularly limited to, compounds having a functional group binding to an amino group and a polymeric active terminal in the molecule, preferably without active hydrogen. The amino group is not particularly limited, and specifically functional groups that is inert to alkali metals, such as a disubstituted amino group, i.e., a tertiary amine, a protected monosubstituted amino group, and an amino group with two hydrogens protected are preferable. Examples of the protected monosubstituted amino group or the amino group with two hydrogens protected include those in which one hydrogen of the monosubstituted amino group or two hydrogens of the amino group are each substituted with a trialkylsilyl group.

Among the modifying agents, specific examples of the compounds having an alkoxysilyl group include, but are not particularly limited to, compounds having a plurality of alkoxysilyl groups in the molecule (including compounds having a silyl group to which a plurality of alkoxy groups are bonded) and compounds having a functional group that binds to the alkoxysilyl group and the polymeric active terminal in the molecule. These are preferably compounds without active hydrogen.

Among the modifying agents, specific examples of the compounds forming a hydroxyl group include, but are not particularly limited to, compounds having a functional group that binds to the polymeric active terminal and in which a hydroxyl group is generated after the binding reaction, and compounds having a functional group that does not bind to the polymeric active terminal and in which a hydroxyl group is generated later by hydrolysis or other reactions, and the compounds without active hydrogen are preferable.

Examples of the compounds having a functional group in which a hydroxyl group is generated after the binding reaction include compounds having a ketone group, an ester group, an amide group, and an epoxy group. Examples of the compounds having a functional group in which a hydroxyl group is generated by hydrolysis or other reactions after the binding reaction include compounds having an alkoxysilyl group, aminosilyl group, and the like.

Specific examples of the modified compound are shown below. The compounds binding to the polymeric active terminal to form an amino group at the terminal of the polymer are not particularly limited, and examples thereof include C=N double bond compounds such as N,N'-dicyclohexylcarbodiimide.

The compounds binding to the polymeric active terminal to form an amino group and a hydroxyl group at the terminal of the polymer are not particularly limited, and examples thereof include ketone compounds having an amino group, such as N,N,N',N'-tetramethyl-4,4'-diaminobenzophenone (Michler's ketone), N,N,N',N'-tetraethyl-4,4'-diaminobenzophenone; cyclic urea compounds such as N,N'-dimethylimidazolidinone and N-methylpyrrolidone; cyclic amides, i.e., lactam compounds; amino group-containing epoxy compounds such as N,N,N',N'-tetraglycidyl-1,3-bisaminomethylcyclohexane; and epoxy compounds having a nitrogen-containing heterocyclic group as described in Japanese Patent Laid-Open No. 2001-131227.

The compounds binding to the polymeric active terminal to form an alkoxysilyl group at the terminal of the polymer are not particularly limited, and examples thereof include halogenated alkoxysilane compounds such as trimethoxychlorosilane, triethoxychlorosilane, diphenoxydichlorosilane; and polyfunctional alkoxysilane compounds such as bis(trimethoxysilyl)ethane and bis(3-triethoxysilylpropyl)ethane.

The compounds binding to the polymeric active terminal to form an alkoxysilyl group at the terminal of the polymer are not particularly limited, and examples thereof include polysiloxane compounds having 3-glycidoxypropyltrimethoxysilane, 3-glycidoxypropyltriethoxysilane epoxy groups and alkoxysilyl groups in the molecule.

The compounds binding to the polymeric active terminal to form an amino group and an alkoxysilyl group at the terminal of the polymer are not particularly limited, and examples thereof include alkoxysilane compounds to which an alkyl group having an amino substituent is bonded, such as 3-dimethylaminopropyltrimethoxysilane, 3-dimethylaminopropyldimethoxymethylsilane, 3-dimethylaminopropyltriethoxysilane, bis(3-trimethoxysilylpropyl)methylamine, and bis(3-triethoxysilylpropyl)methylamine; alkoxysilane compounds to which a protected monosubstituted amino group as described in WO2007/034785A is bonded, such as N-[3-(triethoxysilyl)-propyl]-N,N'-diethyl-N'-trimethylsilyl-ethane-1,2-diamine and 3-(4-trimethylsilyl-1-piperazinyl)propyltriethoxysilane; alkoxysilane compounds to which a plurality of substituted amino groups as described in WO2008/013090 are bonded, such as N-[2-(trimethoxysilanyl)-ethyl]-N,N',N'-trimethylethane-1,2-diamine, 1-[3-(triethoxysilanyl)-propyl]-4-methylpiperazine, 2-(trimethoxysilanyl)-1,3-dimethylimidazolidine, and bis-(3-dimethylaminopropyl)-dimethoxysilane; alkoxysilane compounds to which a nitrogen-containing heterocyclic ring as described in WO2011/040312 is bonded, such as 1,4-bis[3-(trimethoxysilyl)propyl]piperazine and 1,4-bis[3-(triethoxysilyl)propyl]piperazine; and alkoxysilane compounds to which an azasilane group as described in WO2011/129425 is bonded, such as 3-[N,N-bis(trimethylsilyl)amino]propyltrimethoxysilane, 3-[N,N-bis(trimethylsilyl)amino]propylmethyldiethoxysilane, 2,2-dimethoxy-1-(3-trimethoxysilylpropyl)-1-aza-2-silacyclopentane, and 2,2-diethoxy-1-(3-triethoxysilylpropyl)-1-aza-2-silacyclopentane.

The compounds binding to the polymeric active terminal to form a hydroxyl group at the terminal of the polymer are not particularly limited, and examples thereof include epoxy compounds such as ethylene oxide and propylene oxide; and ketone compounds such as benzophenone.

Main-Chain Modification Step

The main-chain modification step is a step in which a vinyl group in the main chain of the modified conjugated diene-based polymer with the terminal modified is subjected to a hydrosilylation reaction with a silicon compound having at least one functional group selected from the group consisting of an amino group, an alkoxysilyl group, and a hydroxyl group, or a silicon compound forming at least one functional group selected from the group consisting of an amino group, an alkoxysilyl group, and a hydroxyl group, to modify the main chain. This step is carried out in the same manner in the case of using a polymerization initiator and in the case of using the polyfunctional initiator.

The hydrosilylation reaction can be performed in an organic solvent solution or as a polymer (without solvent) in a kneading machine. Specifically, a silicon compound such as a hydrosilane compound having the functional group can be reacted in the presence of a catalyst to modify the vinyl group of the main chain of the conjugated diene-based copolymer. After the polymerization step in solution polymerization, it is preferable to use the polymeric solution with the polymeric terminal moiety further modified as described above, as it is.

Specific examples of the silicon compounds include, but are not particularly limited to, hydrosilane compounds. Such hydrosilane compounds are not particularly limited, and specifically may be any hydrosilane compounds having at least one functional group selected from the group consisting of an amino group, an alkoxysilyl group, and a hydroxyl group. Among them, a preferable hydrosilane compound includes a hydrosilane compound represented by the general formula $HSiR''_{3-n}X_n$, wherein R" is not particularly limited, and represents a hydrocarbon group having 1 to 20 carbon atoms; X represents a hydrocarbon or an organosilane compound group having at least one functional group selected from the group consisting of an amino group, an alkoxy group, a hydroxyl group, or an amino group, an alkoxysilyl group, and a hydroxyl group; and n is 1 to 3. More preferably, n is 1, and R" preferably represents a hydrocarbon having 1 to 3 carbon atoms. In a case where the hydrosilane compound has such a configuration, the yield of the hydrosilylation reaction is high.

Such a hydrosilane compound may also be a silicon compound forming the functional groups by hydrolysis or the like after the hydrosilylation reaction. Examples of such silicon compound include, but are not particularly limited to, hydrosilane compounds forming at least one functional group selected from the group consisting of an amino group, an alkoxysilyl group, and a hydroxyl group, specifically by hydrolysis or the like. More specifically hydrosilane compounds having a protected monosubstituted amino group, a protected disubstituted amino group, a protected hydroxyl group, and the like.

Specific examples of silicon compounds having an alkoxy group include, but are not particularly limited to, organosiloxane compounds having a H—Si group and an alkoxysilyl group in the molecule, such as dimethylmonomethoxysilane, dimethylmonoethoxysilane, dimethylmonopropoxysilane, dimethylmonobutoxysilane, methyldimethoxysilane, methyldiethoxysilane, methyldipropoxysilane, ethyldiethoxysilane, trimethoxysilane, and triethoxysilane.

Specific examples of silicon compounds having a disubstituted amino group include, but are not particularly limited to, dimethylaminodimethylsilane, diethylaminodimethylsilane, diethylaminodiethylsilane, 3-diethylaminopropyldimethylsilane, 4-dimethylaminobutyldimethylsilane, and 6-diethylaminohexyldimethylsilane.

Specific examples of silicon compounds having a protected monosubstituted amino group include, but are not particularly limited to, N-methyl-N-trimethylsilylaminodimethylsilane and N-ethyl-N-trimethylsilylaminodiethylsilane.

Specific examples of silicon compounds having a protected disubstituted amino group include, but are not particularly limited to, N,N-bistrimethylsilylaminodimethylsilane and N,N-bistrimethylsilylaminodiethylsilane.

Specific examples of silicon compounds having a hydroxyl group include, but are not particularly limited to, dimethylhydroxysilane, diethylhydroxysilane, and dibutylhydroxysilane.

Specific examples of silicon compounds forming a hydroxyl group by hydrolysis include, but are not particularly limited to, alkoxysilane compounds such as dimethylmonomethoxysilane, dimethylmonoethoxysilane, methyldimethoxysilane, trimethoxysilane, and triethoxysilane; and silane compounds having an epoxy group such as dimethylglycidylsilane and diethylglycidylsilane.

In modifying a vinyl group of the main chain of the modified conjugated diene-based copolymer, the amount of the hydrosilane compound to be reacted is arbitrary depending on the purpose, but is preferably 1 to 10 mol based on 1 mol of the main chain of the copolymer. As described later, modification of 1 to 10 mol of the hydrosilane compound based on 1 mol of the main chain results in a good affinity obtained and excellent processability when the modified diene-based copolymer is mixed with silica to obtain a rubber composition. The amount is more preferably 2 to 5 mol based on 1 mol of the main chain.

A predetermined catalyst may be used when performing the hydrosilylation reaction. The catalyst is not particularly limited, and for example, platinum or platinum-containing catalysts are mainly used. Preferably, homogeneous platinum catalysts are suitably used, and examples thereof include platinum chloride solution (i.e., Speier catalyst), $Pt_2$ (divinyltetramethyldisiloxane)$_3$ solution (i.e., Karstedt catalyst), and dichloro($\eta$4-cyclo-1,5-diene) Pt (II). The amount of platinum catalyst to be used for the reaction per hydrosilane compound is preferably 0.01 to 10 mmol/mol and more preferably 0.1 to 1 mmol/mol.

Examples of other catalysts used in the hydrosilylation reaction include metallocene compounds containing any of Ti, Zr, Hf, Ni, Co, Ru, and Rh, and in particular, a reactant of a titanocene compound with organolithium or organoaluminum is suitable.

The hydrosilylation reaction is preferably performed in a range from 20 to 150° C., more preferably in a range from 50 to 120° C. In this range, it is possible to carry out the reaction in an appropriate amount of time, and it is practical because there are few side reactions such as gelation. In a case where the polymerization solution is used as is and the hydrosilylation reaction is performed following the terminal modification reaction, the reaction can be performed at the same temperature as the polymerization temperature. In the solution state, the reaction time is preferably in a range from 10 minutes to 5 hours and more preferably in a range from 30 minutes to 2 hours.

The weight average molecular weight (in terms of polystyrene) of the modified conjugated diene-based copolymer of the present invention is preferably 100,000 to 2,000,000 and more preferably 150,000 to 1,000,000 in consideration of processability and physical properties. The weight average molecular weight can be determined from a calibration curve using standard polystyrene by measuring a chromatogram using GPC with a column packed with polystyrene gel as a filling agent.

Regarding compositional features of the structural units of the modified conjugated diene-based copolymer of the present invention, in a case where the aromatic vinyl compound (C) is not used, the proportion of the polyfunctional vinylaromatic copolymer (A) to the conjugated diene compound (B) is preferably in the following range.

The proportion of the structural unit (A1) derived from the modified vinylaromatic copolymer (A) having the structural unit (c) composed of a silane-based functional group represented by the formula (2) and/or the formula (3) is 0.001 to 6% by weight, preferably 0.001 to 5% by weight, more preferably 0.005 to 5% by weight, further preferably 0.01 to 5% by weight, and optimally 0.001 to 1% by weight. The proportion of the structural unit (B1) derived from the conjugated diene compound (B) is 29 to 99.999% by weight, preferably 80 to 99.999% by weight, more preferably 90 to 99.995% by weight, and further preferably 95 to 99.99% by weight.

In a case where the aromatic vinyl compound (C) is used, the proportion is preferably in the following range. The proportion of the structural unit (A1) is in the same range as the above, and the proportion of the structural unit (B1) is 30 to 97.999% by weight, preferably 45 to 94.995% by weight, and further preferably 55 to 89.99% by weight. The proportion of the structural unit (C1) derived from the aromatic vinyl compound (C) is 2 to 50% by weight, preferably 5 to 45% by weight, and further preferably 10 to 40% by weight.

The microstructure (cis, trans, and vinyl bond amount) of the modified conjugated diene-based copolymer can be arbitrarily changed by use of a polar compound or the like, but the content of the vinyl bond (1,2-bond) in the conjugated diene unit is preferably 10 to 80% by mol in a state before the terminal is modified. In a case where the modified conjugated diene-based copolymer of the present invention is used as the rubber composition described below and further crosslinked to use as an automobile tire, the content thereof is preferably 20 to 75% by mol, more preferably 30 to 75% by mol, and further preferably 40 to 70% by mol to achieve a high level of balance between the rolling resistance performance and the wear resistance. In this case, the mass ratio of a cis bond to a trans bond in the conjugated diene bond unit is preferably cis bond/trans bond=1/1.1 to 1.5.

A reaction terminator may be added if necessary to the polymeric solution of the modified conjugated diene-based copolymer to be obtained in the polymerization method described above. The reaction terminators usable are, for example, alcohols such as methanol, ethanol, and propanol; organic acids such as stearic acid, lauric acid, and octanoic acid; and water.

After the polymerization reaction of the modified conjugated diene-based copolymer is performed, metals contained in the polymer may be demineralized if necessary. As a demineralization method, for example, a method of bringing water, an organic acid, an inorganic acid, or an oxidant such as hydrogen peroxide into contact with a polymeric solution to extract metals and then separating a water layer is used.

Post Treatment

In a case where the modified conjugated diene-based polymer, which has been subjected to terminal modification and main-chain modification as described above, can be obtained as a solution, the solvent can be removed and dried in the usual manner after the addition of an antioxidant and an additive if necessary. Thereby, the polymer can be used as a raw material for the rubber composition described later. Specific examples of the methods include steam stripping and dehydration drying methods, and direct dewatering methods using a drum dryer, flushing, and a vent extruder.

The antioxidants are not particularly limited, and any known antioxidant can be used. Examples of the antioxidants include phenolic stabilizers, phosphorus-based stabilizers, and sulfur-based stabilizers. By way of specific example, antioxidants such as 2,6-di-tert-butyl-4-hydroxy-toluene (BHT), n-octadecyl-3-(4'-hydroxy-3',5'-di-tert-butylphenol) propinate, and 2-methyl-4,6-bis[(octylthio) methyl]phenol are preferable.

If necessary, water, alcohols such as methanol, ethanol, isopropanol, or the like may be added as an additive to remove or neutralize ionic substances, and carboxylic acids such as stearic acid, oleic acid, myristic acid, lauric acid, decanoic acid, citric acid, and malic acid, inorganic acid aqueous solutions, carbon dioxide, or the like may also be added.

The modified conjugated diene-based copolymer of the present invention may have 10% or more of an area of a region corresponding to a number average molecular weight (Mn) three times or more at a peak at the lowest molecular weight side based on a total area of 100% in a differential molecular weight distribution curve obtained by GPC measurement.

This is described with reference to FIGURE.

FIGURE shows a typical example of a GPC elution curve and the positions of peak top Mp and 3Mp which is a molecular weight three times the peak top molecular weight. The area of a region corresponding to a number average molecular weight 3Mp (the region to the right of 3Mp in FIGURE) three times of the number average molecular weight Mn at a peak of the lowest molecular weight side may be 10% by area or more. This means that the high molecular weight component is relatively high.

The modified vinylaromatic copolymer (A) of the present invention can itself be used as a modifier for rubber compositions. It is presumed that copolymer (A) is blended into the rubber composition, to result in good processability of the rubber composition and an enhancement in affinity of the reinforcing filling agent in the rubber composition to be obtained, thus making it easier to exist in the vicinity of the reinforcing filling agent when making the rubber composition, and as a result, the dispersion state of the reinforcing filling agent or the like in the rubber composition is ideal for enhancements in physical properties (for example, dry-grip performance, and wet-grip performance) of a crosslinked product to be obtained. As a result of the branched polymer-type modification group based on the modified vinylaromatic copolymer being easy to exist in the vicinity of the reinforcing filling agent, a crosslinked product with excellent wear resistance can be obtained.

Next, the modified conjugated diene-based copolymer composition (hereinafter, also referred to as the rubber composition) of the present invention is described.

The rubber composition contains the modified conjugated diene-based polymer and the filler.

The rubber composition of the present invention in another aspect contains 0.5 to 200 parts by mass of the reinforcing filling agent based on 100 parts by mass of the modified conjugated diene-based polymer.

The rubber composition of the present invention in another aspect contains 100 parts by mass of raw rubber containing 20 parts by mass or more of the modified conjugated diene-based polymer and 5 to 200 parts by mass of the filler.

Raw Material Rubber

The content of the modified conjugated diene-based polymer in 100 parts by mass of raw material rubber is 20 parts by mass or more, preferably 40 parts by mass or more, more preferably 50 parts by mass or more, and further preferably 60 parts by mass or more. In the content is 20 parts by mass or more, the dispersibility, which is the purpose of the present invention, is excellent, and the performance such as tensile properties and viscoelastic properties, is excellent in a case where the rubber composition of the present embodiment is used as a vulcanized composition, and excellent fuel consumption performance, grip performance, wear resistance, and rigidity are obtained in the case of using it as a material for tires. The content of the modified conjugated diene-based polymer is preferably 90 parts by mass or less, and more preferably 80 parts by mass or less. When the content of the modified conjugated diene-based polymer is set as 90 parts by mass or less, the Mooney viscosity of the unvulcanized modified conjugated diene-based copolymer composition of the present invention is reduced to result in enhancement in processability.

Examples of raw material rubbers other than the modified butadiene-based polymers include, but are not particularly limited to, conjugated diene-based polymers or hydrogenated substances thereof, random copolymers of a conjugated diene-based compound and a vinylaromatic compound or hydrogenated substances thereof, block copolymers of a conjugated diene-based compound and a vinylaromatic compound or hydrogenated substances thereof, the other conjugated diene-based copolymers or hydrogenated substances thereof, non-diene-based polymers, and natural rubbers.

Specific examples of the conjugated diene-based polymer or hydrogenated substances thereof include, but are not particularly limited to, butadiene rubber or hydrogenated substances thereof, and isoprene rubber or hydrogenated substances thereof.

Specific examples of random copolymers of the conjugated diene-based compound and the vinylaromatic compound or hydrogenated substances thereof include, but are not particularly limited to, styrene-butadiene copolymerized rubbers or hydrogenated substances thereof.

Specific examples of block copolymers of the conjugated diene-based compounds and the vinylaromatic compound, or hydrogenated substances thereof, include, but are not particularly limited to, styrene-based elastomers such as styrene-butadiene block copolymers or hydrogenated substances thereof, and styrene-isoprene block copolymers or hydrogenated substances thereof.

Specific examples of other conjugated diene-based copolymers or hydrogenated substances thereof include, but are not particularly limited to, acrylonitrile-butadiene rubbers or hydrogenated substances thereof.

Examples of the non-diene-based polymers include, but are not particularly limited to, olefinic elastomers such as ethylene-propylene rubber, ethylene-propylene-diene rubber, ethylene-butene-diene rubber, ethylene-butene rubber, ethylene-hexene rubber, and ethylene-octene rubber, butyl rubber, brominated butyl rubber, acrylic rubber, fluororubber, silicone rubber, chlorinated polyethylene rubber, epichlorohydrin rubber, a, I3-unsaturated nitrile-acrylate ester-conjugated diene copolymer rubber, urethane rubber, and polysulfide rubber.

In the present invention, the other rubber is preferably polybutadiene in a case where the modified conjugated diene-based polymer is a modified styrene-butadiene rubber. In a case where the modified butadiene-based polymer is modified polybutadiene, the other rubber is preferably natural rubber or polyisoprene rubber.

The weight average molecular weight of the various rubbery polymers described above is preferably 2,000 to 2,000,000, and more preferably 5,000 to 1,500,000, from the viewpoint of balance between performance and processing properties. So-called liquid rubber of low molecular weight can also be used. These rubbery polymers may be used alone, or two or more thereof may be used in combination. The weight average molecular weight here is a weight average molecular weight (Mw) in terms of polystyrene obtained by gel permeation chromatography (GPC) measurement.

The amount of filler used for the raw material rubber is adjusted to achieve the desired physical properties according to the application, as the hardness and modulus increase when the filler is used more. Within this range, the filler has good dispersion and good processability. The amount of the filler is preferably 5 to 150 parts by mass for tire applications, and preferably 30 to 200 parts by mass for footwear applications. In the range of the present embodiments, it is possible to handle a wide range of soft and hard materials.

Reinforcing Filling Agent

The rubber composition as another aspect of the present invention includes 0.5 to 200 parts by mass of at least one reinforcing filling agent selected from the group consisting of a silica-based inorganic filling agent, metal oxide, metal hydroxide, and carbon black based on 100 parts by mass of the modified conjugated diene-based polymer and preferably based on 100 parts by mass of the raw material rubber.

As a silica-based inorganic filling agent contained in the rubber composition, solid particles containing $SiO_2$ or a silicate as a main component of the structural unit are preferably used. Here, the main component means a component that occupies 50% by mass or more of the whole, preferably 70% by mass or more, and more preferably 90% by mass or more.

Specific examples of silica-based inorganic filling agents include inorganic fibrous materials such as silica, clay, talc, mica, diatomaceous earth, wollastonite, montmorillonite, zeolite and glass fibers. The silica-based inorganic filling agent may be used alone, or two or more thereof may be used in combination. A silica-based inorganic filling agent whose surface has been hydrophobicized, and a mixture of a silica-based inorganic filling agent and an inorganic filling agent other than silica types can also be used. Among them, silica and glass fiber are preferable, and silica is more preferable.

The silica usable is fumed silica, wet silica, synthetic silicate silica, and the like, but above all, wet silica is preferable because it is more excellent in both improvement of fracture characteristics and wet skid resistance performance.

In the rubber composition of the present invention, other reinforcing filling agents can be further used in combination. The combined effect of the various functional groups of the modified conjugated diene-based copolymer of the present invention improves the dispersion of both silica and other reinforcing filling agents, resulting in an excellent reinforcing effect.

The silica with a BET specific surface area of 50 to 500 $m^2/g$ is used as the reinforcing filling agent. The blending of such silica provides excellent fuel efficiency, wear resistance, wet skid performance and handling stability.

In the rubber composition of the present invention, silica with a high specific surface area, i.e., particulate silica, can be well dispersed because of the good dispersibility of silica.

The silica-based inorganic filling agent can be particulate silica, and the particulate silica can contain silica with a CTAB specific surface area of 180 $m^2/g$ or more and a BET specific surface area of 185 $m^2/g$ or more. The blending of such particulate silica provides the rubber composition with excellent low fuel efficiency, wear resistance, wet skid performance and handling stability.

The CTAB (cetyltrimethylammonium bromide) specific surface area of particulate silica is not particularly limited, and is preferably 190 $m^2/g$ or more, more preferably 195 $m^2/g$ or more, and further preferably 197 $m^2/g$ or more. A rubber composition with excellent wear resistance can be obtained when the CTAB specific surface area is 180 $m^2/g$ or more. The upper limit of the specific surface area is not particularly limited, and is preferably 500 $m^2/g$ or less, more preferably 300 $m^2/g$ or less, and further preferably 250 $m^2/g$ or less. A rubber composition with excellent processability can be obtained when the CTAB specific surface area is 500 $m^2/g$ or less. The CTAB specific surface area is preferably 190 to 300 $m^2/g$. The CTAB specific surface area is measured in accordance with ASTM D3765-92.

The BET specific surface area of particulate silica is not particularly limited, and is preferably 190 $m^2/g$ or more, more preferably 195 $m^2/g$ or more, and further preferably 210 $m^2/g$ or more. A rubber composition with excellent wear resistance can be obtained when the BET specific surface area is 185 $m^2/g$ or more. The upper limit of the BET specific surface area is not particularly limited, and is preferably 500 $m^2/g$ or less, more preferably 300 $m^2/g$ or less, and further preferably 260 $m^2/g$ or less. A modified conjugated diene-based copolymer composition with excellent processability can be obtained when the BET specific surface area is 500 $m^2/g$ or less. The BET specific surface area of silica is measured in accordance with ASTM D3037-81.

The aggregate size of the particulate silica is not particularly limited and can be 30 nm or more, preferably 35 nm or more, more preferably 40 nm or more, further preferably 45 nm or more, further more preferably 50 nm or more, and even more preferably 55 nm or more. The aggregate size is not particularly limited, and is preferably 100 nm or less, more preferably 80 nm or less, further preferably 70 nm or less, and particularly preferably 65 nm or less. Such an aggregate size can provide excellent reinforcing properties, fuel efficiency, wear resistance, wet skid performance, and handling stability, while having good dispersibility. The aggregate size is also known as the aggregate diameter or the maximum frequency Stokes equivalent diameter, and is equivalent to the particle size when a silica aggregate consisting of multiple primary particles is regarded as a single particle. The aggregate size can be measured, for example, using a disc centrifugal settling particle size distribution measurement apparatus such as BI-XDC (manufactured by Brookhaven Instruments Corporation). Specifically, it can be measured by the method described in Japanese Patent Laid-Open No. 2011-132307.

The average primary particle size of the particulate silica is not particularly limited, and is preferably 25 nm or less, more preferably 22 nm or less, further preferably 17 nm or less, and particularly preferably 14 nm or less. A lower limit of the average primary particle size is not particularly limited, and is preferably 3 nm or more, more preferably 5 nm or more, and further preferably 7 nm or more. In this range, the dispersibility and reinforcing properties are excellent. The average primary particle size of particulate silica can be determined by observing the silica with a transmission or scanning electron microscope, measuring at least 400 primary particles of silica observed in the field of view, and averaging the results.

The amount of the particulate silica blended in the rubber composition of the present invention is not particularly limited and is preferably 5 parts by mass or more, more preferably 15 parts by mass or more, further preferably 20 parts by mass or more, further more preferably 25 parts by mass or more, and even more preferably 30 parts by mass or more, based on 100 parts by mass of the rubber component. If the amount is 5 parts by mass or more, the effect of blending particulate silica is sufficiently obtained. An upper limit of the amount of the particulate silica blended is 200 parts by mass or less, preferably 100 parts by mass or less, more preferably 80 parts by mass or less, further preferably 60 parts by mass or less, and further more preferably 55 parts by mass or less. If the amount is 200 parts by mass or less, substantially good processability is obtained.

The rubber composition of the present invention may preferably contain silica with a BET specific surface area less than 185 m$^2$/g as a reinforcing filling agent and 5 to 100 parts by mass of carbon black.

Furthermore, silica with a BET method nitrogen adsorption specific surface area (N2SA) of less than 185 m$^2$/g is preferably used as a reinforcing filling agent, silica with a N2SA of less than 150 m$^2$/g is further preferably used, and silica with a N2SA of 50 m$^2$/g or more is preferably used. In this range, there is a good balance between reinforcing properties and dispersibility. In addition, suitable particle sizes are used according to the application.

Carbon blacks include N110, N220, N330, N339, N550, N660, or the like from the classification of carbon blacks for rubber by ASTM, and are selected according to the application. The combined use of carbon black can increase reinforcing properties and enhance dry-grip performance when used in tire tread applications. Carbon black to be used has a BET method nitrogen adsorption specific surface area (N2SA) of preferably less than 185 m$^2$/g, preferably 30 m$^2$/g or more, and more preferably in a range from 50 to 130 m$^2$/g. In this range, there is a good balance between reinforcing properties and dispersibility. The carbon black is further preferably N220, N330, and N339 when used in tire tread applications.

In addition to the silica described above, other reinforcing filling agents can be further used as a reinforcing filling agent. Such other reinforcing filling agents are not particularly limited, and metal oxides as reinforcing filling agent are preferably solid particles with a component having the chemical formula MxOy (M represents a metal atom, and x and y each represent an integer of 1 to 6.) as the main component. Here, the main component means a component that occupies 50% by mass or more of the whole, preferably 70% by mass or more, and more preferably 90% by mass or more.

Examples of the metal oxides usable include alumina, titanium oxide, magnesium oxide, and zinc oxide.

Examples of the metal hydroxides used as reinforcing filling agents include aluminum hydroxide, magnesium hydroxide, and zirconium hydroxide.

The metal oxides and the metal hydroxides as such other reinforcing filling agents may be used alone, or two or more kinds thereof may be in combination. Mixtures with inorganic filling agents other than these can also be used.

A silane coupling agent may also be used in the rubber composition of the present invention. Examples of the silane coupling agents include, but are not particularly limited, compounds having both a silica affinity moiety and a polymer affinity moiety in the molecule, such as sulfide-based compounds, mercapto-based compounds, vinyl-based compounds, amino-based compounds, glycidoxy-based compounds, nitro-based compounds, and chloro-based compounds.

Examples of the sulfide-based compounds include bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, 3-trimethoxysilylpropyl-N,N,-dimethylthiocarbamoyl tetrasulfide, 3-triethoxysilylpropyl-N,N,-dimethylthiocarbamoyl tetrasulfide, 2-trimethoxysilylethyl-N,N-dimethylthiocarbamoyl tetrasulfide, 3-trimethoxysilylpropylbenzothiazole tetrasulfide, 3-triethoxysilylpropylbenzothiazole tetrasulfide, 3-triethoxysilylpropyl methacrylate monosulfide, 3-trimethoxysilylpropyl methacrylate monosulfide, and 3-octanoylthio-1-propyltriethoxysilane.

Examples of the mercapto-based compounds include 3-mercaptopropyltrimethoxysilane, 3-mercaptopropyltriethoxysilane, 2-mercaptoethyltrimethoxysilane, and 2-mercaptoethyltriethoxysilane.

Examples of the vinyl-based compounds include vinyltriethoxysilane and vinyltrimethoxysilane.

Examples of the amino-based compounds include 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane.

Examples of the glycidoxy-based compounds include γ-glycidoxypropyltriethoxysilane, γ-glycidoxypropyltrimethoxysilane, γ-glycidoxypropylmethyldiethoxysilane, and γ-glycidoxypropylmethyldimethoxysilane.

Examples of the nitro-based compounds include 3-nitropropyltrimethoxysilane and 3-nitropropyltriethoxysilane.

Examples of chloro-based compounds include 3-chloropropyltrimethoxysilane, 3-chloropropyltriethoxysilane, 2-chloroethyltrimethoxysilane, and 2-chloroethyltriethoxysilane.

Examples of the other compounds include octyltriethoxysilane, methyltriethoxysilane, methyltrimethoxysilane, and hexadecyltrimethoxysilane.

Such silane coupling agents may be used alone or two or more kinds thereof may be in combination. Among these silane coupling agents, sulfur-containing silane coupling agents such as sulfide-compounds and mercapto-compounds are preferable from the viewpoint of the large reinforcing effect, and bis(3-triethoxysilylpropyl)disulfide, bis(3-triethoxysilylpropyl)tetrasulfide, and 3-mercaptopropyltrimethoxysilane are more preferable.

The amount of the silane coupling agent blended is 1 to 20 parts by mass and preferably 2 to 15 parts by mass, based on 100 parts by mass of silica. When the silane coupling agent is blended in this range, the performance of vulcanized rubber is improved, such as better dispersibility of silica, better processability, and more enhancement in wear resistance.

In the rubber composition of the present invention, it is possible to adjust the hardness and modulus by use of plasticizers. The plasticizers are not particularly limited, and for example, the same oils as the above extensibility oils are usable, and in addition, various natural product oils, synthetic oils, low molecular weight polymers or the like can be used. In addition, known processing auxiliaries can be used.

Crosslinking Agent

The rubber composition of the present invention may be a rubber composition that has been subjected to a crosslinking treatment by adding a crosslinking agent, a blending agent, and the like thereto. Such a crosslinking agent is not particularly limited, and for example, a sulfur-based vulcanizing agent, an organic peroxide, and the like are used.

The sulfur-based vulcanizing agent is not particularly limited, and for example, sulfur and morpholinedisulfide are used, while benzoyl peroxide, dicumyl peroxide, di-t-butyl peroxide, t-butylcumyl peroxide, cumene hydroperoxide, and the like are used as organic peroxides, for example.

If necessary, a vulcanization accelerator may be blended, and as the vulcanization accelerator, which is not particularly limited, for example, at least one of the following can be used: sulfenamide, thiazole, thiuram, thiourea, guazinine, dithiocarbamate, aldehyde-amine or aldehyde-ammonia, imidazoline, or xanthate vulcanization accelerators.

In addition, a vulcanization aid may be added if necessary. As a vulcanization aid, which is not particularly limited, for example, zinc oxide and stearic acid can be used. Furthermore, an anti-aging agent can be used.

The modified conjugated diene-based copolymer composition of the present invention can be produced by mixing each of the above components.

A method of mixing the modified conjugated diene-based copolymer with at least one reinforcing filling agent selected from the group consisting of a silica-based inorganic filling agent, a metal oxide, a metal hydroxide, and carbon black, and if desired, a silane coupling agent, is not particularly limited. Examples thereof include melt kneading method using a usual mixture such as an open roll, a Banbury mixer, a kneader, a single-screw extruder, a twin-screw extruder, or a multi-screw extruder, and a method in which each component is dissolved and mixed, and then the solvent is heated and removed. Above all, the melt kneading method using a roll, Banbury mixer, a kneader, or an extruder is preferable from the viewpoint of productivity and good kneading properties. Either of a method of kneading the rubber component and various blending agents at one time and a method of mixing them in plurality of times is applicable.

In the present invention, the degree of polymer concentration capacity on the filling material surface can be expressed by the bound rubber amount of the modified conjugated diene-based polymer at 25° C. The bound rubber amount in the rubber composition after the completion of kneading described above is preferably 15% by mass or more, and more preferably 20% by mass or more, from the viewpoint of improvement of wear resistance and fracture strength.

The rubber composition may be a vulcanized composition that has been subjected to a vulcanization treatment with a vulcanizing agent. As the vulcanizing agents, for example, radical generating agents such as organic peroxides and azo compounds, oxime compounds, nitroso compounds, polyamine compounds, sulfur, and sulfur compounds can be used. The sulfur compounds include sulfur monochloride, sulfur dichloride, disulfide compounds, and polymeric polysulfide compounds.

The amount of vulcanizing agent used is not particularly limited, and is preferably 0.01 to 20 parts by mass, and more preferably 0.1 to 15 parts by mass, based on 100 parts by mass of the conjugated diene-based copolymer. As the vulcanization method, conventionally known methods can be applied, and the vulcanization temperature is preferably, for example, at 120° C. to 200° C., and more preferably 140° C. to 180° C.

In vulcanization, a vulcanization accelerator may be used if necessary. As a vulcanization accelerator, conventionally known materials can be used, and examples thereof include sulfenamides, guanidines, thiurams, aldehyde-amines, aldehyde-ammonias, thiazoles, thioureas, and dithiocarbamates. As a vulcanization aid, zinc oxide, stearic acid, and the like can be used.

The amount of a vulcanization accelerator used is not particularly limited, but is preferably 0.01 to 20 parts by mass and more preferably 0.1 to 15 parts by mass, based on 100 parts by mass of the conjugated diene-based copolymer.

To the rubber composition of the present invention, a rubber softener may be blended to improve the processability. As a rubber softener, mineral oil, or a liquid or low molecular weight synthetic softener is suitable.

A mineral oil-based rubber softener called process oil or extender oil used to improve the softening, volume increase, and processability of rubbers is a mixture of aromatic rings, naphthene rings and paraffin chains; the mineral oil-based rubber softener in which the carbon number of the paraffin chain accounts for 50% or more of the total carbon is called a paraffin type, one in which the carbon number of the naphthene ring accounts for 30 to 45% is called a naphthene type, and one in which the aromatic carbon number exceeds 30% is called an aromatic type. As a rubber softener used in the present embodiment, the naphthene type and/or the paraffin type is preferable.

The amount of the rubber softener blended is not particularly limited, and is preferably 10 to 80 parts by mass and more preferably 20 to 50 parts by mass based on 100 parts by mass of the conjugated diene-based copolymer.

In the rubber composition, various additives such as softeners and filling agents other than those described above, as well as heat stabilizers, antistatic agents, weather-resistant stabilizers, anti-aging agents, colorants, and lubricants may be used to the extent that the purpose of the present embodiment is not impaired. Specific examples of the filling agents include calcium carbonate, magnesium carbonate, aluminum sulfate, and barium sulfate.

Examples of the softeners blended if necessary to adjust the hardness and fluidity of a target product include liquid paraffin, castor oil, and linseed oil. Known materials can be applied as a heat stabilizer, an antistatic agent, a weather-resistant stabilizer, an anti-aging agent, a colorant, and a lubricant.

The crosslinked rubber of the present invention can be obtained by crosslinking a rubber composition compounded with the crosslinking agent of the present invention.

The tire member of the present invention is obtained from a crosslinked rubber product. For example, a tire can be produced by extruding and molding the rubber composition according to the shape of the tire (specifically, the shape of a tread), heating and pressurizing it in a vulcanizing machine to produce the tread, and assembling the tread with other parts to produce the target tire.

The rubber composition of the present invention has excellent mechanical strength and wear resistance if it is made into a crosslinked rubber product. Therefore, as described above, the composition can be suitably applied to treads of tires such as fuel-efficient tires, large tires, high-performance tires, and tire members such as sidewall members. In addition to the such tire members, the composition can be suitably used for rubber belts, rubber hoses, footwear materials, and the like.

EXAMPLES

The present invention is described in more detail below, but the present invention is not limited to these Examples. Unless otherwise specified, the parts in each example are parts by weight, and the evaluation of each physical property was performed by the method shown below.

1) Molecular Weight and Molecular Weight Distribution

The molecular weight and molecular weight distribution measurements were performed using GPC (HLC-8220 GPC, manufactured by Tosoh Corporation) with tetrahydrofuran (THF) as a solvent, a flow rate of 1.0 ml/min, a column temperature of 38° C., and a calibration curve with monodisperse polystyrene.

2) Structure of Polyfunctional Vinylaromatic Copolymer

The structure was determined using a JNM-LA600 nuclear magnetic resonance spectrometer manufactured by JEOL Ltd. through $^{13}C$-NMR and $^{1}H$-NMR analysis. Chloroform-$d_1$ was used as the solvent, and a resonance line of tetramethylsilane was used as an internal standard.

3) Mooney Viscosity (ML(1+4) 100° C.)

According to JIS K6300-1, the Mooney viscosity was determined with an L-shaped rotor, preheating for 1 minute, a rotor operation time of 4 minutes, and temperature of 100° C.

4) Haze

A sample prepared by dissolving 0.5 g of a copolymer in 100 g of toluene was put into a quartz cell, and the Haze (turbidity) thereof was measured using an integrating sphere type light transmittance measurement device (SZ-Σ90, manufactured by NIPPON DENSHOKU INDUSTRIES CO., LTD.) with toluene as a reference sample.

5) Glass Transition Temperature (Tg)

A solution prepared by dissolving a polyfunctional vinylaromatic copolymer in toluene was homogeneously applied to a glass substrate, and heated and dried using a hot plate at 90° C. for 30 minutes so that the thickness after drying would be 20 μm. A resin film obtained together with the glass substrate was set in a TMA (thermomechanical analyzer), heated to 220° C. at a heating rate of 10° C./min under a nitrogen gas flow, and further subjected to heat treatment at 220° C. for 20 minutes, to thereby remove the remaining solvent and also cure the polyfunctional vinylaromatic copolymer. After the glass substrate was cooled to room temperature, an analysis probe was brought into contact with a sample in the TMA measurement device, and then scan measurement was performed at 30° C. to 360° C. under a nitrogen gas flow at a heating rate of 10° C./min, determining a softening temperature by a tangent method.

6) Solvent Solubility

In a case where the copolymer was soluble in toluene, xylene, THF, dichloroethane, dichloromethane, and chloroform and 100 g or more of the copolymer was dissolved in 100 g of each of the solvents without gel generation observed, the copolymer was determined as solvent soluble ○.

7) Content of Vinyl Bond of Conjugated Diene Unit of Conjugated Diene-Based Copolymer A carbon disulfide solution was used as a sample, an infrared spectrum in a range from 600 to 1,000 $cm^{-1}$ using a solution cell, and a vinyl bond amount was determined according to the calculation formula of Hampton (styrene-butadiene copolymer) method with the absorbance at a predetermined wavenumber. A Spectrum 100 manufactured by PerkinElmer Co., Ltd. was used as the device.

8) Bound Rubber Amount (%)

A closed kneading device with a kneading chamber internal volume of 2 L was used to knead 100 parts by mass of the modified conjugated diene-based polymer and 60 parts by mass of wet silica (BET method specific surface area: 205±10 $m^2$/g, product name "Nipsil AQ" manufactured by Tosoh Silica Corporation) with {(volume of kneaded rubber composition/kneading chamber internal volume)×100} of 60%, and when the maximum kneading temperature reached 160° C., the rubber kneaded product was discharged to obtain a rubber composition M for measuring the bound rubber amount.

After 0.2 g of the rubber composition M was cut into 1 mm squares to measure the mass, the composition was added to 25 mL of toluene and left at 25° C. for 48 hours, and then the mixture was filtered with a glass fiber filter manufactured by ADVANTEC to separate the toluene-insoluble content, followed by weighing after vacuum drying of the separated toluene-insoluble content, determining the bound rubber amount according to the following formula.

Bound rubber amount (%)={(mass of toluene insoluble content−mass of wet silica in rubber composition M)/(mass of rubber composition M−mass of wet silica in rubber composition M)}×100

The BET method specific surface area of silica is measured in accordance with ISO 5794/1.

9) Tensile Strength

A 300% modulus was measured by a tensile test method according to JIS K6251, and indexed by setting a measurement value of the crosslinked rubber obtained in Example 7 as 100. A larger index value indicates better tensile strength.

10) Wear Resistance

The wear amount with a slip rate of 30% was measured using a method of using Lambourn-type wear testing machine in accordance with JIS K6264, and indexed by setting a measurement value of the crosslinked rubber obtained in Example 10 as 100. The larger the index value, the better the wear resistance.

The raw materials used in Examples or abbreviations thereof are as follows. DVB-630; mixture of divinylbenzene component (DVB) and ethylvinylbenzene component (EVB), DVB and EVB as (mixture of m-isomer and p-isomer); DVB content 63.0 wt %, manufactured by NIPPON STEEL Chemical & Material Co., Ltd.)

BHT; 2,6-di-tert-butyl-p-cresol

BTESPA; bis(3-trimethoxysilylpropyl)methylamine

Synthetic Example 1

In a 500 mL reactor, 31.00 g of DVB-630 (0.150 mol of DVB and 0.088 mol of EVB), 65.72 g (0.631 mol) of styrene, 70.80 g (0.631 mol) of diisobutylene, 60 mmol (6.90 mL) of n-propyl acetate, and 48.55 g (0.527 mol) of toluene were placed. At 70° C., 15.2 mmol of a boron trifluoride-diethyl ether complex (1.91 mL) was added to the reactor and reacted for 2.0 hours. After stopping the polymerization solution with a sodium hydrogen carbonate aqueous solution, an oil layer was washed with pure water three times and devolatilized at 60° C. under reduced pressure to recover a copolymer, obtaining 60.6 g of a polyfunctional vinylaromatic copolymer (copolymer A-1).

The copolymer A-1 had an Mn of 941, an Mw of 2,850, and an Mw/Mn of 3.03. The copolymer A-1 contained 19.0% by mol (21.8 wt %) of DVB-derived structural units, 8.3% by mol (9.6 wt %) of EVB-derived structural units, 48.6% by mol (44.6 wt %) of structural units derived from styrene, and 24.2% by mol (24.0 wt %) of structural units derived from diisobutylene. The crosslinked structural unit (a1) was 4.6% by mol (5.2 wt %) and the degree of crosslinking (a1/a) was 0.24. The structural unit (a2) having a residual vinyl group was 14.4% by mol (16.5 wt %) and a molar fraction of the structural unit (a2) to the sum of the structural units (a), (b), and (c) was 0.144.

The cured product had a Tg of 167° C. and a softening temperature of 280° C. or higher. The weight loss at 350° C. was 1.41 wt %.

When a sample prepared by dissolving 0.5 g of the polyfunctional vinylaromatic copolymer (A-1) in 100 g of toluene was put into a quartz cell, and the Haze (turbidity) thereof was measured using an integrating sphere type light transmittance measurement device with toluene as a reference sample, the Haze value was 0.02.

Example 1

Into a 300 mL three-necked flask, 50.0 g of the copolymer A-1 and 50.0 g of ethylcyclohexane were charged and degassed with nitrogen while stirring at 60° C. for 3 hours. To the flask, 0.032 g of t-butylperoxy-2-ethylhexanoate and 30.6 g of (3-mercaptopropyl)trimethoxysilane (MPTMS) were added and reacted at 90° C. for 8 hours to obtain 80.6 g of a modified vinylaromatic copolymer (copolymer A-2) in terms of solid content.

Example 2

In a nitrogen-substituted autoclave reactor, 200 g of cyclohexane and 5 g of a cyclohexane solution containing 6.2 mg (0.032 mmol) of 2,2-di(2-tetrahydrofuryl)propane were charged. At 50° C., 5 g of a cyclohexane solution containing 10 mg (0.16 mmol) of n-butyllithium as pure content was added to the reactor, followed by the addition of 10 g of styrene and 40 g of 1,3-butadiene, which had been cleared of impurities in advance, to initiate the polymerization. The temperature of the reaction solution increased due to the polymerization heat, reaching a maximum temperature of 81° C.

After the completion of the polymerization reaction, 5 g of a cyclohexane solution containing 0.031 g of the copolymer A-2 obtained in Example 1 was added to the reactor as a modifying agent to carry out a modification reaction, and the modification reaction was carried out for 30 minutes at a temperature condition of 50° C. to obtain a polymeric solution.

Further, 0.08 mmol of BTESPA was added to the polymeric solution and subjected to a modification reaction for 30 minutes to obtain a polymer solution containing a modified conjugated diene-based copolymer.

After 0.045 g of 2,6-di-tert-4-hydroxytoluene was added as an antioxidant to the obtained polymerization solution, the solvent was removed by steam stripping, followed by vacuum drying to obtain a modified conjugated diene-based copolymer (copolymer A-3).

Synthetic Example 2

In a 500 mL reactor, 46.49 g of DVB-630 (0.225 mol of DVB and 0.132 mol of EVB), 53.33 g (0.512 mol) of styrene, 70.80 g (0.631 mol) of diisobutylene, 60 mmol (6.90 mL) of n-propyl acetate, and 48.55 g (0.527 mol) of toluene were placed. At 70° C., 10.0 mmol of a boron trifluoride-diethyl ether complex (1.26 mL) was added to the reactor and reacted for 2.0 hours. After stopping the polymerization solution with a sodium hydrogen carbonate aqueous solution, an oil layer was washed with pure water three times and devolatilized at 60° C. under reduced pressure to recover a copolymer, obtaining 66.4 g of a polyfunctional vinylaromatic copolymer (copolymer B-1).

The copolymer B-1 had an Mn of 1,240, an Mw of 4,980, and an Mw/Mn of 4.02. The copolymer B-1 contained 28.2% by mol (31.5 wt %) of DVB-derived structural units, 12.2% by mol (13.8 wt %) of EVB-derived structural units, 37.6% by mol (33.6 wt %) of structural units derived from styrene, and 22.0% by mol (21.1 wt %) of structural units derived from diisobutylene. The crosslinked structural unit (a1) was 7.6% by mol (8.5 wt %), and the degree of crosslinking was 0.27. The structural unit (a2) was 20.6% by mol (23.0 wt %), and a molar fraction of the structural unit (a2) was 0.206.

The cured product had a Tg of 176° C. and a softening temperature of 280° C. or higher, and the weight loss at 350° C. was 1.32 wt %. The Haze value was 0.03.

Example 3

Into a 300 mL three-necked flask, 50.0 g of the copolymer B-1 obtained in Synthetic Example 2 and 50.0 g of ethylcyclohexane were charged and degassed with nitrogen while stirring at 60° C. for 3 hours. To the flask, 0.036 g of t-butylperoxy-2-ethylhexanoate and 34.5 g of (3-mercaptopropyl)trimethoxysilane were added and reacted at 90° C. for 8 hours to obtain 84.5 g of a modified vinylaromatic copolymer (copolymer B-2) in terms of solid content.

Example 4

In a nitrogen-substituted autoclave reactor, 200 g of cyclohexane and 5 g of a cyclohexane solution containing 6.2 mg (0.032 mmol) of 2,2-di(2-tetrahydrofuryl)propane were charged. At 50° C., 5 g of a cyclohexane solution containing 10 mg (0.16 mmol) of n-butyllithium as pure content was added to the reactor, followed by the addition of 10 g of styrene and 40 g of 1,3-butadiene, which had been cleared of impurities in advance, to initiate the polymerization. The temperature of the reaction solution increased due to the polymerization heat, reaching a maximum temperature of 81° C. After the completion of the polymerization reaction, 5 g of a cyclohexane solution containing 0.027 g of the copolymer B-2 obtained in Example 3 was added to the reactor as a modifying agent to carry out a modification reaction, and the modification reaction was carried out for 30 minutes at a temperature condition of 50° C. to obtain a polymeric solution.

Further, 0.08 mmol of BTESPA was added to the polymeric solution and subjected to a modification reaction for 30 minutes to obtain a polymer solution containing a modified conjugated diene-based copolymer.

After 0.045 g of 2,6-di-tert-4-hydroxytoluene was added as an antioxidant to the obtained polymerization solution, the solvent was removed by steam stripping, followed by vacuum drying to obtain a modified conjugated diene-based copolymer (copolymer B-3).

Synthetic Example 3

In a 500 mL reactor, 62.00 g of DVB-630 (0.300 mol of DVB and 0.176 mol of EVB), 40.92 g (0.393 mol) of styrene, 70.80 g (0.631 mol) of diisobutylene, 60 mmol (6.90 mL) of n-propyl acetate, and 48.55 g (0.527 mol) of toluene were placed. At 70° C., 8.2 mmol of a boron trifluoride-diethyl ether complex (1.03 mL) was added to the reactor and reacted for 1.5 hours. After stopping the polymerization solution with a sodium hydrogen carbonate aqueous solution, an oil layer was washed with pure water three times and devolatilized at 60° C. under reduced pressure to recover a copolymer, obtaining 56.3 g of a polyfunctional vinylaromatic copolymer (copolymer C-1).

The obtained copolymer C-1 had an Mn of 1,430, an Mw of 5,490, and an Mw/Mn of 3.84. The copolymer C-1 contained 39.4% by mol (42.6 wt %) of DVB-derived structural units, 15.9% by mol (17.4 wt %) of EVB-derived structural units, 25.7% by mol (22.2 wt %) of structural units derived from styrene, and 19.1% by mol (17.8 wt %) of structural units derived from diisobutylene. The crosslinked structural unit (a1) was 11.4% by mol (12.3 wt %), and the degree of crosslinking was 0.29. The structural unit (a2) was 28.0% by mol (30.2 wt %), and the molar fraction thereof was 0.280.

The cured product had a Tg of 183° C. and a softening temperature of 280° C. or higher. The weight loss at 350° C. was 1.28 wt %. The Haze value was 0.05.

Example 5

Into a 300 mL three-necked flask, 50.0 g of the copolymer C-1 obtained in Synthetic Example 3 and 50.0 g of ethylcyclohexane were charged and degassed with nitrogen while stirring at 60° C. for 3 hours. To the flask, 0.044 g of t-butylperoxy-2-ethylhexanoate and 42.3 g of (3-mercaptopropyl)trimethoxysilane (MPTMC) were added and reacted at 90° C. for 8 hours to obtain 92.3 g of a modified vinylaromatic copolymer (copolymer C-2) in terms of solid content.

Example 6

In a nitrogen-substituted autoclave reactor, 200 g of cyclohexane and 5 g of a cyclohexane solution containing 6.2 mg (0.032 mmol) of 2,2-di(2-tetrahydrofuryl)propane were charged. At 50° C., 5 g of a cyclohexane solution containing 10 mg (0.16 mmol) of n-butyllithium as pure content was added to the reactor, followed by the addition of 10 g of styrene and 40 g of 1,3-butadiene, which had been cleared of impurities in advance, to initiate the polymerization. The temperature of the reaction solution increased due to the polymerization heat, reaching a maximum temperature of 81° C. After the completion of the polymerization reaction, 5 g of a cyclohexane solution containing 0.023 g of the copolymer C-2 obtained in Example 5 was added to the reactor as a modifying agent to carry out a modification reaction, and the modification reaction was carried out for 30 minutes at a temperature condition of 50° C. to obtain a polymeric solution.

Further, 0.08 mmol of BTESPA was added to the polymeric solution and subjected to a modification reaction for 30 minutes to obtain a polymer solution containing a modified conjugated diene-based copolymer.

After 0.045 g of 2,6-di-tert-4-hydroxytoluene was added as an antioxidant to the obtained polymerization solution, the solvent was removed by steam stripping, followed by vacuum drying to obtain a modified conjugated diene-based copolymer (copolymer C-3).

Comparative Example 1

In a nitrogen-substituted autoclave reactor, 200 g of cyclohexane and 5 g of a cyclohexane solution containing 6.2 mg (0.032 mmol) of 2,2-di(2-tetrahydrofuryl)propane were charged. At 50° C., 5 g of a cyclohexane solution containing 10 mg (0.16 mmol) of n-butyllithium as pure content was added to the reactor, followed by the addition of 10 g of styrene and 40 g of 1,3-butadiene, which had been cleared of impurities in advance, to initiate the polymerization. The temperature of the reaction solution increased due to the polymerization heat, reaching a maximum temperature of 81° C. After the completion of the polymerization reaction, 5 g of a cyclohexane solution containing 0.021 g of the copolymer (C-1) obtained in Synthetic Example 3 was added to the reactor as a branching agent to carry out a branched reaction, and the modification reaction was carried out for 30 minutes at a temperature condition of 50° C. to obtain a polymeric solution.

Further, 0.16 mmol of BTESPA was added to the polymeric solution and subjected to a modification reaction for 30 minutes to obtain a polymer solution containing a modified conjugated diene-based copolymer.

After 0.045 g of 2,6-di-tert-4-hydroxytoluene was added as an antioxidant to the obtained polymerization solution, the solvent was removed by steam stripping, followed by vacuum drying to obtain a modified conjugated diene-based copolymer (copolymer D-3).

Comparative Example 2

In a nitrogen-substituted autoclave reactor, 200 g of cyclohexane and 5 g of a cyclohexane solution containing 6.2 mg (0.032 mmol) of 2,2-di(2-tetrahydrofuryl)propane were charged. At 50° C., 5 g of a cyclohexane solution containing 10 mg (0.16 mmol) of n-butyllithium as pure content was added to the reactor, followed by the addition of 10 g of styrene and 40 g of 1,3-butadiene, which had been cleared of impurities in advance, to initiate the polymerization. The temperature of the reaction solution increased due to the polymerization heat, reaching a maximum temperature of 81° C. After the completion of the polymerization reaction, 0.16 mmol of BTESPA was added to the reactor and subjected to a modification reaction for 30 minutes to obtain a polymer solution containing a modified conjugated diene-based copolymer.

After 0.045 g of 2,6-di-tert-4-hydroxytoluene was added as an antioxidant to the obtained polymerization solution, the solvent was removed by steam stripping, followed by vacuum drying to obtain a modified conjugated diene-based copolymer (copolymer E-3).

The analysis results of each copolymer are shown in Table 1 and Table 2.

TABLE 1

|  | Synthetic Ex. 1 | Synthetic Ex. 2 | Synthetic Ex. 3 |
|---|---|---|---|
| Vinylaromatic copolymer | A-1 | B-1 | C-1 |
| Mn (g/mol) | 941 | 1240 | 1430 |
| Mw (g/mol) | 2850 | 4980 | 5490 |
| Mw/Mn (-) | 3.03 | 4.02 | 3.83 |
| Vinyl equivalent (g/eq.) | 389 | 346 | 282 |
| DVB content (wt %) | 21.8 | 31.5 | 42.6 |
| EVB content (wt %) | 9.6 | 13.8 | 17.4 |
| Styrene content (wt %) | 44.6 | 33.6 | 22.2 |
| Diisobutylene content (wt %) | 24.0 | 21.1 | 17.8 |
| Degree of crosslinking (a1/a) (%) | 0.24 | 0.27 | 0.29 |
| Residual vinyl fraction (a2/(a + b)) (%) | 0.144 | 0.206 | 0.280 |
| TGA$_{350}$ (wt %) | 1.41 | 1.32 | 1.28 |
| Haze (-) | 0.02 | 0.03 | 0.05 |

|  | Ex. 1 | Ex. 3 | Ex. 5 | Ex. 6 |
|---|---|---|---|---|
| Modifying agent | MPTMS | MPTMS | MPTMC | — |
| Modified vinylaromatic copolymer | A-2 | B-2 | C-2 | C-3 |
| Mn (g/mol) | 4440 | 3630 | 3250 | 941 |
| Mw (g/mol) | 68300 | 54200 | 35600 | 2850 |
| Mw/Mn (-) | 15.4 | 14.9 | 11.0 | 3.03 |
| DVB content (wt %) | 14.5 | 20.1 | 25.1 | 21.8 |
| EVB content (wt %) | 6.4 | 8.8 | 10.3 | 9.6 |
| Styrene content (wt %) | 29.6 | 21.4 | 13.1 | 44.6 |
| Diisobutylene content (wt %) | 15.9 | 13.5 | 10.5 | 24.0 |
| Modification group content (wt %) | 33.5 | 36.2 | 41.1 | 0.0 |
| Haze (-) | 0.03 | 0.03 | 0.05 | 0.02 |

TABLE 2

|  | Ex. 2 | Ex. 4 | Ex. 6 | Comp. Ex. 1 | Comp. Ex. 2 |
|---|---|---|---|---|---|
| Modified vinylaromatic copolymer | A-2 | B-2 | C-2 | A-1 | — |
| Modifying agent | BTESPA | BTESPA | BTESPA | BTESPA | BTESPA |
| Modified conjugated diene copolymer | A-3 | B-3 | C-3 | D-3 | E-3 |

TABLE 2-continued

|  | Ex. 2 | Ex. 4 | Ex. 6 | Comp. Ex. 1 | Comp. Ex. 2 |
|---|---|---|---|---|---|
| Mw (10$^4$) | 48 | 49 | 51 | 31 | 27 |
| Area of multi-branched component (%) | 58.5 | 51.5 | 49.5 | 7.3 |  |
| Area of 3 Mp or more (%) | 32.1 | 27.3 | 33.7 | 3.1 |  |
| Vinyl bond amount (%) | 39 | 36 | 38 | 46 | 48 |
| Mooney viscosity | 62 | 61 | 65 | 51 | 47 |
| Haze (-) | 0.01 | 0.02 | 0.01 | 0.08 | 0.05 |

Example 7

The copolymer A-3 (copolymer rubber) obtained in Example 2, a process oil, carbon black, zinc oxide, stearic acid, and an anti-aging agent were blended and kneaded using a Labo Plastomill at 155° C. and 60 rpm for 4 minutes.

Sulfur and a vulcanization accelerator were added to the kneaded product obtained by the kneading, and the mixture was kneaded using a Labo Plastomill at 70° C. and 60 rpm for 1 minute and vulcanized to obtain a crosslinked rubber A.

The blending proportions (parts by weight) are shown in Table 3. Physical properties of the crosslinked rubber A are shown in Table 4.

TABLE 3

| Copolymer rubber | 100.0 |
|---|---|
| Process oil | 37.5 |
| Silica | 65.0 |
| Carbon black | 5.0 |
| Zinc oxide | 3.0 |
| Stearic acid | 1.0 |
| Anti-aging agent | 1.0 |
| Sulfur | 1.8 |
| Vulcanization accelerator | 1.5 |

Additives used are as follows.
Process oil: Diana Process Oil AC-12, manufactured by Idemitsu Kosan Co., Ltd.
Silica: ULTRASIL VN3, manufactured by Degussa AG
Carbon black: Niteron #300, manufactured by Nippon Steel Chemical Carbon Co., Ltd.
Zinc oxide: Zinc oxide No. 1, manufactured by Mitsui Mining & Smelting Co., Ltd.
Stearic acid: manufactured by NOF Corporation
Anti-aging agent: NOCCELER NS, manufactured by Ouchi Shinko Chemical Industrial Co., Ltd.
Sulfur: sulfur powder manufactured by Tsurumi Chemical Industry Co., Ltd.
Vulcanization accelerator: N-tert-butylbenzothiazole-2-sulfenamide Examples 8 to 9, and Comparative Examples 3 to 4

Crosslinked rubbers B to F were obtained in the same manner as in Example 7, except that the modified conjugated diene-based copolymer B-3, C-3, D-3, or E-3 synthesized in Example 4 and Example 6 or Comparative Examples 1 to 2 were used in place of the modified conjugated diene-based copolymer A-3.

The types of the modified conjugated diene-based copolymers used and physical properties of the obtained crosslinked rubbers B to E are shown in Table 4.

TABLE 4

|  | Modified conjugated diene copolymer | Crosslinked rubber | Bound rubber amount (%) | Tensile strength index | Wear resistance index |
|---|---|---|---|---|---|
| Ex. 7 | A-3 | A | 67 | 100 | 100 |
| Ex. 8 | B-3 | B | 71 | 109 | 116 |
| Ex. 9 | C-3 | C | 76 | 117 | 121 |
| Comp. Ex. 3 | D-3 | D | 41 | 84 | 81 |
| Comp. Ex. 4 | E-3 | E | 47 | 79 | 79 |

From Table 4, it is clear that the rubber crosslinked material using the copolymer of the present invention imparts the same or higher dispersibility of silica and adhesion at the interface as or than when using divinylbenzene which is a known branching agent, and thus is excellent in tensile strength and wear resistance in the vulcanized rubber.

Example 11

270 ml (210.3 g) of cyclohexane and 5 g of a cyclohexane solution containing 1.05 g (9.0 mmol) of N,N,N',N'-tetramethylethylenediamine were charged. At 50° C., 50 g of a cyclohexane solution containing 2.88 g (45.0 mmol) of n-butyllithium as pure content was added, followed by the addition of 4.73 g of DVB-630 (22.9 mmol of DVB and 13.4 mmol of EVB) and 27.96 g (269 mmol) of styrene, which had been cleared of impurities in advance, to initiate the polymerization. The temperature of the reaction solution increased due to the polymerization heat, reaching a maximum temperature of 81° C. After the completion of the polymerization reaction, 10.63 g (45.0 mmol) of 3-glycidoxypropyltrimethoxysilane (GPTMS) was added to the reactor as a modifying agent and subjected to a modification reaction for 30 minutes to obtain a polymer solution containing a modified vinylaromatic copolymer.

The obtained polymerization solution was concentrated by devolatilization to obtain 42.89 g (yield: 99.0 wt %) of a modified vinylaromatic copolymer (copolymer A-11) in solid content equivalent yield.

The copolymer A-11 had an Mn of 4,520, an Mw of 8,870, and an Mw/Mn of 1.96. The copolymer A-11 contained 6.55% by mol (6.88 wt %) of DVB-derived structural units, 3.79% by mol (4.04 wt %) of EVB-derived structural units, 76.8% by mol (64.5 wt %) of structural units derived from styrene, and 12.9% by mol (24.5 wt %) of structural units derived from 3-glycidoxypropyltrimethoxysilane. The crosslinked structural unit (a1) was 6.55% by mol (6.88 wt %), and the degree of crosslinking (a1/a) was 1.00. The structural unit (a2) having a residual vinyl group was 0.0% by mol.

The weight loss at 350° C. was 1.25 wt %, and the Haze value was 0.02.

Example 12

In a reactor, 270 ml (210.3 g) of cyclohexane and 5 g of a cyclohexane solution containing 1.05 g (9.0 mmol) of N,N,N',N'-tetramethylethylenediamine were charged. At 50° C., 50 g of a cyclohexane solution containing 2.88 g (45.0 mmol) of n-butyllithium as pure content was added to the reactor, followed by the addition of 4.73 g of DVB-630 (22.9 mmol of a divinylbenzene (a mixture of m-isomer and p-isomer) component and 13.4 mmol of an ethylvinylbenzene (a mixture of m-isomer and p-isomer) component) and 27.96 g (269 mmol) of styrene, which had been cleared of impurities in advance, to initiate the polymerization. The temperature of the reaction solution increased due to the polymerization heat, reaching a maximum temperature of 81° C. After the completion of the polymerization reaction, 16.14 g (45.0 mmol) of triethoxylylthiopropyltrimethoxysilane (TESTPTMS) was added to the reactor as a modifying agent and subjected to a modification reaction for 30 minutes to obtain a polymer solution containing a modified vinylaromatic copolymer (copolymer B-11).

The obtained polymerization solution was concentrated by devolatilization to obtain 48.34 g (yield: 99.0 wt %) of the modified vinylaromatic copolymer B-11 in solid content equivalent yield.

The copolymer B-11 had an Mn of 2,190, an Mw of 3,620, and an Mw/Mn of 1.65. The copolymer B-11 contained 6.56% by mol (6.10 wt %) of DVB-derived structural units, 3.78% by mol (3.58 wt %) of EVB-derived structural units, 76.8% by mol (57.3 wt %) of structural units derived from styrene, and 12.8% by mol (33.1 wt %) of structural units derived from 3-glycidoxypropyltrimethoxysilane. The crosslinked structural unit (a1) was 6.55% by mol (6.09 wt %), and the degree of crosslinking was 1.00. The structural unit (a2) was 0.0% by mol.

The weight loss at 350° C. was 1.39 wt %, and the Haze value was 0.03.

The analysis results of the copolymers in Examples 11 and 12 are shown in Table 5.

TABLE 5

|  | Ex. 11 | Ex. 12 | Synthetic Ex. 11 |
|---|---|---|---|
| Modified vinylaromatic copolymer | A-11 | B-11 | C-11 |
| Modifying agent | GPTMS | TESTPTMS | — |
| Mn (g/mol) | 4520 | 2190 | 941 |
| Mw (g/mol) | 8870 | 3620 | 2850 |
| Mw/Mn (—) | 1.96 | 1.65 | 3.03 |
| DVB content (wt %) | 6.88 | 6.10 | 21.8 |
| EVB content (wt %) | 4.04 | 3.58 | 9.6 |
| Styrene content (wt %) | 64.5 | 57.3 | 44.6 |
| Diisobutylene content (wt %) |  |  | 24.0 |
| Modification group content (wt %) | 24.5 | 33.1 | — |
| Degree of crosslinking (a1/a) (%) | 1.00 | 1.00 | 0.24 |
| Residual vinyl fraction (a2/(a + b)) (%) | 0.00 | 0.00 | 0.14 |
| TGA$_{350}$ (wt %) | 1.25 | 1.39 | 1.41 |
| Haze (—) | 0.02 | 0.03 | 0.02 |

Example 13

In a nitrogen-substituted autoclave reactor, 200 g of cyclohexane and 5 g of a cyclohexane solution containing 6.2 mg (0.032 mmol) of 2,2-di(2-tetrahydrofuryl)propane were charged. At 50° C., 5 g of a cyclohexane solution containing 10 mg (0.16 mmol) of n-butyllithium as pure content was added to the reactor, followed by the addition of 10 g of styrene and 40 g of 1,3-butadiene, which had been cleared of impurities in advance, to initiate the polymerization. The temperature of the reaction solution increased due to the polymerization heat, reaching a maximum temperature of 81° C. After the completion of the polymerization reaction, 5 g of a cyclohexane solution containing 0.076 g of the modified vinylaromatic copolymer (A-11) obtained in Example 11 was added to the reactor as a modifier to carry out a modification reaction, and the modification reaction was carried out for 30 minutes at a temperature condition of 50° C. to obtain a polymeric solution.

Further, 0.08 mmol of BTESPA was added to the polymeric solution and subjected to a modification reaction for 30 minutes to obtain a polymer solution containing a modified conjugated diene-based copolymer.

After 0.045 g of 2,6-di-tert-4-hydroxytoluene was added as an antioxidant to the obtained polymerization solution, the solvent was removed by steam stripping, followed by vacuum drying to obtain a modified conjugated diene-based copolymer (copolymer A-12).

Example 14

In a nitrogen-substituted autoclave reactor, 200 g of cyclohexane and 5 g of a cyclohexane solution containing 6.2 mg (0.032 mmol) of 2,2-di(2-tetrahydrofuryl)propane were charged. At 50° C., 5 g of a cyclohexane solution containing 10 mg (0.16 mmol) of n-butyllithium as pure content was added to the reactor, followed by the addition of 10 g of styrene and 40 g of 1,3-butadiene, which had been cleared of impurities in advance, to initiate the polymerization. The temperature of the reaction solution increased due to the polymerization heat, reaching a maximum temperature of 81° C. After the completion of the polymerization reaction, 5 g of a cyclohexane solution containing 0.085 g of the copolymer B-11 obtained in Example 12 was added to the reactor as a modifying agent to carry out a modification reaction, and the modification reaction was carried out for 30 minutes at a temperature condition of 50° C. to obtain a polymeric solution.

Further, 0.08 mmol of BTESPA was added to the polymeric solution and subjected to a modification reaction for 30 minutes to obtain a polymer solution containing a modified conjugated diene-based copolymer.

After 0.045 g of 2,6-di-tert-4-hydroxytoluene was added as an antioxidant to the obtained polymerization solution, the solvent was removed by steam stripping, followed by vacuum drying to obtain a modified conjugated diene-based copolymer (copolymer B-12).

Synthetic Example 11

In a 500 mL reactor, 31.00 g of DVB-630 (0.150 mol of DVB and 0.088 mol of EVB), 65.72 g (0.631 mol) of styrene, 70.80 g (0.631 mol) of diisobutylene, 60 mmol (6.90 mL) of n-propyl acetate, and 48.55 g (0.527 mol) of toluene were placed. At 70° C., 15.2 mmol of a boron trifluoride-diethyl ether complex (1.91 mL) was added to the reactor and reacted for 2.0 hours. After stopping the polymerization solution with a sodium hydrogen carbonate aqueous solution, an oil layer was washed with pure water three times and devolatilized at 60° C. under reduced pressure to recover a copolymer, obtaining 60.6 g of a vinylaromatic copolymer (copolymer C-11).

The obtained copolymer C-11 had an Mn of 941, an Mw of 2,850, and an Mw/Mn of 3.03. The copolymer C-11 contained 19.0% by mol (21.8 wt %) of DVB-derived structural units, 8.3% by mol (9.6 wt %) of EVB-derived structural units, 48.6% by mol (44.6 wt %) of structural units derived from styrene, and 24.2% by mol (24.0 wt %) of structural units derived from diisobutylene. The crosslinked structural unit (a1) was 4.6% by mol (5.2 wt %), and the degree of crosslinking was 0.24. The structural unit (a2) was 14.4% by mol (16.5 wt %), and the molar fraction thereof was 0.144.

The cured product had a Tg of 167° C. and a softening temperature of 280° C. or higher. The weight loss at 350° C. was 1.41 wt %. The Haze value was 0.02.

Comparative Example 11

In a nitrogen-substituted autoclave reactor, 200 g of cyclohexane and 5 g of a cyclohexane solution containing 6.2 mg (0.032 mmol) of 2,2-di(2-tetrahydrofuryl)propane were charged. At 50° C., 5 g of a cyclohexane solution containing 10 mg (0.16 mmol) of n-butyllithium as pure content was added to the reactor, followed by the addition of 10 g of styrene and 40 g of 1,3-butadiene, which had been cleared of impurities in advance, to initiate the polymerization. The temperature of the reaction solution increased due to the polymerization heat, reaching a maximum temperature of 81° C. After the completion of the polymerization reaction, 5 g of a cyclohexane solution containing 0.021 g of the copolymer C-11 obtained in Synthetic Example 11 was added to the reactor as a branching agent to carry out a branched reaction, and the modification reaction was carried out for 30 minutes at a temperature condition of 50° C. to obtain a polymeric solution.

Further, 0.16 mmol of BTESPA was added to the polymeric solution and subjected to a modification reaction for 30 minutes to obtain a polymer solution containing a modified conjugated diene-based copolymer.

After 0.045 g of 2,6-di-tert-4-hydroxytoluene was added as an antioxidant to the obtained polymerization solution, the solvent was removed by steam stripping, followed by vacuum drying to obtain a modified conjugated diene-based copolymer (copolymer C-12).

Comparative Example 12

A modified conjugated diene-based copolymer (copolymer D-12) was obtained in the same manner as in Comparative Example 2.

The analysis results of the obtained copolymers are shown in Table 6.

TABLE 6

| | Ex. 13 | Ex. 14 | Comp. Ex. 11 | Comp. Ex. 12 |
|---|---|---|---|---|
| Modified vinylaromatic copolymer | A-11 | B-11 | C-11 | — |
| Modifying agent | BTESPA | BTESPA | BTESPA | BTESPA |
| Modified conjugated diene copolymer | A-12 | B-12 | C-12 | D-12 |
| Mw (10$^4$) | 51 | 48 | 31 | 27 |
| Area of multi-branched component (%) | 43.9 | 31.7 | 7.3 | — |
| Area of 3 Mp or more (%) | 26.7 | 11.2 | 3.1 | — |
| Vinyl bond amount (%) | 40 | 35 | 46 | 48 |
| Mooney viscosity | 65 | 63 | 51 | 47 |
| Haze (−) | 0.02 | 0.03 | 0.08 | 0.05 |

Example 15

The copolymer A-12 (copolymer rubber) obtained in Example 13, a process oil, carbon black, zinc oxide, stearic acid, and an anti-aging agent were blended and kneaded using a Labo Plastomill at 155° C. and 60 rpm for 4 minutes.

Sulfur and a vulcanization accelerator were added to the kneaded product obtained by the kneading, and the mixture was kneaded using a Labo Plastomill at 70° C. and 60 rpm for 1 minute and vulcanized to obtain a crosslinked rubber A.

The blending proportion and the additives used are the same as those in Example 7 and Table 3.

Example 16 and Comparative Examples 13 to 14

Crosslinked rubbers B to D were obtained in the same manner as in Example 15, except that the copolymer B-12, C-12, or D-12 obtained in Example 14 or Comparative Examples 11 to 12 was used in place of the modified conjugated diene-based copolymer A-12.

The types of the modified conjugated diene-based copolymers used and physical properties of the obtained crosslinked rubbers B to D are shown in Table 7.

TABLE 7

|  | Modified conjugated diene copolymer | Crosslinked rubber | Bound rubber amount (%) | Tensile strength index | Wear resistance index |
|---|---|---|---|---|---|
| Ex. 15 | A-12 | A | 76 | 117 | 121 |
| Ex. 16 | B-12 | B | 73 | 100 | 100 |
| Comp. Ex. 13 | C-12 | C | 43 | 82 | 80 |
| Comp. Ex. 14 | D-12 | D | 46 | 76 | 78 |

Example 17

In a reactor, 240 ml (186.96 g) of ethylcyclohexane and 2.31 g (12.0 mmol) of 2,2-di(2-tetrahydrofuryl)propane were charged. At 50° C., 37.5 g of an n-hexane solution containing 3.84 g (60.0 mmol) of n-butyllithium as pure content was added to the reactor, followed by the addition of 6.37 g of DVB-630 (30.0 mmol of DVB and 18.9 mmol of EVB) and 38.65 g (371.1 mmol) of styrene, which had been cleared of impurities in advance, to initiate the polymerization. The temperature of the reaction solution increased due to the polymerization heat, reaching a maximum temperature of 67° C. After the completion of the polymerization reaction, 16.94 g (60.9 mmol) of 3-glycidoxypropyltriethoxysilane (GPTES) was added to the reactor as a modifying agent and subjected to a modification reaction for 60 minutes to obtain a polymer solution containing a functional group-modified vinylaromatic copolymer. The obtained polymerization solution was neutralized using succinic acid and then filtered.

The obtained polymerization solution was concentrated by devolatilization to obtain 61.34 g (yield: 99.0 wt %) of a functional group-modified vinylaromatic copolymer (copolymer F-2) in solid content equivalent yield.

The analysis results of the copolymer F-2 are shown in Table 8.

The copolymer F-2 contained 6.24% by mol (6.30 wt %) of divinylbenzene-derived structural units, 3.93% by mol (3.98 wt %) of ethylvinylbenzene-derived structural units, 77.17% by mol (62.38 wt %) of structural units derived from styrene, and 12.66% by mol (27.34 wt %) of structural units derived from GPTES. The crosslinked structural unit (a1) was 6.05% by mol (6.11 wt %), and the degree of crosslinking (a1/a) was 0.97. Since the structural unit (a2) derived from divinylbenzene having a residual vinyl group was 0.19% by mol (0.19 wt %), a molar fraction of the structural unit (a2) to the sum of the structural units (a) and (b) was 0.0021.

Example 18

In a reactor, 240 ml (186.96 g) of ethylcyclohexane and 2.31 g (12.0 mmol) of 2,2-di(2-tetrahydrofuryl)propane were charged. At 50° C., 37.5 g of an n-hexane solution containing 3.84 g (60.0 mmol) of n-butyllithium as pure content was added to the reactor, followed by the addition of 8.92 g of DVB-630 (42.0 mmol of DVB and 26.5 mmol of EVB) and 42.86 g (411.5 mmol) of styrene, which had been cleared of impurities in advance, to initiate the polymerization. The temperature of the reaction solution increased due to the polymerization heat, reaching a maximum temperature of 65° C. After the completion of the polymerization reaction, 16.94 g (60.9 mmol) of GPTES was added to the reactor as a modifying agent and subjected to a modification reaction for 60 minutes to obtain a polymer solution containing a functional group-modified vinylaromatic copolymer. The obtained polymerization solution was neutralized using succinic acid and then filtered.

The obtained polymerization solution was concentrated by devolatilization to obtain 68.31 g (yield: 99.4 wt %) of a modified vinylaromatic copolymer (copolymer G-2) in solid content equivalent yield.

The analysis results of the copolymer G-2 are shown in Table 8.

The copolymer G-2 contained 7.77% by mol (7.96 wt %) of DVB-derived structural units, 4.90% by mol (5.02 wt %) of EVB-derived structural units, 76.09% by mol (62.37 wt %) of structural units derived from styrene, and 11.25% by mol (24.66 wt %) of structural units derived from GPTES. The crosslinked structural unit (a1) was 7.45% by mol (7.64 wt %), and the degree of crosslinking (a1/a) was 0.96. The structural unit (a2) was 0.31% by mol (0.32 wt %), and a molar fraction of the structural unit (a2) to the sum of the structural units (a) and (b) was 0.0035.

TABLE 8

|  | Ex. 17 | Ex. 18 |
|---|---|---|
| Modified vinylaromatic copolymer | F-2 | G-2 |
| Modifying agent | GPTES | GPTES |
| Mn (g/mol) | 3650 | 3920 |
| Mw (g/mol) | 8300 | 13000 |
| Mw/Mn (—) | 2.27 | 3.31 |
| DVB content (wt %) | 6.30 | 7.96 |
| EVB content (wt %) | 3.98 | 5.02 |
| Styrene content (wt %) | 62.38 | 62.37 |
| Modification group content (wt %) | 27.34 | 24.66 |
| Degree of crosslinking (a1/a) (—) | 0.97 | 0.96 |
| Residual vinyl fraction (a2/(a + b)) (—) | 0.0021 | 0.0035 |
| $TGA_{35}0$ (wt %) | 1.34 | 1.06 |

Example 19

In a nitrogen-substituted autoclave reactor, 200 g of cyclohexane and 5 g of a cyclohexane solution containing 6.2 mg (0.032 mmol) of 2,2-di(2-tetrahydrofuryl)propane were charged. At 50° C., 5 g of a cyclohexane solution containing 10 mg (0.16 mmol) of n-butyllithium as pure content was added to the reactor, followed by the addition of 10 g of styrene and 40 g of 1,3-butadiene, which had been cleared of impurities in advance, to initiate the polymerization. The temperature of the reaction solution increased due to the polymerization heat, reaching a maximum temperature of 76° C. After the completion of the polymerization reaction, 5 g of a cyclohexane solution containing 0.081 g of the copolymer F-2 obtained in Example 17 was added to the reactor as a modifying agent to carry out a modification reaction, and the modification reaction was carried out for 60 minutes at a temperature condition of 50° C. to obtain a polymeric solution.

Further, 0.08 mmol of BTESPA was added to the polymeric solution and subjected to a modification reaction for 30 minutes to obtain a polymer solution containing a modified conjugated diene-based copolymer.

After 0.045 g of 2,6-di-tert-4-hydroxytoluene was added as an antioxidant to the obtained polymerization solution, the solvent was removed by steam stripping, followed by vacuum drying to obtain a modified conjugated diene-based copolymer (copolymer F-3).

Example 20

In a nitrogen-substituted autoclave reactor, 200 g of cyclohexane and 5 g of a cyclohexane solution containing 6.2 mg (0.032 mmol) of 2,2-di(2-tetrahydrofuryl)propane were charged. At 50° C., 5 g of a cyclohexane solution containing 10 mg (0.16 mmol) of n-butyllithium as pure content was added to the reactor, followed by the addition of 10 g of styrene and 40 g of 1,3-butadiene, which had been cleared of impurities in advance, to initiate the polymerization. The temperature of the reaction solution increased due to the polymerization heat, reaching a maximum temperature of 77° C. After the completion of the polymerization reaction, 5 g of a cyclohexane solution containing 0.090 g of the copolymer G-2 obtained in Example 18 was added to the reactor as a modifying agent to carry out a modification reaction, and the modification reaction was carried out for 60 minutes at a temperature condition of 50° C. to obtain a polymeric solution.

Further, 0.08 mmol of bis(3-triethoxysilylpropyl)methylamine was added to the polymeric solution and subjected to a modification reaction for 30 minutes to obtain a polymer solution containing a modified conjugated diene-based copolymer.

After 0.045 g of 2,6-di-tert-4-hydroxytoluene was added as an antioxidant to the obtained polymerization solution, the solvent was removed by steam stripping, followed by vacuum drying to obtain a modified conjugated diene-based copolymer (copolymer G-3).

The analysis results of the obtained copolymers are shown in Table 9.

TABLE 9

|  | Ex. 19 | Ex. 20 |
| --- | --- | --- |
| Modified vinylaromatic copolymer | F-2 | G-2 |
| Modifying agent | BTESPA | BTESPA |
| Modified conjugated diene copolymer | F-3 | G-3 |
| Mw (10$^4$) | 49 | 47 |
| Area of multi-branched component (%) | 41.2 | 38.6 |
| Area of 3 Mp or more (%) | 28.2 | 24.6 |
| Vinyl bond amount (%) | 32 | 27 |
| Mooney viscosity | 67 | 65 |
| Haze (−) | 0.04 | 0.06 |

Examples 21 to 22

Crosslinked rubbers F to G were obtained in the same manner as in Example 15, except that the copolymer F-3 or G-3 was used.

The types of the modified conjugated diene-based copolymers used and physical properties of the obtained crosslinked rubbers F to G are shown in Table 10.

TABLE 10

|  | Modified conjugated diene copolymer | Crosslinked rubber | Bound rubber amount (%) | Tensile strength index | Wear resistance index |
| --- | --- | --- | --- | --- | --- |
| Ex. 21 | F-3 | F | 72 | 118 | 122 |
| Ex. 22 | G-3 | G | 69 | 116 | 120 |

INDUSTRIAL APPLICABILITY

The modified vinylaromatic copolymer of the present invention can be used as a raw material of a conjugated diene-based copolymer. Furthermore, a crosslinked rubber composition obtained by incorporating a filler into the conjugated diene-based copolymer followed by crosslinking has excellent filler dispersibility and excellent mechanical strength and wear resistance, and is thus useful in an elastomer material for tires (in particular, tire treads), antiseismic rubber, rubber hoses, rubber rollers, footwear materials, and the like. Such a polymer or a composition including the polymer is useful as a molding material, a resin modifier, a dielectric material, an insulating material, a heat-resistant material, a structural material, an optical material, and the like.

The invention claimed is:

1. A modified vinylaromatic copolymer comprising a structural unit (a) derived from
   a divinylaromatic compound and a structural unit (b) derived from a monovinylaromatic compound, wherein the structural unit (a) at least partially includes the following crosslinked structural unit (a1):

(a1)

wherein R$^1$ represents an aromatic hydrocarbon group having 6 to 30 carbon atoms; and
one or more terminals are each modified by a modification group having at least one functional group selected from the group consisting of an amino group, an alkoxysilyl group, and a hydroxyl group; a number average molecular weight Mn in terms of standard polystyrene as measured with gel permeation chromatography is 500 to 100,000; 50 g or more of the copolymer is dissolved in 100 g of a solvent selected from toluene, xylene, tetrahydrofuran, dichloroethane, or chloroform; 0.5% by mol to 95.0% by mol of the structural unit (a) is contained and 5.0% by mol to 99.5% by mol of the structural unit (b) is contained, based on the total amount of the structural unit (a) and the structural unit (b); and a content of a structural unit other than the structural unit (a) and the structural unit (b) is at most 50% by mol.

2. The modified vinylaromatic copolymer according to claim 1,
   wherein the copolymer comprises one or more silane-based functional groups (c) each represented by the following formula (c1) or formula (c2), in a side chain or at a terminal:

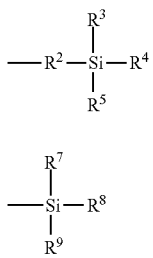

(c1)

(c2)

wherein $R^2$ represents a divalent alkylene group having 1 to 6 carbon atoms, and $R^3$, $R^4$, $R^5$, $R^7$, $R^8$ and $R^9$ each independently represent a methoxy group, an ethoxy group, a propoxy group, a butoxy group, an octoxy group, a lauryloxy group, a phenoxy group, a benzyloxy group, a methyl group, an ethyl group, a propyl group, a butyl group, a cyclohexyl group, a phenyl group, or a benzyl group, provided that at least one of $R^3$, $R^4$ and $R^5$ or at least one of $R^7$, $R^8$ and $R^9$ is a methoxy group, an ethoxy group, a propoxy group, a butoxy group, an octoxy group, a lauryloxy group, a phenoxy group, or a benzyloxy group;

a molar fraction of the crosslinked structural unit (a1) to the structural unit (a) is in a range from 0.05 to 0.90;

1 to 20 of the silane-based functional groups (c) are contained per molecule; and a number average molecular weight Mn is 500 to 100,000, and a molecular weight distribution (Mw/Mn) represented by a ratio of a weight average molecular weight Mw to the number average molecular weight Mn is 30.0 or less.

3. The modified vinylaromatic copolymer according to claim 2, comprising one or more copolymers each represented by any of the following formulae (2) to (13):

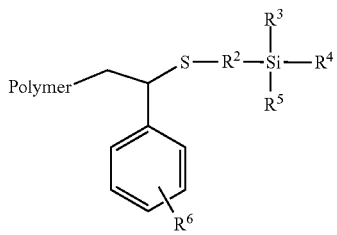

(2)

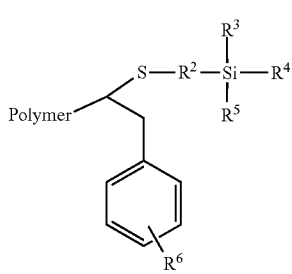

(3)

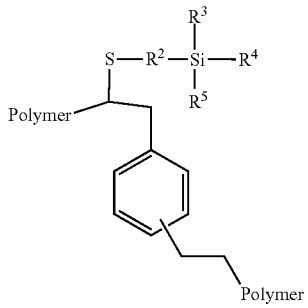

(4)

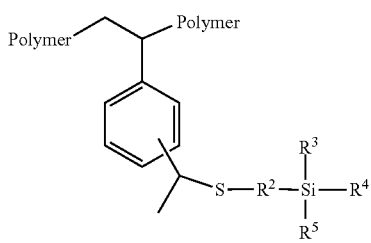

(5)

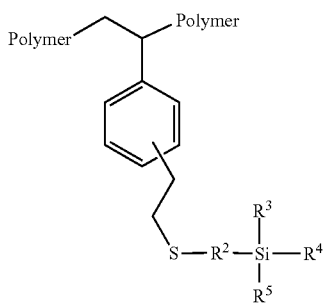

(6)

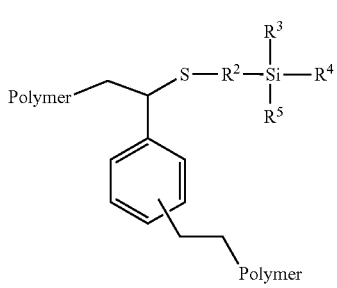

(7)

wherein $R^2$ represents a divalent alkylene group having 1 to 6 carbon atoms, $R^3$, $R^4$ and $R^5$ each independently represent a methoxy group, an ethoxy group, a propoxy group, a butoxy group, an octoxy group, a lauryloxy group, a phenoxy group, a benzyloxy group, a methyl group, an ethyl group, a propyl group, a butyl group, a cyclohexyl group, a phenyl group, or a benzyl group, provided that at least one of $R^3$, $R^4$ and $R^5$ is a methoxy group, an ethoxy group, a propoxy group, a butoxy group, an octoxy group, a lauryloxy group, a phenoxy group, or a benzyloxy group, $R^6$ is an alkyl group having 1 to 6 carbon atoms, a vinyl group, or hydrogen, and Polymer is a copolymer chain, provided that each benzene ring in the formulae is any aromatic ring; and

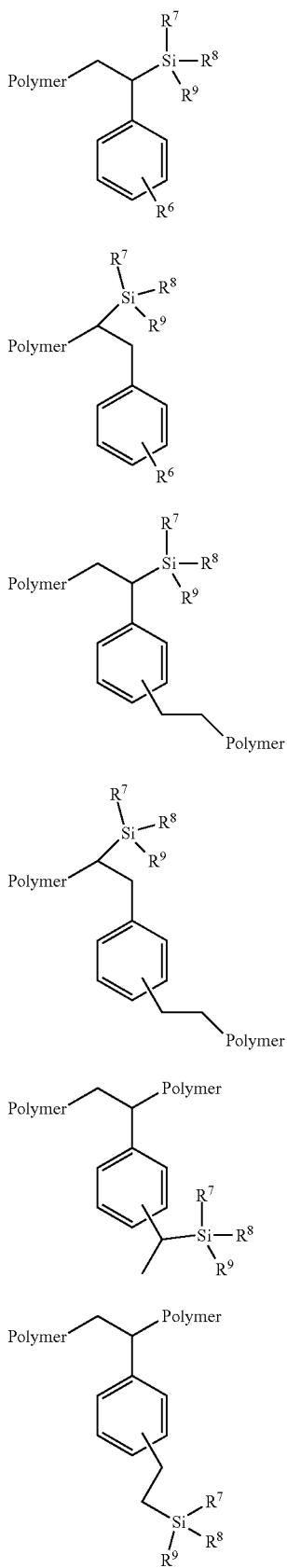

(8)

(9)

(10)

(11)

(12)

(13)

wherein $R^7$, $R^8$ and $R^9$ each independently represent a methoxy group, an ethoxy group, a propoxy group, a butoxy group, an octoxy group, a lauryloxy group, a phenoxy group, a benzyloxy group, a methyl group, an ethyl group, a propyl group, a butyl group, a cyclohexyl group, a phenyl group, or a benzyl group, provided that at least one of $R^7$, $R^8$ and $R^9$ is a methoxy group, an ethoxy group, a propoxy group, a butoxy group, an octoxy group, a lauryloxy group, a phenoxy group, or a benzyloxy group, $R^6$ is an alkyl group having 1 to 6 carbon atoms, a vinyl group, or hydrogen, and Polymer is a copolymer chain.

4. The modified vinylaromatic copolymer according to claim 2, wherein the structural unit (b) derived from a monovinylaromatic compound is a structural unit derived from one or more monomers selected from the group consisting of styrene, vinylnaphthalene, vinylbiphenyl, m-methylstyrene, p-methylstyrene, o,p-dimethylstyrene, m-ethylvinylbenzene, indene, and p-ethylvinylbenzene.

5. A method for producing the modified vinylaromatic copolymer according to claim 2, from a polyfunctional vinylaromatic copolymer and a silane-based compound, wherein the polyfunctional vinylaromatic copolymer comprises 0.5% by mol or more and 95.0% by mol or less of the structural unit (a) derived from a divinylaromatic compound and comprises 5.0% by mol or more and 99.5% by mol or less of the structural unit (b) derived from a monovinylaromatic compound;

the structural unit (a) at least partially includes the crosslinked structural unit (a1) and the following vinyl group-containing structural unit (a2):

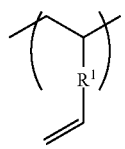

(a2)

wherein $R^1$ represents an aromatic hydrocarbon group having 6 to 30 carbon atoms;

a molar fraction of the crosslinked structural unit (a1) to the structural unit (a) is in a range from 0.05 to 0.90;

a molar fraction of the vinyl group-containing structural unit (a2) to the sum of the structural units (a) and (b) is in a range from 0.001 to 0.80;

the polyfunctional vinylaromatic copolymer has a Mn of 300 to 50,000 and a Mw/Mn of 20.0 or less;

the silane-based compound is any silane-based compound represented by the following formula (5) and/or formula (6):

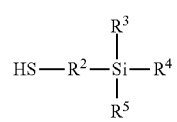

(5)

wherein $R^2$, $R^3$, $R^4$ and $R^5$ are the same as those in the formula (c1); and

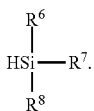

(6)

wherein $R^6$, $R^7$ and $R^8$ are the same as $R^7$, $R^8$ and $R^9$ in the formula (c2); and the polyfunctional vinylaromatic copolymer and the silane-based compound are dissolved in a hydrocarbon-based solvent and added at a temperature of 0 to 150° C. in the presence of a catalyst.

6. A modified conjugated diene-based copolymer obtained by reacting the modified vinylaromatic copolymer (A) according to claim 2, as a modifying agent, with a polymer of a conjugated diene compound (B) having an active terminal, or a copolymer of a conjugated diene compound (B) having an active terminal and an aromatic vinyl compound (C).

7. The modified conjugated diene-based copolymer according to claim 6, comprising 0.001 to 6% by weight of a structural unit (A1) derived from the modified vinylaromatic copolymer (A), 29 to 99.999% by weight of a structural unit (B1) derived from the conjugated diene compound (B) and 0 to 70% by weight of a structural unit (C1) derived from the aromatic vinyl compound (C).

8. The modified conjugated diene-based copolymer according to claim 6, wherein an area of a region corresponding to a number average molecular weight (Mn) three times or more of the number average molecular weight (Mn) at a peak at the lowest molecular weight side is 10% or more based on a total area of 100% in a differential molecular weight distribution curve obtained by gel permeation chromatography (GPC) measurement.

9. A modified conjugated diene-based copolymer composition, obtained by compounding at least one reinforcing filling agent selected from the group consisting of a filler or a silica-based inorganic filling agent, metal oxide, metal hydroxide and carbon black to the modified conjugated diene-based copolymer according to claim 6.

10. The modified conjugated diene-based copolymer composition according to claim 9, further comprising a crosslinking agent.

11. The modified vinylaromatic copolymer according to claim 1, wherein

95% by mol or more of the structural unit (a) is the crosslinked structural unit (a1), and two or more terminals are each modified by a modification group having at least one functional group selected from the group consisting of an amino group, an alkoxysilyl group, and a hydroxyl group.

12. The modified vinylaromatic copolymer according to claim 11, wherein a number average molecular weight Mn is 500 to 50,000, and a molecular weight distribution (Mw/Mn) is 10.0 or less.

13. The modified vinylaromatic copolymer according to claim 12, wherein the number average molecular weight Mn is 900 to 10,000.

14. The modified vinylaromatic copolymer according to claim 11, wherein the average number of functional groups per molecule is in a range from 2 to 20.

15. The modified vinylaromatic copolymer according to claim 11, wherein the monovinylaromatic compound is one or more monomers selected from the group consisting of styrene, vinylnaphthalene, vinylbiphenyl, m-methylstyrene, p-methylstyrene, o,p-dimethylstyrene, m-ethylvinylbenzene, indene, and p-ethylvinylbenzene.

16. A method for producing the modified vinylaromatic copolymer according to claim 11, comprising:

a polymerization step of copolymerizing the divinylaromatic compound with the monovinylaromatic compound, or the divinylaromatic compound and the monovinylaromatic compound with a monomer anionically copolymerizable with these compounds, by use of an alkali metal compound or an alkaline earth metal compound as an anionic polymerization initiator, to obtain a vinylaromatic copolymer having a branched structure and an active terminal, and a terminal modification step of reacting a compound having at least one functional group selected from the group consisting of an amino group, an alkoxysilyl group, and a hydroxyl group, or a precursor compound thereof with the active terminal of the vinylaromatic copolymer, to form a functional group.

17. A modified conjugated diene-based copolymer obtained by reacting the modified vinylaromatic copolymer according to claim 11 with a polymer of a conjugated diene compound, or a copolymer of a conjugated diene compound and an aromatic vinyl compound.

18. The modified conjugated diene-based copolymer according to claim 17, comprising 0.001 to 6% by weight of a structural unit (A1) derived from a modified vinylaromatic copolymer, 29 to 99.999% by weight of a structural unit (B1) derived from a conjugated diene compound, and 0 to 70% by weight of a structural unit (C1) derived from an aromatic vinyl compound.

19. The modified conjugated diene-based copolymer according to claim 17, wherein an area of a region corresponding to a number average molecular weight (Mn) three times or more of the number average molecular weight (Mn) at a peak at the lowest molecular weight side is 10% or more based on a total area of 100% in a differential molecular weight distribution curve obtained by gel permeation chromatography (GPC) measurement.

20. A rubber composition comprising 0.5 to 200 parts by weight of at least one reinforcing filling agent selected from the group consisting of a silica-based inorganic filling agent, metal oxide, metal hydroxide, and carbon black based on 100 parts by weight of the modified conjugated diene-based copolymer according to claim 17.

21. The rubber composition according to claim 20, further comprising a crosslinking agent.

\* \* \* \* \*